US 8,957,673 B2

(12) United States Patent
Ikeda et al.

(10) Patent No.: US 8,957,673 B2
(45) Date of Patent: Feb. 17, 2015

(54) ROTATIONAL ANGLE SENSOR AND METHOD MANUFACTURING SAME, AND THROTTLE CONTROL DEVICE WITH ROTATIONAL ANGLE SENSOR

(75) Inventors: Tsutomu Ikeda, Obu (JP); Yoshihiro Sakuma, Obu (JP); Masaharu Nagasaka, Obu (JP); Koji Yoshikawa, Obu (JP); Kazumasa Nakashima, Obu (JP)

(73) Assignee: Aisan Kogyo Kabushiki Kaisha, Obu-shi, Aichi (JP)

( * ) Notice: Subject to any disclaimer, the term of this patent is extended or adjusted under 35 U.S.C. 154(b) by 398 days.

(21) Appl. No.: 13/137,821

(22) Filed: Sep. 15, 2011

(65) Prior Publication Data

US 2012/0032670 A1    Feb. 9, 2012

Related U.S. Application Data

(63) Continuation of application No. 10/587,843, filed as application No. PCT/JP2005/001227 on Jan. 28, 2005, now Pat. No. 8,044,659.

(30) Foreign Application Priority Data

Feb. 2, 2004 (JP) ................. 2004-025553

(51) Int. Cl.
 *G01B 7/30* (2006.01)
 *G01D 5/14* (2006.01)
 (Continued)

(52) U.S. Cl.
 CPC ............ *G01D 5/145* (2013.01); *F02D 9/105* (2013.01); *F02D 11/106* (2013.01)
 USPC .................................... 324/207.25

(58) Field of Classification Search
 USPC ................................... 324/207.25
 See application file for complete search history.

(56) References Cited

U.S. PATENT DOCUMENTS

| 6,339,322 B1 | 1/2002 | Loreck et al. |
| 6,593,732 B2 | 7/2003 | Dammkohler et al. |
| 7,036,791 B2 | 5/2006 | Wiese |

(Continued)

FOREIGN PATENT DOCUMENTS

| JP | 8-068606 | 3/1996 |
| WO | WO 03/006805 | 1/2003 |
| WO | WO 2004/031558 | 4/2004 |

OTHER PUBLICATIONS

Data Sheet of KMA200 Programmable Angle Sensor ver. 3, Jun. 20, 2001.

(Continued)

*Primary Examiner* — Reena Aurora
(74) *Attorney, Agent, or Firm* — Ladas & Parry LLP

(57) ABSTRACT

A rotational angle sensor and a method for manufacturing the same, and a throttle control device with a rotational angle sensor, which may lower the cost, are provided. The rotational angle sensor includes each sensor IC for detecting a rotational angle of a rotor based on a magnetic field generated between a pair of magnets respectively disposed across the rotational axis of the rotor; each main terminal connected with each connection terminal of each sensor IC; and a holder member for holding each sensor IC and connection portions of each main terminal on each sensor side. A sensor assembly is constructed to form the sensor ICs the main terminals and the holder member into an assembly. A potting material is potted into the holder member.

10 Claims, 40 Drawing Sheets

(51) Int. Cl.
*F02D 9/10* (2006.01)
*F02D 11/10* (2006.01)

(56) References Cited

U.S. PATENT DOCUMENTS

| | | | |
|---|---|---|---|
| 7,042,212 B2 * | 5/2006 | Yoshikawa et al. ...... | 324/207.25 |
| 7,782,044 B2 | 8/2010 | Hannewald | |
| 2002/0130656 A1 | 9/2002 | Hagio et al. | |

OTHER PUBLICATIONS

Data Sheet of KMA200 Programmable Angle Sensor ver. 4, Mar. 25, 2002.
Data Sheet of KMA200 Programmable Angle Sensor ver. 5, Aug. 16, 2005.
Klaus Dietmayer, Marcus Weser, Application Note, Contactless Angle Measurement using KMZ41 and UZZ9000, Mar. 24, 2000.
Fritz Schmeiβer, Klaus Dietmayer, Application Note, Rotational Speed Sensors KMI15/16, Jan. 11, 1999.
Office Action dated Jul. 12, 2012, from the European Patent Office Application No. 11157102.2-1236.
European Patent Office Action dated Feb. 13, 2012, for Application No. 11157100.6-1236.
European Patent Office Action dated Mar. 5, 2012, for Application No. 11157102.2-1236.
European Search Report dated Apr. 26, 2011, for Application No. 11157100.6-1236.
European Search Report dated Apr. 26, 2011, for Application No. 11157102.2-1236.

* cited by examiner

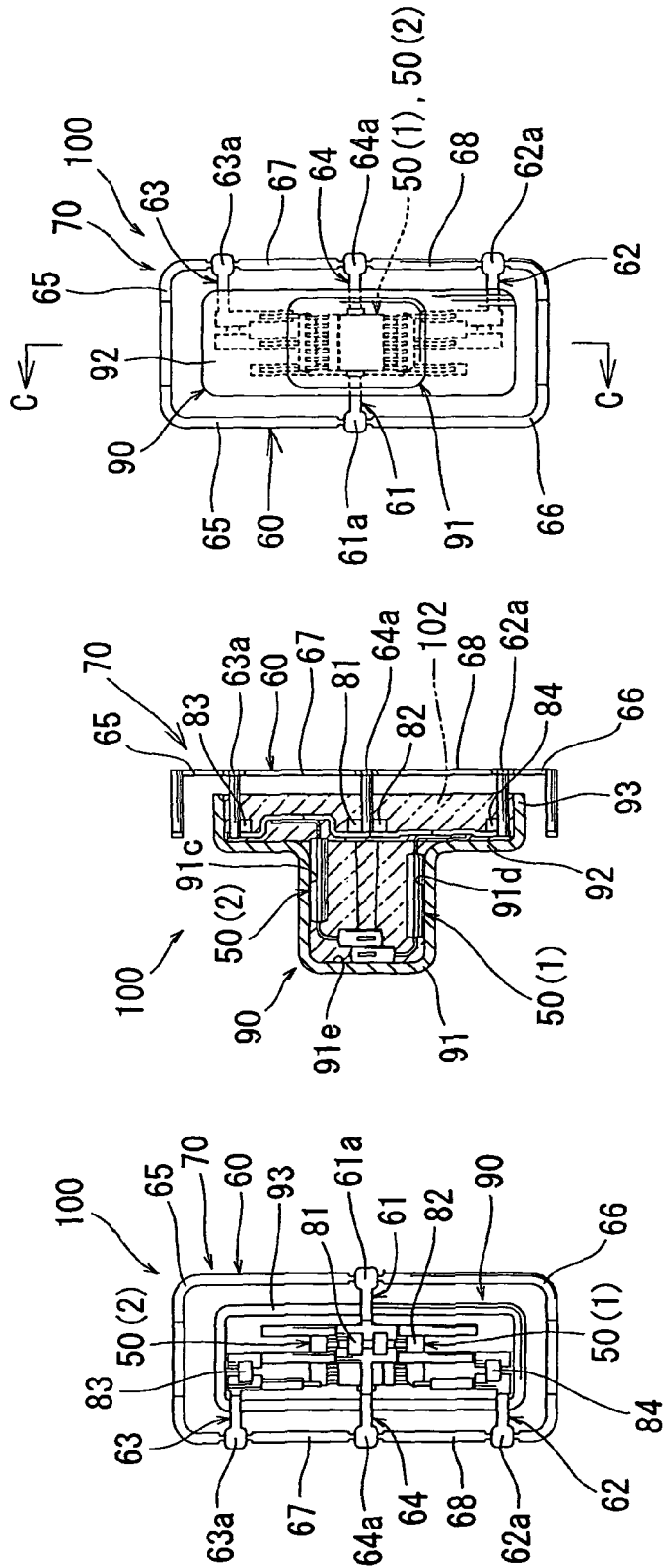

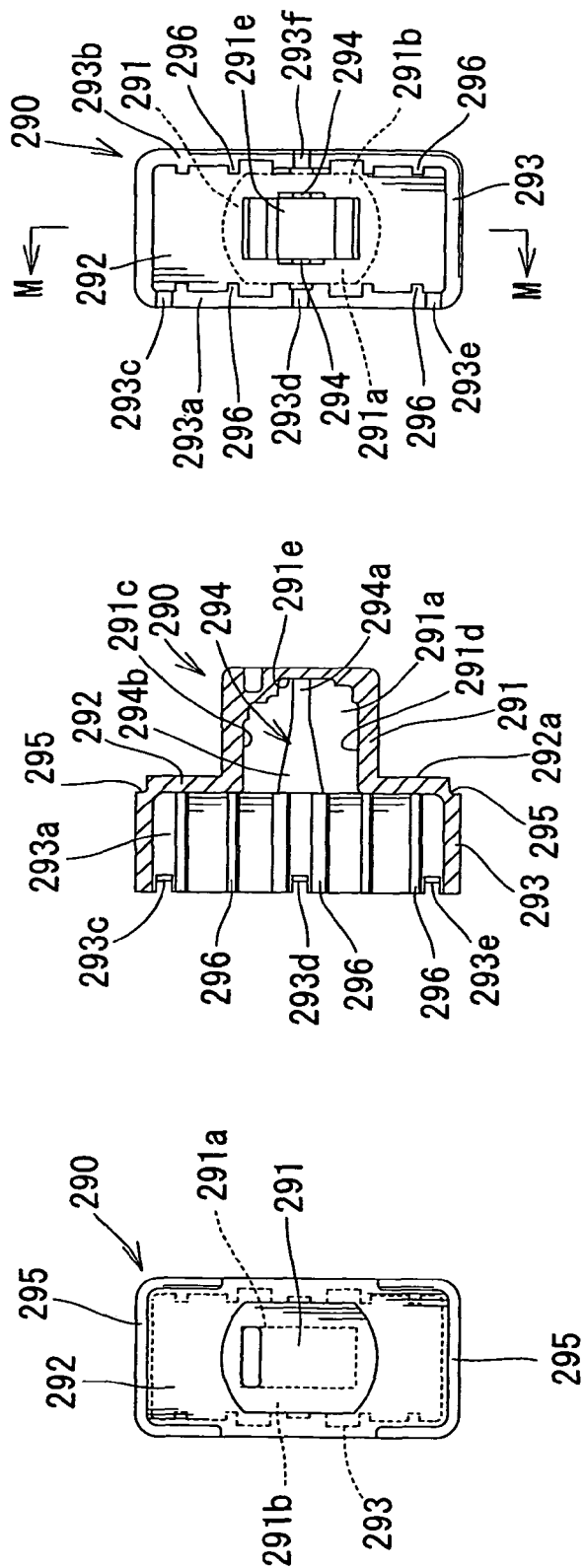

US 8,957,673 B2

ROTATIONAL ANGLE SENSOR AND METHOD MANUFACTURING SAME, AND THROTTLE CONTROL DEVICE WITH ROTATIONAL ANGLE SENSOR

This application is a continuation of application Ser. No. 10/587,843, filed on Mar. 1, 2007, 2006 now U.S. Pat. No. 8,044,659, which is a 371 of PCT/JP2005/001227, filed on Jan. 28, 2005, both of which are incorporated herein by reference.

TECHNICAL FIELD

The present invention relates to a rotational angle sensor and a method for manufacturing the same, and a throttle control device with a rotational angle sensor.

BACKGROUND ART

Some electronically-control-type throttle control devices used for controlling an intake air flow into an engine of such as an automobile include rotational angle sensors serving as throttle sensors for detecting a rotational angle of a motor shaft of an electric motor, which drives a throttle valve (see Patent Document 1 for example).

Some rotational angle sensors used for these throttle control devices include magnetic detectors for detecting a rotational angle of a rotor based on a magnetic field generated between a pair of magnets respectively disposed across the rotational axis of the rotor, and a printed circuit board electrically connected with each connection terminal of the magnetic detectors (see Patent Document 2 for example).

Further, others include magnetic detectors for detecting a rotational angle of a rotor based on magnetic fields generated between a pair of magnets respectively disposed across the rotational axis of the rotor, in which the respective connection terminals are connected with magnetic-detector-side connections of each wiring terminal (equivalent to terminals integrally formed with main terminals and subterminals herein), which can connect terminal pins of external connectors, in such a manner that the respective wiring terminals and the magnetic detector are integrated by integrally resin molding (see Patent Document 3 for example).

Patent Document 1: Japanese Laid-Open Patent Publication No. 6-264777
Patent Document 2: Japanese Laid-Open Patent Publication No. 2003-57071
Patent Document 3: Japanese Laid-Open Patent Publication No. 2003-289610

According to the rotational angle sensors of the aforementioned Patent Document 2, the problem has been that using a printed circuit board, which is generally perceived as expensive, forces the cost to be increased.

Further, according to the rotational angle sensors of Patent Document 3, the problem has been that a die for integrally resin molding (primary molding) the magnetic detector and each wiring terminal is required, which increases equipment expenses, thereby to force the overall cost to be increased.

SUMMARY OF THE INVENTION

A problem to be solved by the present invention is to provide a rotational angle sensor and a method for manufacturing the same, and a throttle control device with a rotational angle sensor, which may lower the cost.

The aforementioned problem can be solved by a rotational angle sensor and a method for manufacturing the same, and a throttle control device with a rotational angle sensor, within the gist of the constructions described in the claims.

Thus, a first invention is a rotational angle sensor including a magnetic detector for detecting a rotational angle of a rotor based on a magnetic field generated between a pair of magnets respectively disposed across the rotational axis of the rotor, each main terminal connected with each connection terminal of the magnetic detector, and a holder member for holding the magnetic detector and magnetic-detector-side connection portions of the main terminals, in which the magnetic detector, the main terminals and the holder member are formed into an assembly to be constructed as a sensor assembly. According to the first invention constructed as above, each connection terminal of the magnetic detector for detecting a rotational angle of a rotor is connected to each main terminal. Therefore, it is possible to lower the cost by using inexpensive main terminals, comparing to expensive printed circuit boards that have conventionally been required. Further, inserting the magnetic detector and the magnetic-detector-side connection portions of each main terminal into the holder member may eliminate a molding die for integrally resin molding the conventional magnetic detector and each wiring terminal (see Patent Document 3). Accordingly, it is possible to reduce the equipment expenses so as to lower the cost. Further, constructing a sensor assembly, which forms the magnetic detector, the main terminals and the holder member into an assembly, facilitates handling the magnetic detector and the main terminals. Further, it is possible to reduce the size of the sensor assembly, because the structure is more simplified than in using a printed circuit board. Accordingly, it is possible to reduce the equipment expenses so as to lower the cost.

Further, a second invention is the rotational angle sensor as in the first invention, in which each connection terminal of the magnetic detector and the respective main terminals are connected by welding. According to the second invention constructed as above, each connection terminal of the magnetic detector and each main terminal are connected by welding. Thus, since the strength of the connection between each connection terminal of the magnetic detector and each main terminal is enhanced, it is possible to prevent or reduce disconnection caused by repeated temperature cycles. Additionally, it is possible to increase the reliability of the rotational angle sensor.

Further, a third invention is the rotational angle sensor as in the first or the second invention, in which the holder member is provided with guiding portions for guiding the magnetic detector to a predetermined assembled position. According to the third invention constructed as above, the guiding portions provided in the holder member may guide the magnetic detector to a predetermined assembled position. Thus, the magnetic detector can be easily and accurately assembled in the predetermined assembled position within the holder member. Thus, it is possible to facilitate assembling the magnetic detector and increase the detection accuracy and the reliability of the rotational angle sensor.

Further, a fourth invention is the rotational angle sensor as in any one of the first to the third inventions, in which a potting material is potted into the holder member so as to cover the magnetic detector and the connection portions between each connection terminal of the magnetic detector and the respective main terminals. According to the fourth invention constructed above, a potting material is potted into the holder member so as to cover the magnetic detector and the connection portions between each connection terminal of the magnetic detector and the respective main terminals. Thus, it is possible to prevent the intrusion of moisture to the electrically conductive portions so as to prevent or reduce the occurrence of shunt or short and migration. Additionally, when the potting material has flexibility, it is possible to protect the magnetic detector from thermal stress, vibrations and the like. Additionally, since no excess pressure is applied to the magnetic detector when it is potted, it is possible to avoid characteristic changes of the magnetic detector caused by the pressure. For these reasons, it is possible to increase the reliability of the rotational angle sensor. Further, when a printed circuit board is used, covering the printed circuit board requires plenty of potting material, but conversely, covering or molding the connection portions between each connection terminal of the magnetic detector and each main terminal with a potting material within a space surrounded by the holder member reduces the potting material used such that it is possible to lower the material cost for the potting material. Further, unlike in the case of integrally resin molding (primary molding) the magnetic detector and each wiring terminal (equivalent to a terminal integrally formed by a main terminal and a subterminal herein), it is possible to reduce the equipment expenses for a resin molding die so as to lower the cost. Further, it is possible to prevent or reduce defective moldings due to a displacement between the magnetic detector and each main terminal caused by molding pressure in resin molding, a deformation of each connection terminal of the magnetic detector and each main terminal and the like.

Further, a fifth invention is the rotational angle sensor as in the fourth invention, in which the rotational angle sensor is provided with capacitors as a preventive measure for discharge of positive charges, and the capacitors are connected between one and another of the respective main terminals and covered with the potting material. According to the fifth invention constructed as above, the capacitors as a preventive measure for discharge of positive charges are connected between one and another of the respective main terminals and covered with the potting material. Thus, the potting material may protect the capacitors from thermal stress, vibrations and the like. Further, since no excess pressure is applied to the capacitors when they are potted, it is possible to avoid disconnection, destruction and the like of the capacitors caused by the pressure. Accordingly, it is possible to increase the reliability of the rotational angle sensor.

Further, a sixth invention is the rotational angle sensor as in the fifth invention, in which the capacitors are disposed on the same side as the connection side of the respective main terminals connected with the magnetic detector. According to the sixth invention constructed as above, the capacitors are disposed on the same side as the connection side of the respective main terminals connected with the magnetic detector. Thus, it is possible to facilitate disposing the magnetic detector and the capacitors with respect to each main terminal.

Further, a seventh invention is the rotational angle sensor as in the fifth and sixth inventions, in which housed portions of the respective main terminals for connecting the magnetic detectors and the capacitors are formed in stepped manner with exposed portions of the respective main terminals for the external terminals, such that the exposed portions are disposed outside of the holder member, while the housed portions are housed with the magnetic detector and the capacitors in the holder member in such a manner that the housed portions are closer to the bottom in the holder member than the exposed portions. According to the seventh invention constructed as above, the housed portions of each main terminal for connecting the magnetic detectors and the capacitors are formed in stepped manner with exposed portions of each main terminal for the external terminals, such that the exposed portions are disposed outside of the holder member, while the housed portions are housed with the magnetic detector and the capacitors in the holder member in such a manner that the housed portions are closer to the bottom in the holder member than the exposed portions. Thus, it is possible to easily and securely pot the potting material against portions that need to be water-resistant for electrically conductive portions including the magnetic detectors and the capacitors. Accordingly, it is possible to prevent or reduce the occurrence of short caused in electrically conductive portions.

Further, an eighth invention is the rotational angle sensor as in the fifth to the seventh inventions, in which the capacitors are lead-type capacitors having leads. According to the eighth invention constructed as above, the capacitors are lead-type capacitors having leads. Thus, the leads of the capacitors can be retained by a jig for retaining the main terminals etc. Thus, since the capacitors are positioned, it is possible to prevent or reduce connection failures caused by displacement of the capacitors.

Further, a ninth invention is the rotational angle sensor of the eighth invention, in which the leads of the capacitors are connected with the capacitor connections of the main terminals by welding. According to the ninth invention constructed as above, the leads of the capacitors are connected with the capacitor connections of the main terminals by welding. Thus, since the strength of the connection between the leads of the capacitors and the capacitor connections of the main terminals is enhanced, it is possible to increase the reliability of the rotational angle sensor. Further, compared with soldering in a reflow furnace, welding enables simple welding facilities to be used without having to use an expensive reflow furnace, so as to lower the cost. Further, soldering might cause connection failures due to uneven amount of solder, while welding can securely connect the leads of the capacitors with the capacitor connections of the main terminals.

Further, a tenth invention is the rotational angle sensor as in the fourth invention, in which the magnetic detectors are housed in the holder member such that a bottom surface within the holder member is formed in a predetermined spaced relationship to the contour shape of the magnetic detectors facing to the bottom surface. According to the tenth invention constructed as above, the bottom surface within the holder member is formed in a predetermined spaced relationship to the contour shape of the magnetic detectors facing to the bottom surface. Thus; a potting material can easily flow into a gap between the bottom surface within the holder member and the magnetic detectors, i.e., a region prone to voids when the potting material is potted, such that it is possible to inhibit void generation so as to prevent or reduce defective moldings.

Further, an eleventh invention is the rotational angle sensor of any one of the first to the tenth inventions, in which the rotational angle sensor is provided with a resin molded body, which is resin molded in such a manner that the sensor assembly is insert molded with subterminals, which are connected to the terminal connections of the respective main terminals and connectable with terminal pins of an external connector. According to the eleventh invention constructed as above, a resin molded body is provided, which is resin molded in such a manner that the sensor assembly is insert molded with subterminals, which are connected to the terminal connections of the respective main terminals and connectable with terminal pins of an external connector. Thus, it is possible to easily dispose the sensor assembly and the subterminals to the resin molded body. Further, since the main terminals and the subterminals of the sensor assembly are configured to be connected, it is possible to use a common sensor assembly for resin molded bodies different in the connection positions and the connection directions of the external connector, the wire routings of the subterminals and the like.

Further, a twelfth invention is the rotational angle sensor as in the eleventh invention, in which the holder member includes sidewalls, which is provided with reinforcing ribs for inhibiting deformation of the sidewalls caused by molding pressure when the resin molded body is resin molded. According to the twelfth invention constructed as above, the reinforcing ribs provided on the sidewalls included in the holder member can inhibit deformation of the sidewalls caused by molding pressure when the resin molded body is resin molded. Thus, it is possible to prevent or reduce defective moldings caused by deformation of the sidewalls of the holder member when molding pressure is applied during the resin molding of the resin molded body.

Further, a thirteenth invention is the rotational angle sensor of the eleventh or the twelfth invention, in which the holder member is provided on an outer surface thereof with a stepped surface intersecting an axis such that a resin portion of the resin molded body surrounding the holder member is prevented from burring on the same plane as the stepped surface. According to the thirteenth invention constructed as above, the resin portion of the resin molded body surrounding the holder member is prevented from burring on the game plane as the stepped surface. Thus, it is possible to inhibit burr generation, while high dimensional accuracy is not required between the holder member and the resin molding die for the resin-molded body. Therefore, it is possible to lower the cost for ensuring the dimensional accuracy of the holder member.

Further, a fourteenth invention is the rotational angle sensor as in the thirteenth invention, in which the stepped surface of the holder member is provided with retaining recesses, into which the resin portion of the resin molded body flows. According to the fourteenth invention constructed as above, the stepped surface of the holder member is provided with retaining recesses, into which the resin portion of the resin molded body flows. Thus, since the resin portion of the resin molded body flows into the retaining recesses of the holder member, it is possible to retain the holder member on the resin-molded body.

Further, a fifteenth invention is a method for manufacturing a rotational angle sensor including a magnetic detector for detecting a rotational angle of a rotor based on a magnetic field generated between a pair of magnets respectively disposed across the rotational axis of the rotor, each main terminal connected with each connection terminal of the magnetic detector, and a holder member for housing the magnetic detector and magnetic-detector-side connection portions of the respective main terminals, the method comprising the steps of: press molding an electrically conductive sheet stock so as to form a main terminal unit in which the respective main terminals are connected via tie bars; connecting each connection terminal of the magnetic detector with the main terminal unit so as to form a main terminal assembly; disposing the magnetic detector of the main terminal assembly and the magnetic-detector-side connection portions of the respective main terminals to be housed into the holder member; and removing the tie bars from the main terminal unit. According to the method of the fifteenth invention for manufacturing the rotational angle sensor, press molding a sheet stock so as to form a main terminal unit enables each main terminal to be accurately molded. Further, connecting each connection terminal of the magnetic detector with the main terminal unit so as to form a main terminal assembly enables each connection terminal of the magnetic detector to be accurately connected to each main terminal. Further, disposing the magnetic detector of the main terminal assembly and the magnetic-detector-side connection portions of the respective main terminals to be housed into the holder member enables the magnetic detector to be easily disposed in position within the holder member in such a way that the magnetic detector is supported on the main terminal assembly. Further, removing the tie bars from the main terminal unit enables each main terminal to be easily formed separately. Therefore, the rotational angle sensor of the first invention can be reasonably manufactured.

Further, a sixteenth invention is the method of the fifteenth invention for manufacturing the rotational angle sensor, in which the connections between the main terminal unit and the respective connection terminals of the magnetic detector are disposed in a row, while a welding head for welding each connection terminal of the magnetic detector and the respective main terminals at the connections is sequentially moved in the row direction as performing the welding. According to the sixteenth invention constructed as above, the connections between the main terminal unit and the respective connection terminals of the magnetic detector are disposed in a row, while the welding head can be sequentially moved in the row direction as each connection terminal of the magnetic detector is welded with each main terminal. Therefore, since the movement of the welding head of the welding facility can be simplified, it is possible to use a simple welding facility so as to lower the cost.

Further, a seventeenth invention is a throttle control device for driving a throttle valve, which rotatably opens and closes an intake air passageway provided in a throttle body by a motor, so as to control intake air flow flowing through the intake air passageway, in which the throttle control device includes any one of the rotational angle sensors of the first to the fourteenth inventions so as to be constructed to detect opening degrees of the throttle valve. According to the throttle control device of the seventeenth invention constructed as above, the throttle control device is constructed to include any one of the rotational angle sensors of the first to the fourteenth inventions so as to detect opening degrees of the throttle valve. Therefore, it is possible to provide a throttle control device including a rotational angle sensor that can lower the cost.

BRIEF DESCRIPTION OF THE DRAWINGS

FIG. 18 is a front view showing a sensor assembly;

FIG. 19 is a cross-sectional view taken along line C-C in FIG. 18;

FIG. 20 is a rear view showing the sensor assembly;

FIG. 65 is a front view showing a holder member;

FIG. 66 is a cross-sectional view taken along line M-M in FIG. 65;

FIG. 67 is a rear view showing the holder member;

DETAILED DESCRIPTION OF THE INVENTION

Referring now to embodiments, a best mode for carrying out the present invention will be described.

First Embodiment

A first embodiment of the invention will be described. It should be noted that this embodiment illustrates a rotational angle sensor used as a throttle sensor for detecting a rotational angle of a throttle valve of an electronically-control-type throttle control device, more particularly a rotational angle of a throttle shaft to which the throttle valve is attached.

Figure 1:
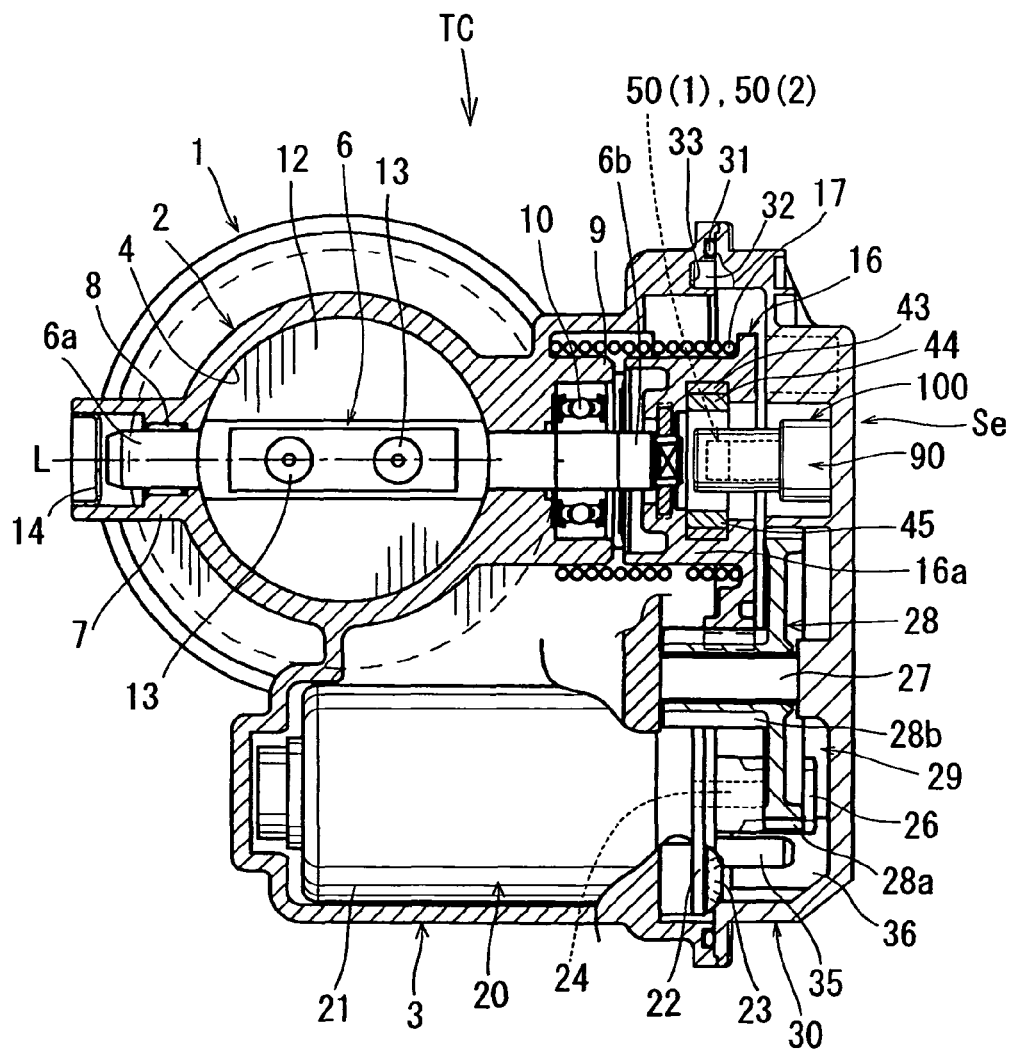
FIG. 1 is a cross-sectional plan view of a throttle control device, showing a first embodiment of the present invention.

The electronically-control-type throttle control device will firstly be described. As shown in FIG. 1, this throttle control device TC includes a throttle body 1 made of resin such as PBT. The throttle body 1 includes a bore wall portion 2 and a motor housing portion 3 that are integrated with each other. The bore wall portion 2 forms a substantially cylindrical intake air passageway 4, which passes orthogonal to the plane of the drawing as viewed in FIG. 1. Although not shown in the drawings, an air cleaner is connected to an upstream side of the bore wall portion 2 of the throttle body 1, while an intake manifold is connected to a downstream side of the bore wall portion 2.

A metal throttle shaft 6, which extends across the intake air passageway 4 in the diametrical direction, is disposed in the bore wall portion 2. A left-side support portion 7, which is integrally formed in the bore wall portion 2, rotatably supports one end 6a (the left end portion as viewed in FIG. 1) of the throttle shaft 6 via a bearing 8. Further, a support portion 9, which is integrally formed in the bore wall portion 2 on the right side, rotatably supports the other end (the right end portion as viewed in FIG. 1) of the throttle shaft 6 via a bearing 10. Further, a throttle valve 12, which can rotatably open and close the intake air passageway 4, is secured to the throttle shaft 6, for example, via rivets 13. The throttle valve 12 controls an intake air flow flowing through the intake air passageway 4 by opening and closing the intake air passageway 4 when driven by a motor 20 (later described).

The left-side support portion 7 is fitted with a plug 14 sealing the opening end thereof. Further, the right end 6b of the throttle shaft 6 passes through the support portion 9. A throttle gear 16, which is configured as a sector gear, for example, made of resin, is rotationally locked to be secured to the right end 6b of the throttle shaft 6. Further, a return spring 17 is provided between the throttle body 1 and the throttle gear 16. The return spring 17 constantly biases the throttle gear 16 in the closing direction of the throttle valve 12. It should be noted that a stopper member, not shown in the drawings, is provided between the throttle body 1 and the throttle gear 16 so as to stop the throttle valve 12 at a predetermined closed position.

The motor housing portion 3 of the throttle body 1 is formed as a substantially cylindrical, closed-end tube that extends parallel to the rotational axis L of the throttle shaft 6 and opens at the right end surface as viewed in FIG. 1. The motor 20 consisting of such as a DC motor is inserted into the motor housing portion 3. The shell of the motor 20 is formed by a motor case 21, which is provided with a mounting flange 22 secured by a screw 23 to the opened end of the motor housing portion 3.

An output shaft 24, which projects to the right side of the motor 20 as viewed in FIG. 1, is provided with a motor pinion 26, for example, made of resin. Further, the throttle body 1 is provided with a counter shaft 27 that extends parallel to the rotational axis L of the throttle shaft 6. The counter shaft 27 rotatably supports a counter gear 28, for example, made of resin. The counter gear 27 includes gears with different diameters, a larger one of which is a gear portion 28a and a smaller one a gear portion 28b. The larger-diameter gear portion 28a engages the motor pinion 26, while the smaller-diameter gear portion 28b engages the throttle gear 16. It should be noted that the throttle gear 16, the motor pinion 26 and the counter gear 28 form a speed-reduction gear mechanism 29.

One lateral surface (the right-side surface as viewed in FIG. 1) of the throttle body 1 is coupled with a cover 30, for example, made of resin such as PBT. The cover 30 covers the speed-reduction gear mechanism 29 and the like. Further, an O-ring 31 is interposed between the throttle body 1 and the cover 30 so as to maintain a hermetic seal of the inside. Further, pin portions 32 project from the mating surface of the cover 30 against the throttle body 1. Further, the mating surface of the throttle body 1 against the cover 30 is provided with receiving portions 33, into which the pin portions 32 are engageable. When the pin portions 32 engage into the receiving portions 33, the throttle body 1 and the cover 30 are positioned in place. It should be noted that the cover 30 is equivalent to the "resin molded body" herein.

Figure 2:
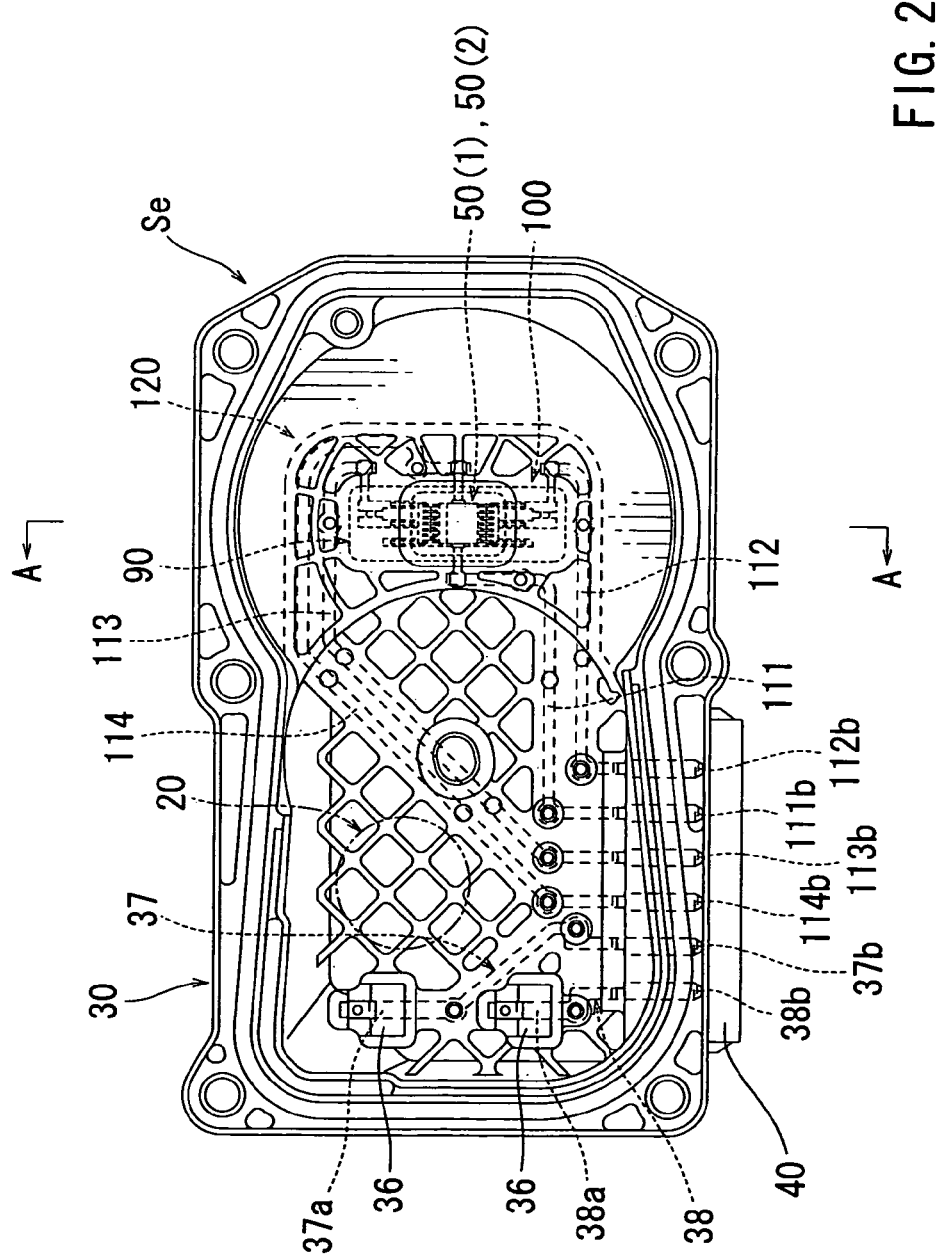
FIG. 2 is a rear view showing a cover.
Figure 28:
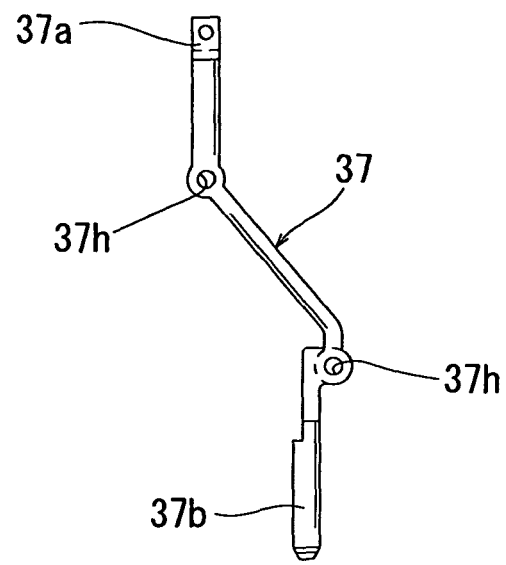
FIG. 28 is a front view showing a first plate terminal.
Figure 29:
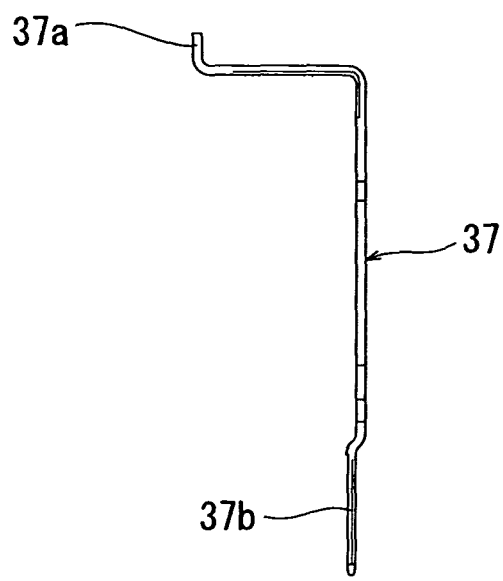
FIG. 29 is a right side view showing the first plate terminal.
Figure 30:
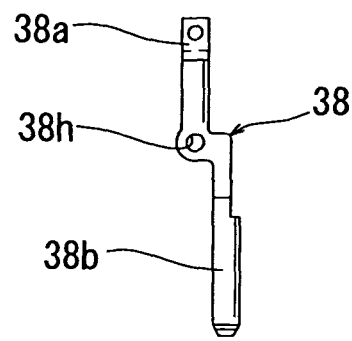
FIG. 30 is a front view showing a second plate terminal.
Figure 31:
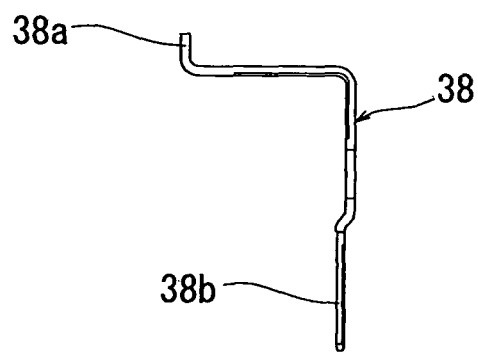
FIG. 31 is a right side view showing the second plate terminal.

The motor 20 includes two motor terminals 35 (only one of which is shown in FIG. 1), which are respectively connected with relay connectors 36 provided in the cover 30 (see FIG. 2). One (the upper side as viewed in FIG. 2) of the relay connectors 36 is connected with a connector connection end 37a of a first plate terminal 37, which is insert molded or inserted to be resin molded into the cover 30. Further, the other (the lower side as viewed in FIG. 2) of the relay connectors 36 is connected with a connector connection end 38a of a second plate terminal 38, which is insert molded or inserted to be resin molded into the cover 30. It should be noted that FIG. 28 is a front view showing the first plate terminal 37, while FIG. 29 is a right side view showing the same. Further, FIG. 30 is a front view showing the second plate terminal 38, while FIG. 31 is a right side view showing the same. Further, the outer surface of each plate terminal 37, 38 is plated with Ni (not shown).

Further, as shown in FIG. 2, an external connection end 37b, 38b of each plate terminal 37, 38 projects into a substantially horizontally rectangular cylinder shaped connector portion 40, which is formed in a predetermined portion (the lower portion as viewed in FIG. 2) of the cover 30. Further, the connector portion 40 of the cover 30 is connectable with an unshown external connector. Further, the external connection end 37b, 38b of the plate terminals 37, 38, and external connection ends 111b, 112b, 113b, 114b of the sensor terminals 111, 112, 113, 114 that will be later described, are connectable both with the external connector (not shown) for the connector portion 40 and with each terminal pin (not shown) within the external connector.

Referring to FIG. 1, the drive of the motor 20 is controlled by a control means such as an engine control unit, or the so-called ECU, of the automobile, in response to accelerator signals representing the amount of depression of an accelerator pedal, traction control signals, constant-speed signals and idling speed control signals. Further, driving forces of the output shaft 24 of the motor 20 are transferred from the motor pinion 26 to the throttle shaft 6 via the counter gear 28 and the throttle gear 16 so as to open and close the throttle valve 12.

The throttle gear 16 is provided with a substantially cylindrical tubular portion 16a. The tubular portion 16a is concentric with the throttle shaft 6. The inner peripheral surface of the tubular portion 16a is provided with a yoke 43 made of a ring-shaped magnetic material, which is insert molded or inserted to be resin molded in the tubular portion 16a, so as to be concentric with the throttle shaft 6. It should be noted that the throttle gear 16 is equivalent to the "rotor" herein.

The inner surface of the throttle gear 16 is provided with a pair of magnets 44, 45 generating magnetic fields. The magnets 44, 45 are disposed in line symmetry with the rotational axis L of the throttle shaft 6 such that the magnets 44, 45 and the yoke 43 are insert molded or inserted to be resin molded in the throttle gear 16. The pair of magnets 44, 45, which consist of such as ferrite magnets, are formed in arc shape along with the inner surface of the yoke 43 (see two-dot chain lines 44, 45 in FIG. 22). Further, the pair of magnets 44, 45 are parallel magnetized such that the magnetic lines, or magnetic fields, generated between both are formed in a parallel relationship, and thereby substantially parallel magnetic fields are generated in the space defined within the yoke 43. It should be noted that the ferrite magnets forming the pair of magnets 44, 45 could be easily formed in arc shape because the ferrite magnets are softer and higher in toughness than rare-earth magnets, and also inexpensive because the material costs less.

Figure 26:
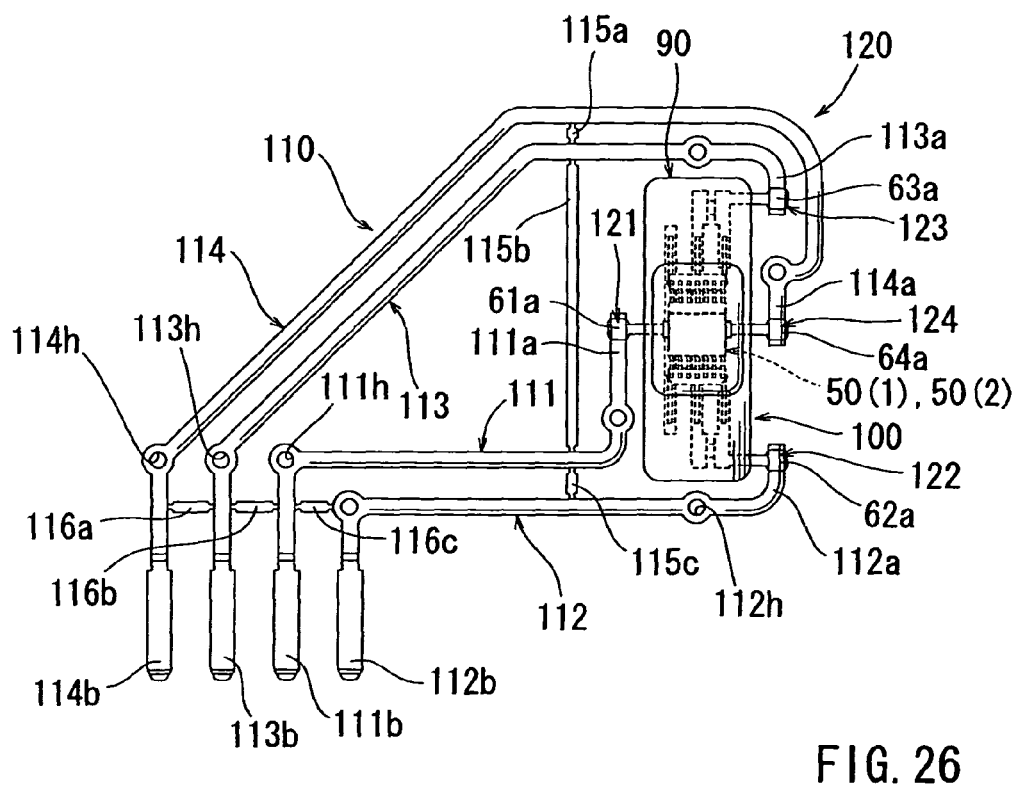
FIG. 26 is a front view showing a sensor terminal assembly.

Then, as shown in FIG. 2, the relay connectors 36 and the plate terminals 37, 38, as well as a sensor terminal assembly 120 (later described, see FIG. 27), are insert molded or inserted to be resin molded into the cover 30. Further, as shown in FIG. 26, the sensor terminal assembly 120 consists of the sensor assembly 100 and the sensor terminal unit 110. The sensor terminal assembly 120 is formed when each tie bar 115a, 115b, 115c, 116a, 116b, 116c (later described) is removed from the sensor terminal unit 110 (see FIG. 27). Further, as shown in FIGS. 18 to 20, the sensor assembly 100 consists of the main terminal assembly 70 and the holder member 90. The sensor assembly 100 is formed when each tie bar 65, 66, 67, 68, (later described) is removed from the main terminal assembly 70 (see FIGS. 22 to 24).

Figure 21:
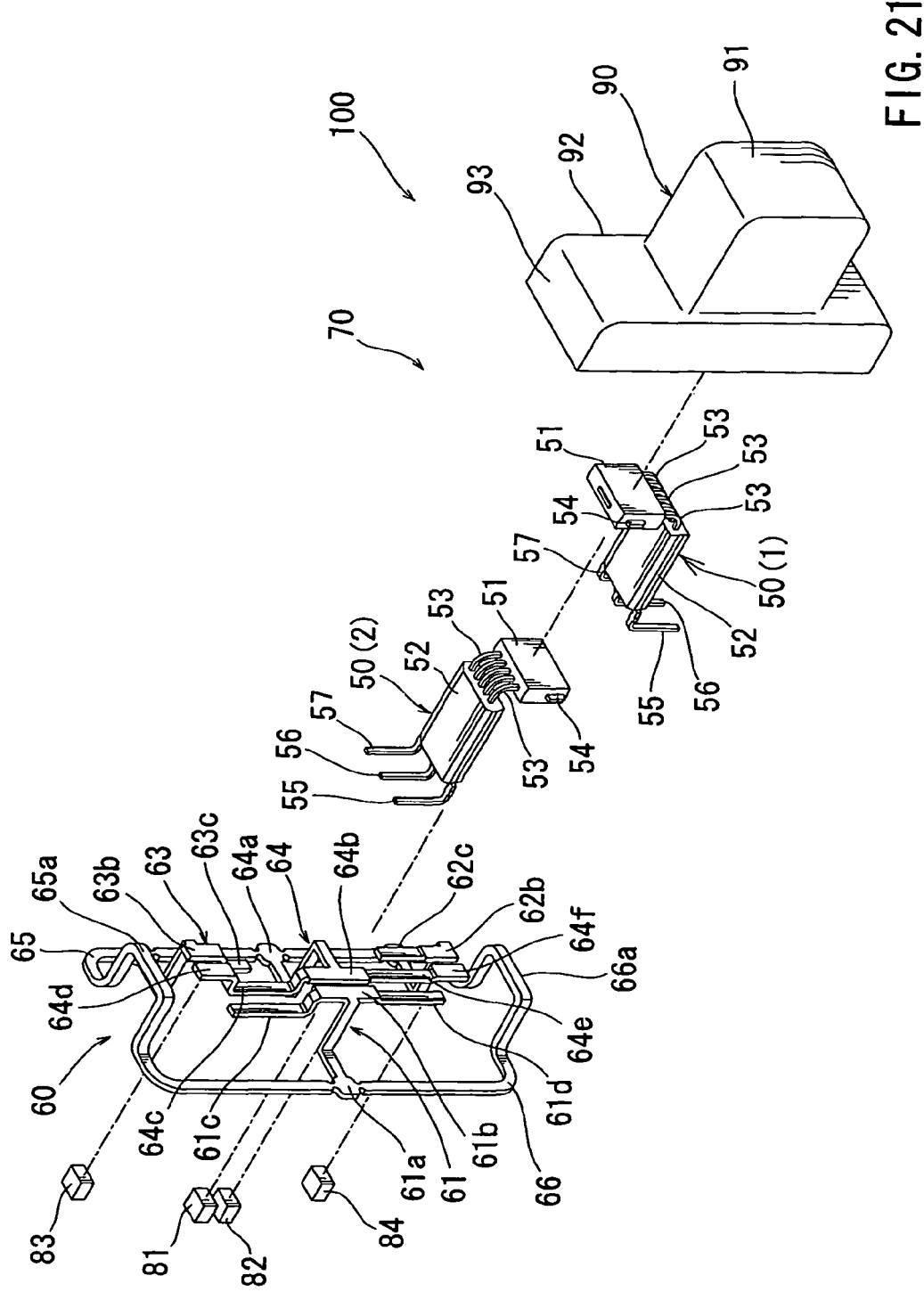
FIG. 21 is an exploded perspective view showing components of the sensor assembly.

For convenience of description, the main terminal assembly 70, the holder member 90, the sensor assembly 100, the sensor terminal unit 110, the sensor terminal assembly 120 and the cover 30 will be described below in this order. It should be noted that the components of the sensor assembly 100 are shown in FIG. 21 in an exploded perspective view. Further, in this embodiment, the main terminal assembly 70, the holder member 90, the sensor assembly 100, the sensor terminal unit 110 and the sensor terminal assembly 120 are described in such a way that the reverse side (the left side as viewed in FIG. 1) of the cover 30 is regarded as the forward side (the front side), while the front side (the right side as viewed in FIG. 1) of the cover 30 is regarded as the back side (rear side).

Figure 6:
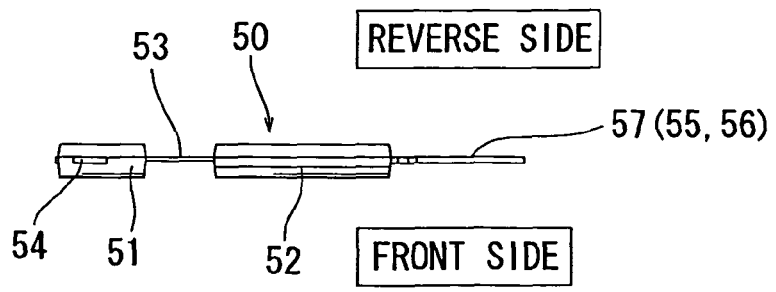
FIG. 6 is a side view showing a sensor IC.
Figure 7:
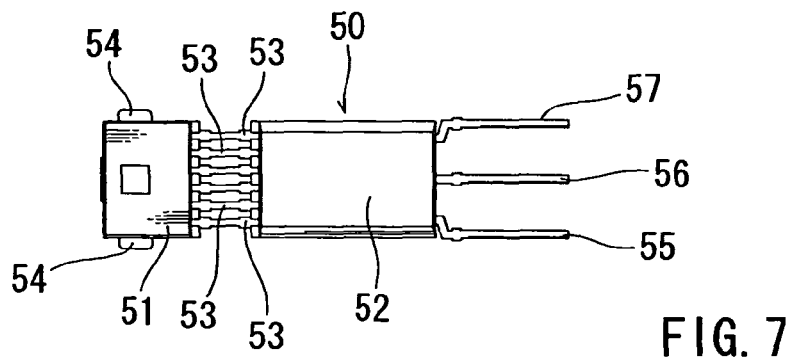
FIG. 7 is a front view showing the sensor IC.
Figure 13:
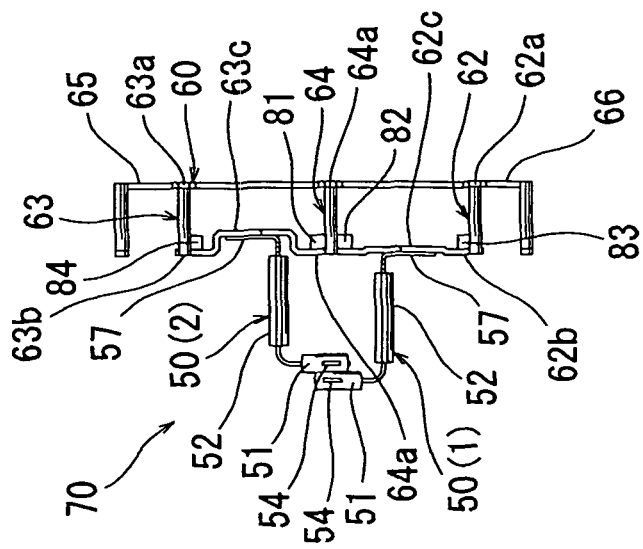
FIG. 13 is a right side view showing a main terminal assembly.
Figure 14:
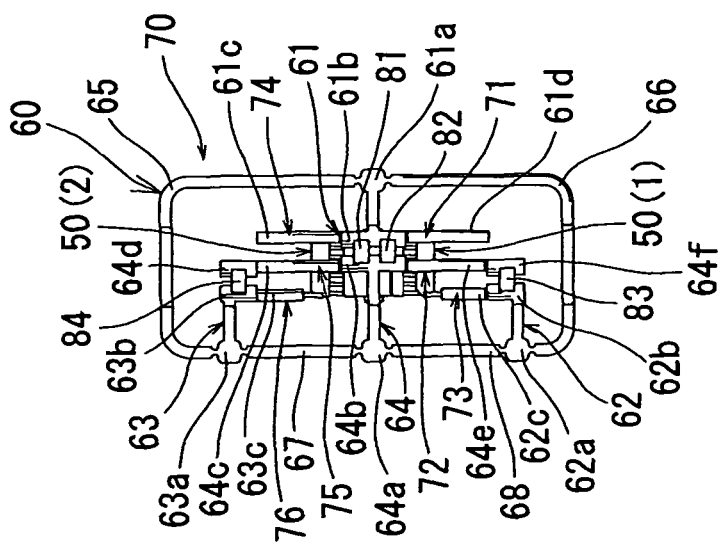
FIG. 14 is a rear view showing the main terminal assembly.

Firstly, the main terminal assembly 70 will be described. It should be noted that FIG. 13 is a side view showing the main terminal assembly 70; and FIG. 14 is a rear view showing the same. As shown in FIGS. 13 and 14, the main terminal assembly 70 consists of two sensor ICs 50(1), 50(2), one main terminal unit 60 and four capacitors 81, 82, 83, 84 (see FIG. 21). Two of the same sensor ICs 50 are used as the two sensor ICs 50(1), 50(2). As shown in FIGS. 6 and 7, the sensor IC 50 includes a magnetic sensing portion 51 and a computing portion, which is arranged in the rear (the right side as viewed in FIGS. 6 and 7) of the magnetic sensing portion 51. The magnetic sensing portion 51 is configured in a substantially square plate shape, while the computing portion is configured in a substantially rectangular plate shape. The magnetic sensing portion 51 and the computing portion 52 are electrically connected with each other by, for example, six connecting terminals 53 (see FIG. 7). The magnetic sensing portion 51 includes magnetoresistive elements embedded in a shell, for example, made of resin. Further, both the left and the right sides of the shell of the magnetic sensing portion 51 are provided with metal positioning pieces 54, which project symmetrically from both the left and right sides (symmetrically about the left-right axis as viewed in FIG. 7). When the sensor ICs 50 are injection molded, these positioning pieces 54 are retained in the die as positioning pieces of the magnetoresistive elements. Further, the computing portion 52 includes an input connection terminal. 55, a ground connection terminal 56 and an output connection terminal 57 projecting parallel to each other and rearward (rightward as viewed in FIG. 7). It should be noted that, the sensor IC 50 is equivalent to the "magnetic detector" herein.

Figure 8:
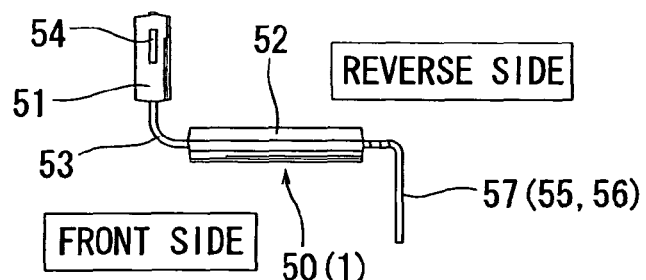
FIG. 8 is a side view showing a first sensor IC.
Figure 9:
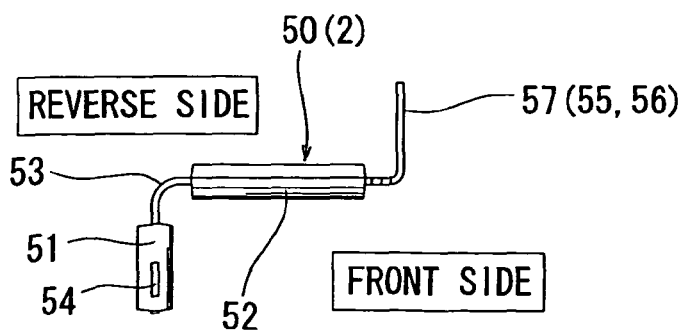
FIG. 9 is a side view showing a second sensor IC.

As shown in FIG. 8, one of the two sensor ICs 50 is formed as a first sensor IC 50(1), the connecting terminals 53 of which are folded such that the magnetic sensing portion 51 is inclined toward the reverse side (upward as viewed in FIG. 8) at an angle of approximately 90 degrees. Each connection terminal 55, 56, 57 of the first sensor IC 50(1) is folded toward the front side (downward as viewed in FIG. 8) at an angle of approximately 90 degrees (see FIG. 21). Further, as shown in FIG. 9, the other sensor IC 50 is formed as a second sensor IC 50(2), the connecting terminals 53 of which are folded such that the magnetic sensing portion 51 is inclined toward the front side (downward as viewed in FIG. 9) at an angle of approximately 90 degrees. Each connection terminal 55, 56, 57 of the second sensor IC 50(2) is folded toward the reverse side (upward as viewed in FIG. 9) at an angle of approximately 90 degrees (see FIG. 21).

Figure 10:
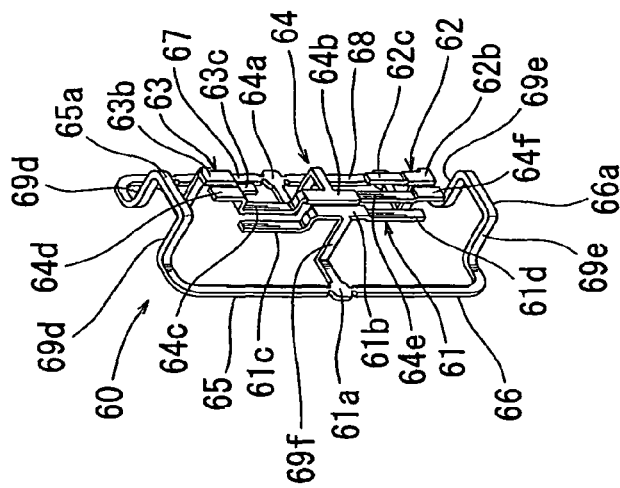
FIG. 10 is a perspective view showing a main terminal unit.
Figure 11:
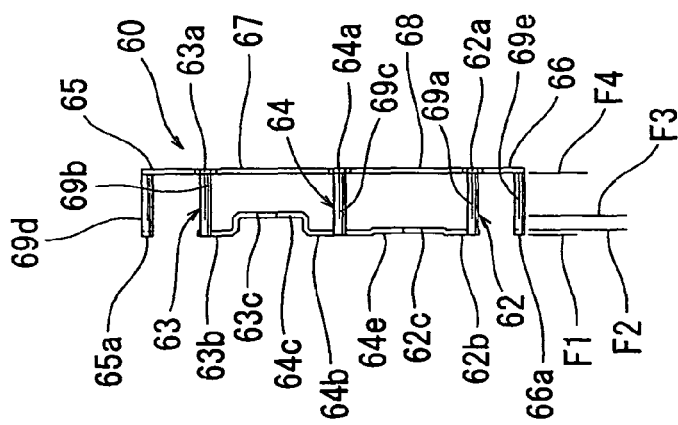
FIG. 11 is a right side view showing the main terminal unit.
Figure 12:
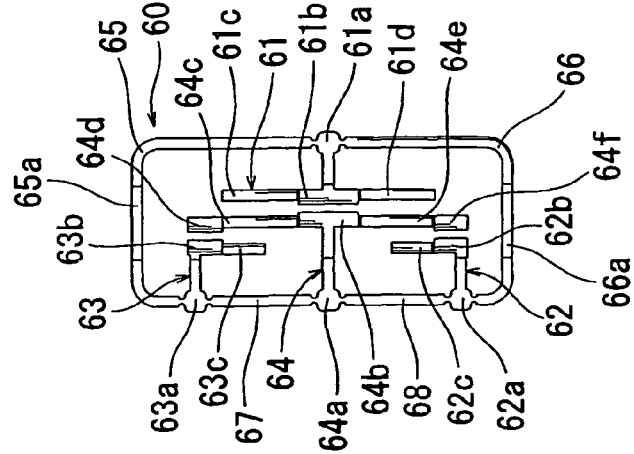
FIG. 12 is a rear view showing the main terminal unit.

Next, the main terminal unit 60 will be described. It should be noted that FIG. 10 is a perspective view showing the main terminal unit 60; FIG. 11 is a side view showing the same; and FIG. 12 is a rear view showing the same. The main terminal unit 60 is formed by press molding an electrically conductive sheet stock such as a copper alloy plate. As shown in FIG. 12, the main terminal unit 60 includes a signal input (referred to as Vc hereafter) main terminal 61, a signal output (referred to as V1 hereafter) main terminal 62, a signal output (referred to as V2 hereafter) main terminal 63, and a ground (referred to as GND hereafter) main terminal 64. Terminal connections 61a, 62a, 63a, 64a (later described) of the main terminals 61, 62, 63, 64 are connected with each other by tie bars 65, 66, 67, 68, which form a substantially square frame-like shape.

More specifically, referring to FIG. 12, the Vc main terminal 61 includes the terminal connection 61a disposed in the middle portion on the right side of the main terminal unit 60. Further, the V1 main terminal 62 includes the terminal connection 62a disposed in the lower portion on the left side. Further, the V2 main terminal 63 includes the terminal connection 63a disposed in the upper portion on the left side. Further, the GND main terminal 64 includes the terminal connection 64a disposed in the middle portion on the left side. Then, the upper tie bar 65 is configured in a substantially inverted-U-shape so as to connect the terminal connection 61a disposed in the middle portion on the right side with the terminal connection 63a disposed in the upper portion on the left side. Further, the lower tie bar 65 is configured in a substantially U-shape so as to connect the terminal connection 61a disposed in the middle portion on the right side with the terminal connection 62a disposed in the lower portion on the left side. Further, the upper left tie bar 67 is configured in a straight line so as to connect the terminal connection 63a disposed in the upper portion on the left side with the terminal connection 64a disposed in the middle portion on the left side. Further, the lower left tie bar 68 is configured in a straight line extending downwardly and serially from the upper left tie bar 67, so as to connect the terminal connection 62a disposed in the lower portion on the left side with the terminal connection 64a disposed in the middle portion on the left side.

Referring to FIG. 12, the Vc main terminal 61 includes the terminal connection 61a, as well as a capacitor connection 61b, an upper IC terminal connection 61c and a lower IC terminal connection 61d. The capacitor connection 61b is provided at the left end of the terminal connection 61a. Further, the upper IC terminal connection 61c extends upward from the capacitor connection 61b. Further, the lower IC terminal connection 61d extends downward from the capacitor connection 61b.

Further, the V1 main terminal 62 includes the terminal connection 62a, as well as a capacitor connection 62b and an IC terminal connection 62c. The capacitor connection 62b is provided at the right end of the terminal connection 62a. Further, the IC terminal connection 62c extends upward from the capacitor connection 62b.

Further, the V2 main terminal 63, which includes the terminal connection 63a, as well as a capacitor connection 63b and an IC terminal connection 63c, is formed symmetrically about the V1 main terminal 62 as the left-right axis. Thus, the capacitor connection 63b is provided at the right end of the terminal connection 63a. Further, the IC terminal connection 63c extends downward from the capacitor connection 63b.

Further, the GND main terminal 64 includes the terminal connection 64a, as well as a middle capacitor connection 64b, an upper IC terminal connection 64c, an upper capacitor connection 64d, a lower IC terminal connection 64e and a lower capacitor connection 61f. The middle capacitor connection 64b is provided at the right end of the terminal connection 64a. Further, the upper IC terminal connection 64c extends upward from the capacitor connection 64b so as to be parallel to and between the upper IC terminal connection 61c of the Vc main terminal 61 and the IC terminal connection 63c of the V2 main terminal 63. Further, the upper capacitor connection 64d is provided at the upper end of the upper IC terminal connection 64c. Further, the lower IC terminal connection 64e extends downward from the middle capacitor connection 64b so as to be parallel to and between the upper IC terminal connection 61c of the Vc main terminal 61 and the IC terminal connection 63c of the V2 main terminal 63. Further, the lower capacitor connection 64f is provided at the lower end of the lower IC terminal connection 64e.

Thus, the respective capacitor connections 61b, 62b, 63b, 64d, 64f (see FIG. 12) are provided on the same plane F1 (see FIG. 11). Further, each IC terminal connection 61d, 62c, 64e (see FIG. 12) on the lower side is provided on the same plane F2, which is displaced slightly rearward from plane F1 (rightward as viewed in FIG. 11). Further, each IC terminal connection 61c, 63c, 64c (see FIG. 12) on the upper side is provided on the same plane F3, which is displaced further rearward from plane F2 (rightward as viewed in FIG. 11). Further, the external ends of the terminal connections 61a, 62a, 63a, 64a (see FIG. 12) and each tie bar 65, 66, 67, 68 are provided on the same plane F4, which is displaced further rearward from plane F3 (rightward as viewed in FIG. 11).

Further, as shown in FIG. 10, the middle portion of the top of the upper tie bar 65 is provided with a stepped portion 65a, which is disposed upward from each IC terminal connection 61c, 63c, 64c on the upper side. Further, the middle portion of the bottom of the lower tie bar 66 is provided with a stepped portion 66a, which is disposed downward from each IC terminal connection 61d, 62c, 64e on the lower side. Further, both of the stepped portions 65a, 66a are provided on the same plane F1 (see FIG. 11), on which the respective capacitor connections 61b, 62b, 63b, 64b, 64d, 64f are provided.

As described above, since each portion is provided on predetermined planes F1, F2, F3, F4, the interconnection between these portions is provided with a folded portion, which extends from the front to the reverse. Thus, referring to FIG. 11, the terminal connection 62a and the capacitor connection 62b of the V1 main terminal 62 are formed in a stepped shape via a folded portion 69a. Further, the terminal connection 63a and the capacitor connection 63b of the V2 main terminal 63 are formed in a stepped shape via a folded portion 69b. Further, the terminal connection 64a and the capacitor connection 64b of the GND main terminal 64 are formed in a stepped shape via a folded portion 69c. Further, the terminal connection 61a and the capacitor connection 61b of the Vc main terminal 61 are formed in a stepped shape via a folded portion 69f (see FIG. 10). Further, the upper tie bar 65 is provided with a stepped portion 65a via both folded portions 69d on the left and the right sides. Further, the lower tie bar 66 is provided with a stepped portion 66a via both folded portions 69e on the left and the right sides. It should be noted that the outer surface of the main terminal unit 60 is plated with Ni (not shown).

It should be noted that each IC terminal connection 61c, 61d, 62c, 63c, 64c, 64e of the main terminals 61, 62, 63, 64 is equivalent to the "magnetic-detector-side connection portion" herein. Further, each capacitor connection 61b, 62b, 63b, 64b, 64d, 64f, and each IC terminal connection 61c, 61d, 62c, 63c, 64c, 64e are equivalent to the "housed portions" herein. Further, the external end of each terminal connection 61a, 62a, 63a, 64a is equivalent to the "exposed portion" herein. Then, the housed portion and the exposed portion are formed in a stepped shape via each folded portion 69a, 69b, 69c, 69f.

Next, the main terminal assembly 70 will be described. As shown in FIGS. 13 and 14, the main terminal assembly 70 is configured such that the main terminal unit 60 is implemented with the respective sensor ICs 50(1), 50(2) and the capacitors 81, 82, 83, 84 (see FIG. 21). Thus, the first sensor IC 50(1) and the second sensor IC 50(2) are oppositely disposed on the front (forward) of the main terminal unit 60, such that the magnetic sensing portion 51 of the second sensor IC 50(2) is overlapped against the reverse side (the right side as viewed in FIG. 13) of the magnetic sensing portion 51 of the first sensor IC 50(1). Under these conditions, the input connection terminal 55 of the first sensor IC 50(1) is electrically connected with the lower IC terminal connection 61d of the Vc main terminal 61 of the main terminal unit 60 by welding (the welded portion is designated as 71 in FIG. 14). Further, the ground connection terminal 56 of the first sensor IC 50(1) is electrically connected with the lower IC terminal connection 64e of the GND main terminal 64 of the main terminal unit 60 by welding (the welded portion is designated as 72 in FIG. 14). Further, the output connection terminal 57 of the first sensor IC 50(1) is electrically connected with the IC terminal connection 62c of the V1 main terminal 62 of the main terminal unit 60 by welding (the welded portion is designated as 73 in FIG. 14).

Further, the input connection terminal 55 of the second sensor IC 50(2) is electrically connected with the upper IC terminal connection 61c of the Vc main terminal 61 of the main terminal unit 60 by welding (the welded portion is designated as 74 in FIG. 14). Further, the ground connection terminal 56 of the second sensor IC 50(2) is electrically connected with the upper IC terminal connection 64c of the GND main terminal 64 of the main terminal unit 60 by welding (the welded portion is designated as 75 in FIG. 14). Further, the output connection terminal 57 of the second sensor IC 50(2) is electrically connected with the IC terminal connection 63c of the V2 main terminal 63 of the main terminal unit 60 by welding (the welded portion is designated as 76 in FIG. 14). It should be noted that the respective welded portions 71 to 76 might be welded, for example, by projection welding.

Further, as shown in FIG. 14, the first capacitor 81 and the second capacitor 82 are connected electrically and parallel in the left-right direction by soldering between the capacitor connection 61b of the Vc main terminal 61 and the middle capacitor connection 64b of the GND main terminal 64 on the reverse of the main terminal unit 60. Further, a third capacitor 83 is electrically connected by soldering between the capacitor connection 62b of the V1 main terminal 62 and the lower capacitor connection 64f of the GND main terminal 64. Further, a fourth capacitor 84 is electrically connected by soldering between the capacitor connection 63b of the V2 main terminal 63 and the upper capacitor connection 64d of the GND main terminal 64. It should be noted that each capacitor 81, 82, 83, 84 serves as a preventive measure for discharge of positive charges such that high voltages due to static electricity may not be applied to the respective sensor ICs 50(1), 50(2). Further, chip-type capacitors or so-called chip capacitors are used for the capacitors 81, 82, 83, 84 of this embodiment.

Figure 15:
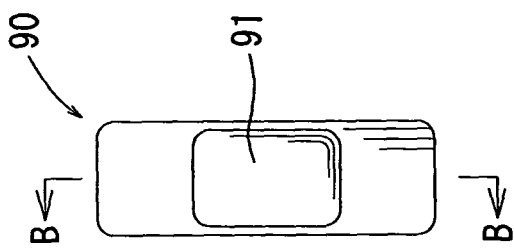
FIG. 15 is a front view showing a holder member.
Figure 16:
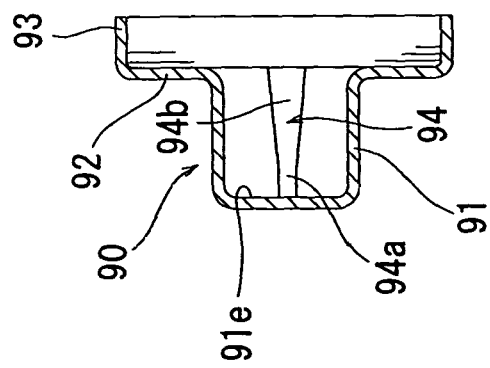
FIG. 16 is a cross-sectional view taken along line B-B in FIG. 15.
Figure 17:
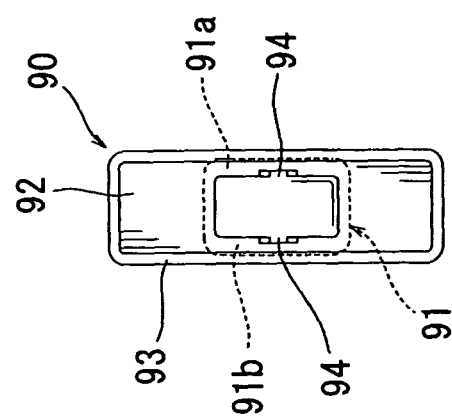
FIG. 17 is a rear view showing the holder member.

Next, the holder member 90 will be described. It should be noted that FIG. 15 is a front view showing the holder member 90; FIG. 16 is a cross-sectional view taken along line B-B in FIG. 15; and FIG. 17 is a rear view showing the holder member 90. The holder member 90, which is, for example, made of resin, is configured to mainly have a closed-end rectangular cylinder shaped hollow tube portion 91 that closes the front side and opens the rear side (see FIG. 16). The rear side (the right side in FIG. 16) of the hollow tube portion 91 is provided continuously with an enlarged tube portion 93 such that the opening is enlarged via an intermediate end plate portion 92.

Guiding grooves 94 are provided in the middle portion of the opposed wall surfaces of both the left and the right sidewalls 91a, 91b (see FIG. 17) of the hollow tube portion 91 in such a manner that the grooves 94 extend in the front-rear direction (the left-right direction in FIG. 16). It should be noted that the guiding grooves 94 are equivalent to the "guiding portions" herein. More specifically, referring to FIG. 16, the bottom ends of the guiding grooves 94 (the ends on the bottom end surface 91e side of the hollow tube portion 91) are formed as positioning grooves 94a, the widths (the widths extending in the up-down direction in FIG. 16) of which are configured to receive the positioning pieces 54 (see FIG. 7) projecting from both the left and the right sides of the magnetic sensing portions 51 (see FIG. 13) of the sensor ICs 50(1), 50(2). Further, the portions extending from the positioning grooves 94a of the guiding grooves 94 to the opening end surface of the hollow tube portion 91 are formed as tapered grooves 94b, the widths (the widths extending in the up-down direction in FIG. 16) of which are configured in a tapered shape so as to be gradually enlarged from the positioning grooves 94a to the opening end surface of the hollow tube portion 91. Further, the spacing defined between both the left and the right sidewalls 91a, 91b of the hollow tube portion 91 (see FIG. 17) is configured to be slightly wider than the width (the width extending in the up-down direction in FIG. 7) of the magnetic sensing portion 51 and the computing portion 52 of the respective sensor ICs 50(1), 50(2).

Next, the sensor assembly 100 will be described. It should be noted that FIG. 18 is a front view of the sensor assembly 100; FIG. 19 is a cross-sectional view taken along line C-C in FIG. 18; and FIG. 20 is a rear view of the sensor assembly 100. The sensor assembly 100 includes the main terminal assembly 100 and the holder member 90 (see FIG. 21). As shown in FIGS. 18 to 20, each sensor IC 50(1), 50(2) of the main terminal assembly 70 is inserted into and housed in the hollow tube portion 91 of the holder member 90. At this point, each positioning piece 54 of the magnetic sensing portion 51 of the first sensor IC 50(1) is fitted into the tapered groove 94b of each guiding groove 94 on the left or the right of the holder member 90, guided toward a predetermined assembled position, and finally engaged into the positioning groove 94a (see FIG. 16) so as to be positioned in the predetermined assembled position. Accordingly, the magnetic sensing portion 51 of the first sensor IC 50(1) abuts on the bottom end surface 91e of the hollow tube portion 91 of the holder member 90 in surface-to-surface contacting manner, while the computing portion 52 abuts on the lower wall surface 91d of the hollow tube portion 91 of the holder member 90 in surface-to-surface contacting manner.

Subsequently, each positioning piece 54 of the magnetic sensing portion 51 of the second sensor IC 50(2) is fitted into the tapered groove 94b of each guiding groove 94 on the left or the right of the holder member 90, guided toward a predetermined assembled position, and finally engaged into the positioning groove 94a (see FIG. 16) so as to be positioned in the predetermined assembled position. Accordingly, the computing portion 52 of the second sensor IC 50(2) abuts on the upper wall surface 91c of the hollow tube portion 91 of the holder member 90 in surface-to-surface contacting manner. As described above, the center of the magnetic sensing portion 51 of each sensor IC 50(1), 50(2) is aligned with an axis of the hollow tube portion 91 of the holder member 90 (see FIG. 19).

When each sensor IC 50(1), 50(2) is housed into the hollow tube portion 91 of the holder member 90 as described above, the connection portion between each connection terminal 55, 56, 57 of each sensor IC 50(1), 50(2) with each main terminal 61, 62, 63, 64, and each capacitor 81, 82, 83, 84 etc. are housed into the enlarged tube portion 93 of the holder member 90. Accordingly, the capacitor connection 61b, 62b, 63b, 64b, 64d, 64f (see FIG. 12) of each main terminal 61, 62, 63, 64 abuts the intermediate end plate portion 92 of the holder member 90. Further, the external end of each terminal connection 61a, 62a, 63a, 64a and each tie bar 65, 66, 67, 68 remain exposed from the enlarged tube portion 93 of the holder member 90. Thus, when the external end of each terminal connection 61a, 62a, 63a, 64a, i.e., the exposed portion of each main terminal 61, 62, 63, 64, is disposed outside of the opening of the holder member 90, each capacitor connection 61b, 62b, 63b, 64b, 64d, 64f and each IC terminal connection 61c, 61d, 62c, 63c, 64c, 64e, i.e., the housed portions, are housed into the holder member 90 with each sensor IC 50(1), 50(2) and each capacitor 81, 82, 83, 84, so as to be closer to the bottom than the exposed portion within the holder member 90.

Under these conditions, a potting material 102 is substantially entirely within the holder member 90, for example, by a dispenser (not shown). Accordingly, each sensor IC 50(1), 50(2), each connection terminal 55, 56, 57 thereof, each capacitor 81, 82, 83, 84, and the housed portion of each main terminal 61, 62, 63, 64 housed within the holder member 90 are buried with a potting material 102 (see two-dot chain lines 102 in FIG. 19).

Further, a resin such as an epoxy resin, which is permanently soft but which does not inadvertently drip, is adopted as the potting material 102 such that each sensor IC 50(1), 50(2) and each capacitor 81, 82, 83, 84 are protected from thermal stress, vibration and the like. Further, potting the potting material 102 into the hollow tube portion 91 of the holder member 90 avoids the occurrence of distortions of the magnetic sensing portion 51 of each sensor IC 50(1), 50(2) such that declining of the detection accuracy due to the occurrence of distortions can be prevented. Although insert molding, for example, may lead to a problem of declining of the detection accuracy because the magnetic sensing portion 51 of each sensor IC 50(1), 50(2) is distorted by inserting pressure of the resin, it is possible to eliminate such a problem by potting the potting material 102.

Figure 22:
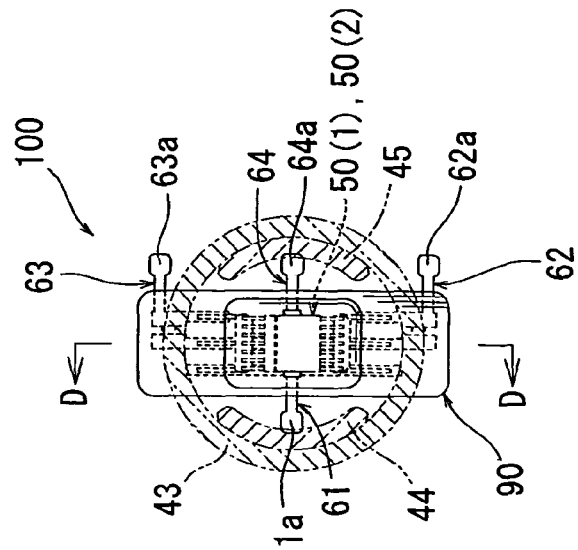
FIG. 22 is a front view showing the sensor assembly in which tie bars have been cut.
Figure 23:
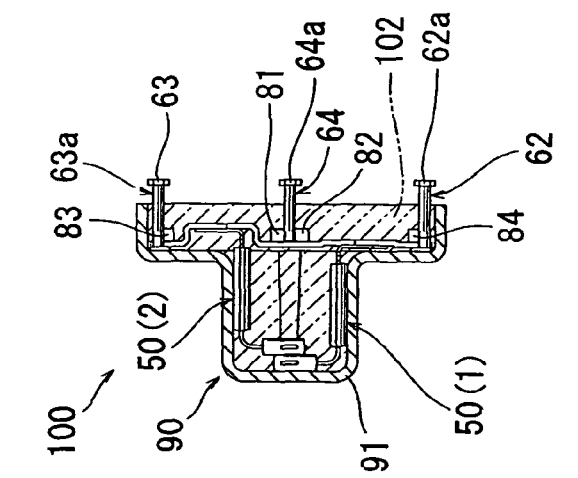
FIG. 23 is a cross-sectional view taken along line D-D in FIG. 22.
Figure 24:
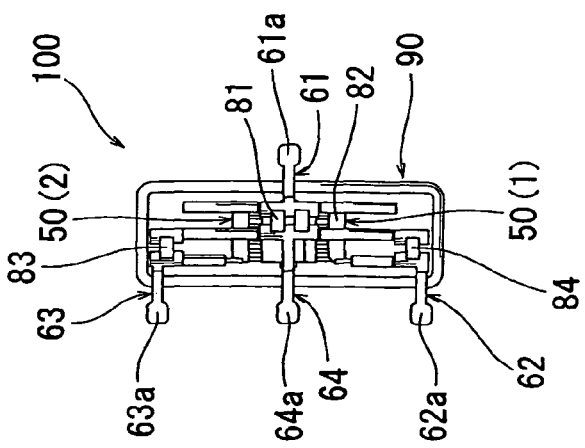
FIG. 24 is a rear view showing the sensor assembly in which tie bars have been cut.

After potting the potting material 102, each tie bar 65, 66, 67, 68 of the main terminal unit 60 is removed by cutting. Accordingly, each separated main terminal 61, 62, 63, 64 is formed from the main terminal unit 60. The sensor assembly 100 configured as above serves as a basis of a rotational angle sensor (designated as Se). It should be noted that FIG. 22 is a front view showing the sensor assembly 100 in which the tie bars of the main terminal unit have been cut; FIG. 23 is a cross-sectional view taken along line D-D in FIG. 22; and FIG. 24 is a rear view of the same sensor assembly 100.

Figure 25:
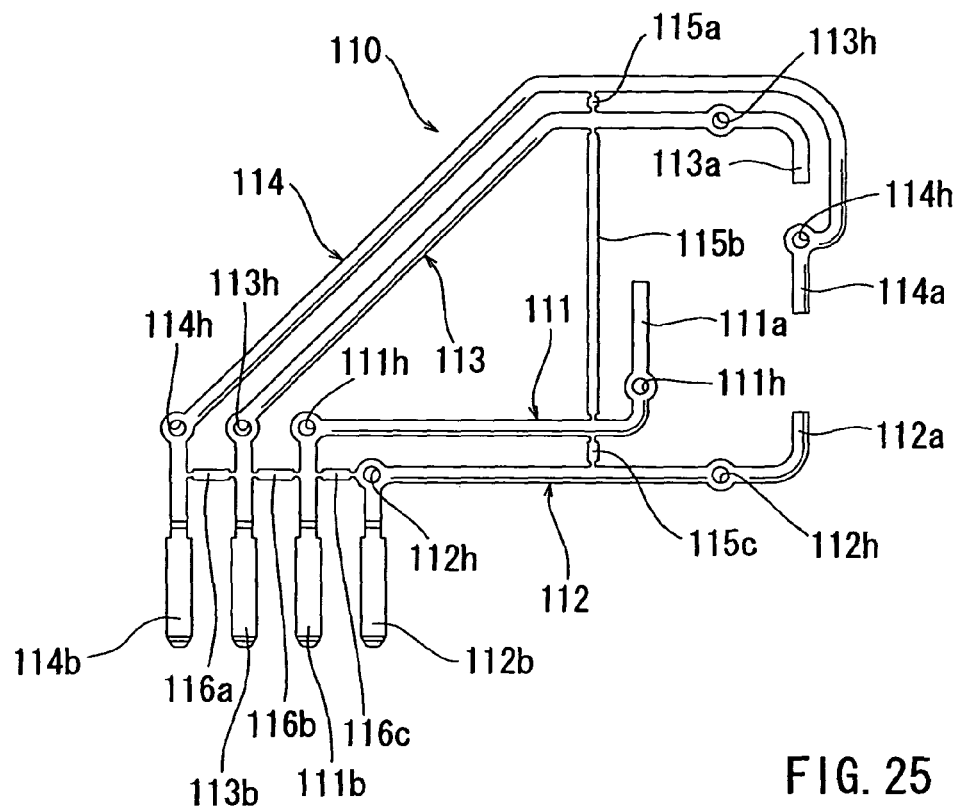
FIG. 25 is a front view showing a sensor terminal.

The sensor terminal unit 110 will now be described. FIG. 25 is a front view of the sensor terminal unit 110. The sensor terminal unit 110 is formed by press molding an electrically conductive sheet stock such as a copper alloy plate. The sensor terminal unit 110 includes the Vc sensor terminal 111, the V1 sensor terminal 112, the V2 sensor terminal 113, and the GND sensor terminal 114. Then, the adjacent sensor terminals 111, 112, 113, 114 are connected with each other by each tie bar 115a, 115b, 115c, 116a, 116b, 116c. More specifically, referring to FIG. 25, in the lower portion of the terminal connection side or the right side of the sensor terminal unit 110, the Vc sensor terminal 111 is arranged parallel to the V1 sensor terminal 112 substantially downward of the sensor terminal 111. Further, in the upper portion of the right side, the GND sensor terminal 114 is arranged parallel to the V2 sensor terminal 113 substantially downward of the sensor terminal 114. The tie bars 115a, 115b, 115c are arranged serially in a straight line extending in the up-down direction.

The upper tie bar 115a connects the GND sensor terminal 114 with the V2 sensor terminal 113. Further, the middle tie bar 115b connects the V2 sensor terminal 113 with the Vc sensor terminal 111. Further, the lower tie bar 115c connects the V2 sensor terminal 113 with the V1 sensor terminal 112.

Further, in the lower portion of the left side or the external connection side of the sensor terminal unit 110, the GND sensor terminal 114, the V2 sensor terminal 113, the Vc sensor terminal 111, and the V1 sensor terminal 112 are arranged parallel in the left-right direction. The tie bars 115a, 115b, 115c are arranged serially in a straight line extending in the left-right direction. The left-side tie bar 116a connects the GND sensor terminal 114 with the V2 sensor terminal 113. Further, the middle tie bar 116b connects the V2 sensor terminal 113 with the Vc sensor terminal 111. Further, the right-side tie bar 116c connects the Vc sensor terminal 111 with the V1 sensor terminal 112.

Referring to FIG. 25, the Vc sensor terminal 111 includes the terminal connection end 111a provided at one end thereof or the right end of the terminal connection side, and the external connection end 111b provided at the other end thereof or the left end of the external connection side. The terminal connection end 111a is formed to be connectable with the terminal connection 61a (see FIG. 22) of the Vc main terminal 61 of the sensor assembly 100. Further, the external connection end 111b is formed to be connectable with the corresponding terminal pin (not shown) of the unshown external connector. Further, the V1 sensor terminal 112 includes the terminal connection end 112a provided at one end thereof or the right end of the terminal connection side, and the external connection end 112b provided at the other end thereof or the left end of the external connection side. The terminal connection end 112a extends in surrounding manner to the lower portion of the holder member 90 in the sensor assembly 100 so as to be connectable with the terminal connection 62a (see FIG. 22) of the V1 main terminal 62 in the sensor assembly 100. Further, the external connection end 112b is formed to be connectable with the corresponding terminal pin (not shown) of the unshown external connector. Further, the V2 sensor terminal 113 includes the terminal connection end 113a provided at one end thereof or the right end of the terminal connection side, and the external connection end 113b provided at the other end thereof or the left end of the external connection side. The terminal connection end 113a extends in surrounding manner to the upper portion of the holder member 90 in the sensor assembly 100 so as to be connectable with the terminal connection 63a (see FIG. 22) of the V2 main terminal 62 in the sensor assembly 100. Further, the external connection end 113b is formed to be connectable with the corresponding terminal pin (not shown) of an unshown external connector. Further, the GND sensor terminal 114 includes the terminal connection end 114a provided at one end thereof or the right end of the terminal connection side, and the external connection end 114b provided at the other end thereof or the left end of the external connection side. The terminal connection end 114a extends in surrounding manner to the upper portion of the holder member 90 in the sensor assembly 100 so as to be connectable with the terminal connection 64a (see FIG. 22) of the GND main terminal 64 in the sensor assembly 100. Further, the external connection end 114b is formed to be connectable with the corresponding terminal pin (not shown) of the unshown external connector.

Further, the external connection ends 111b, 112b, 113b, 114b of the sensor terminals 111, 112, 113, 114 extend downward in such a manner that the external connection end 112b, the external connection end 111b, the external connection end 113b, the external connection end 114b are arranged parallel in this order from the right to the left. It should be noted that the outer surface of the sensor terminal unit 110 is plated with Ni (not shown), while each terminal connection end 111a, 112a, 113a, 114a, is plated with Au. Further, each sensor terminal 111, 112, 113, 114 is provided with an appropriate number of through holes 111h, 112h, 113h, 114h, respectively (see FIG. 25). When the cover 30 (later described) is resin molded, each through hole 111h, 112h, 113h, 114h is fitted with a positioning pin (not shown) of a molding die such that each sensor terminal 111, 112, 113, 114 is positioned in the die. Similarly, each plate terminal 37, 38 is provided with an appropriate number of through holes 37h, 38h (see FIGS. 28 and 30).

Next, the sensor terminal assembly 120 will be described. FIG. 26 is a front view of the sensor terminal assembly. The sensor terminal assembly 120 is configured such that the sensor terminal unit 110 (see FIG. 25) is implemented with the sensor assembly 100 (see FIGS. 22 to 24). Thus, the terminal connection 61a of the Vc main terminal 61 of the sensor assembly 100 is electrically connected on the terminal connection end 111a of the Vc sensor terminal 111 of the sensor terminal unit 110 by welding (the welded portion is designated as 121). Further, the terminal connection 62a of the V1 main terminal 62 of the sensor assembly 100 is electrically connected on the terminal connection end 112a of the V1 sensor terminal 112 of the sensor terminal unit 110 by welding (the welded portion is designated as 122). Further, the terminal connection 63a of the V2 main terminal 63 of the sensor assembly 100 is electrically connected on the terminal connection end 113a of the V2 sensor terminal 113 of the sensor terminal unit 110 by welding (the welded portion is designated as 123). Further, the terminal connection 64a of the GND main terminal 64 of the sensor assembly 100 is electrically connected on the terminal connection end 114a of the GND sensor terminal 114 of the sensor terminal unit 110 by welding (the welded portion is designated as 124). It should be noted that the respective welded portions 121, 122, 123, 124 might be welded, for example, by projection welding.

Figure 27:
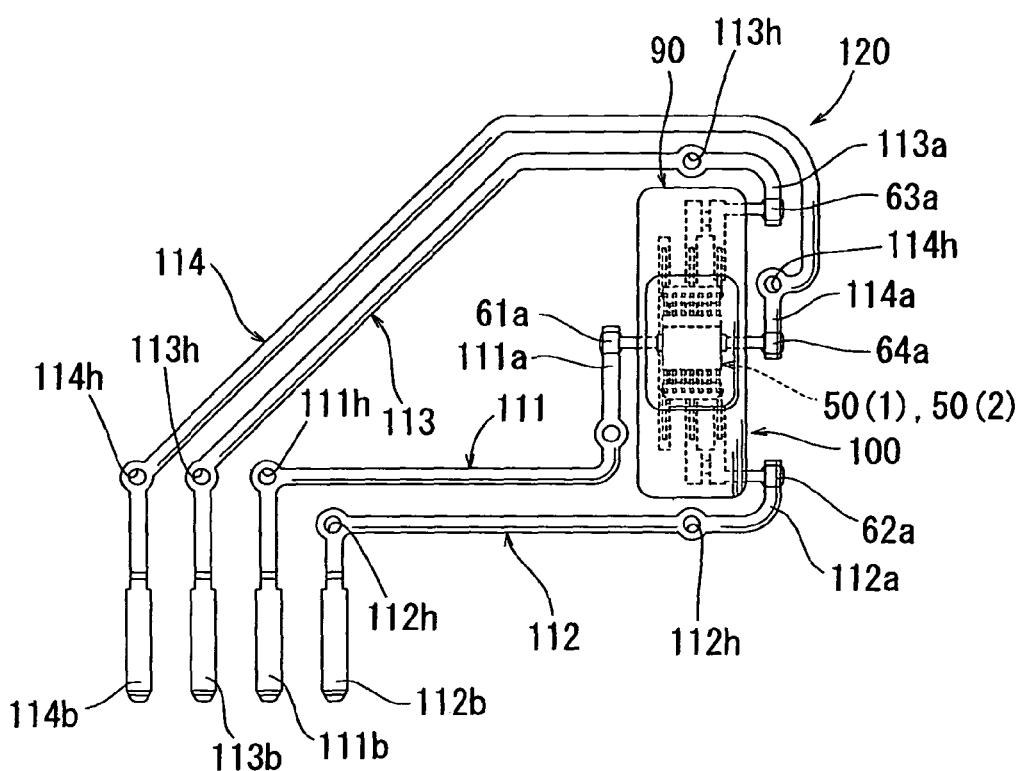
FIG. 27 is a front view showing the sensor terminal assembly in which tie bars have been cut.

After the welding, each tie bar 115a, 115b, 115c, 116a, 116b, 116c of the sensor terminal unit 110 is removed by cutting. Accordingly, as shown in FIG. 27, separated sensor terminals 111, 112, 113, 114 are formed. The sensor terminals 111, 112, 113, 114 formed as above are equivalent to the "subterminals" and the "external terminals" herein. It should be noted that FIG. 27 shows a front view of the sensor terminal assembly 120 in which the tie bars have been cut.

The cover 30 will now be described. As shown in FIG. 2, the cover 30 is formed in such a way that the sensor terminal assembly 120 (see FIG. 27), the plate terminals 37, 38 (see FIGS. 28 to 31), and the relay connectors 36 are insert molded or inserted to be resin molded. Further, when the cover 30 is resin molded, the resin portion of the cover 30 surrounding the holder member 90 of the sensor terminal assembly 120 is prevented from burring on a burring prevention surface 126 in the middle of the hollow tube portion 91 of the holder member 90. It should be noted that "burring prevention" is also referred to as "burring cut." This term refers to blocking a resin flow toward the exposed portion by the die fitting to the exposed portion such that a portion not buried by the resin portion (the half portion on the bottom side of the hollow tube portion 91 of the holder member 90 in this embodiment (equivalent to the left half portion as viewed in FIG. 3)) when the resin molding is performed. Then, the end surface of the resin portion, which is molded by the die fitting to the exposed portion and surrounds the exposed portion, is referred to as a "burring prevention surface."

Figure 4:
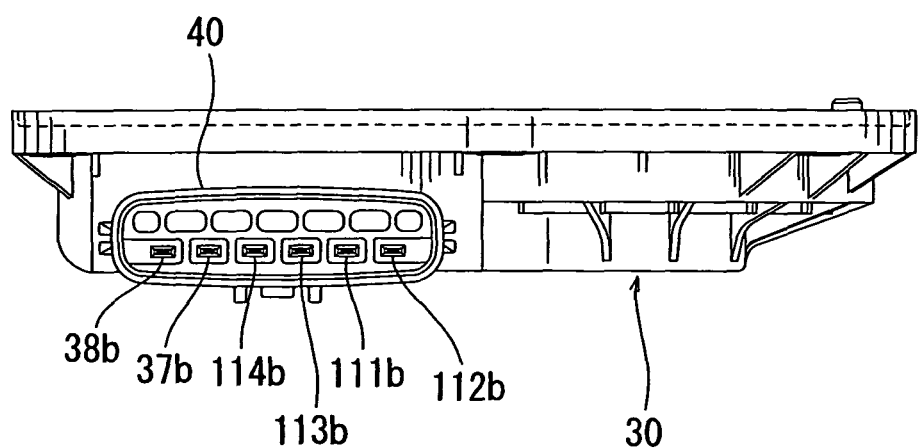
FIG. 4 is a bottom view showing a cover.
Figure 5:
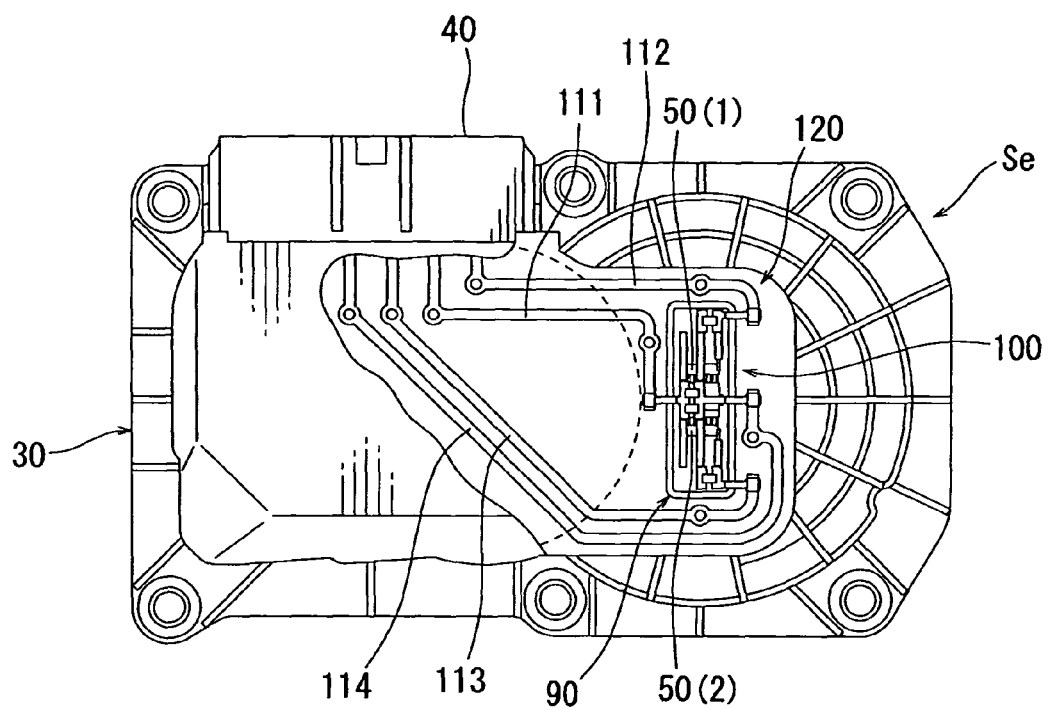
FIG. 5 is a front view showing the cover in partially broken away manner.

Further, as shown in FIG. 2, the external connection ends 111b, 112b, 113b, 114b of the sensor terminals 111, 112, 113, 114, as well as the external connection ends 37b, 38b of the plate terminals 37, 38, project into the connector portion 40 of the cover 30 (see FIG. 4). Further, the external connection ends 37b, 38b, 111b, 112b, 113b, 114b are arranged in a row in the left-right direction in FIG. 4. It should be noted that the external connection ends 38b, 37b, 114b, 113b, 111b, 112b are arranged in this order from the left to the right in FIG. 4 in this embodiment. Further, as previously described, each external connection end 37b, 38b, 111b, 112b, 113b, 114b is connectable with each terminal pin (not shown) within the external connector (not shown) connected with the connector portion 40. As described above, the sensor assembly 100 is provided with the sensor terminals 111, 112, 113, 114, the cover 30, the relay connectors 36, and the plate terminals 37, 38 such that the rotational angle sensor Se is configured (see FIG. 2).

The cover 30 configured as above is connected with the lateral surface (the right-side surface as viewed in FIG. 1) of the throttle body 1 so as to complete the throttle control device TC. Accordingly, the hollow tube portion 91 of the holder member 90 of the rotational angle sensor Se is disposed substantially concentric with the axis of the yoke 43 or the rotational axis L of the throttle shaft 6 so as to be between the magnets 44, 45 and in a predetermined spaced relationship with each magnet. Further, since the magnetic sensing portions 51 of the sensor ICs 50(1), 50(2) of the rotational angle sensor Se are disposed between the magnets 44, 45 such that the rotational axis L of the throttle shaft 6 is substantially concentric with the sensing portions 51 and also orthogonal with the square surfaces of the magnetic sensing portions 51, the magnetic field direction generated between the pair of magnets 44, 45 is accurately detected.

Thus, the sensor ICs 50(1), 50(2) (see FIG. 3) allow the computing portions 52 to calculate outputs from the magnetoresistive elements within the magnetic sensing portions and to output signals representing the magnetic field direction to the control means such as ECU so as to be configured to detect the magnetic field direction without depending on the magnetic field intensity. Further, since two sensor ICs are used, it is possible to perform detection with a high accuracy. Also, even if either of them fails, the remaining one can detect the magnetic field direction.

In the aforementioned throttle control device TC (see FIG. 1), when the engine is started, the drive of the motor 20 is controlled by a control means such as ECU. Accordingly, as previously described, an intake airflow flowing through the intake air passageway 4 of the throttle body 1 is controlled by opening and closing the throttle valve 12 via the speed-reduction gear mechanism. Then, as the throttle shaft 6 rotates, the throttle gear 16, the yoke 43, and both of the magnets 44, 45 rotate such that the magnetic field direction intersecting each sensor IC 50(1), 50(2) varies according to the rotational angle. Accordingly, an output signal from each sensor IC 50(1), 50(2) varies. The control means such as ECU (not shown), to which each sensor IC 50(1), 50(2) outputs the output signal, calculates the rotational angle of the throttle shaft 6, or the opening degree of the throttle valve 12, based on the output signal from each sensor IC 50(1), 50(2).

Further, the control means such as ECU (not shown) controls the so-called control parameters for a fuel injection control, a control for correcting the opening degree of the throttle valve 12, a speed-change control of an automatic transmission, etc., based on the throttle opening degree detected as the magnetic field direction representing the magnetic physical quantity of the pair of magnets 44, 45 and outputted from each sensor IC 50(1), 50(2) of the rotational angle sensor Se, a driving speed detected by a vehicle speed sensor (not shown), an engine rotational speed detected by a crank angle sensor, a detection signal from an accelerator pedal sensor, an $O_2$ sensor, and an air flow meter, etc.

According to the rotational angle sensor Se (see FIGS. 2 and 3) provided in the aforementioned throttle control device TC, each connection terminal 55, 56, 57 of each sensor IC 50(1), 50(2) for detecting a rotational angle of the throttle gear 16 as a rotor is connected with each main terminal 61, 62, 63, 64. Therefore, it is possible to lower the cost by using inexpensive main terminals 61, 62, 63, 64, comparing to expensive printed circuit boards that have conventionally been required. Further, retaining the sensor ICs 50(1), 50(2) and the connection portions of each main terminal 61, 62, 63, 64 on each sensor IC 50(1), 50(2) side in the holder member 90 may eliminate a molding die for integrally resin molding the sensor ICs 50(1), 50(2) and the wiring terminals (equivalent to terminals integrally formed with the main terminals and the subterminals (the sensor terminals)). Accordingly, it is possible to reduce the equipment expenses so as to lower the cost.

Further, constructing the sensor assembly 100 (see FIGS. 22 to 24) to form the sensor ICs 50(1), 50(2), the main terminals 61, 62, 63, 64 and the holder member 90 into an assembly facilitates handling the sensor ICs 50(1), 50(2) and the main terminals 61, 62, 63, 64. Further, it is possible to reduce the size of the sensor assembly, because the structure is more simplified than in using a printed circuit board. Accordingly, it is possible to reduce the equipment expenses so as to lower the cost.

Further, each connection terminal 55, 56, 57 of each sensor IC 50(1), 50(2) and each main terminal 61, 62, 63, 64 are connected by welding (see welded portions 71 to 76 in FIG. 14). Thus, since the strength of the connection between each connection terminal 55, 56, 57 of each sensor IC 50(1), 50(2) and each main terminal 61, 62, 63, 64 is enhanced, it is possible to prevent or reduce disconnection caused by repeated temperature cycles. Additionally, it is possible to increase the reliability of the rotational angle sensor Se.

Further, the guiding grooves 94 having the positioning grooves 94a and the tapered grooves 94b (see FIG. 16) provided on the opposing inner wall surfaces of both the left and the right sidewalls 91a, 91b of the holder member, when the sensor ICs 50(1), 50(2) are inserted, may guide both of the positioning pieces 54 of the magnetic sensing portions 51 of the sensor ICs 50(1), 50(2) to a predetermined assembled position. More specifically, since the opened ends of the guiding grooves 94 of the holder member 90 is provided with the tapered grooves 94b (see FIG. 16), the area where the positioning pieces 54 are engageable with the tapered grooves 94b can be greater. Thus, it is possible to facilitate engaging the positioning pieces 54 of the magnetic sensing portions 51 of the sensor ICs 50(1), 50(2) with the positioning grooves 94a. Thereafter, the positioning pieces 54 are guided by the tapered grooves 94b toward the positioning grooves 94a, and then the positioning pieces 54 are finally positioned at predetermined positions in the positioning grooves 94a. Thus, the sensor ICs 50(1), 50(2) can be easily and accurately assembled in the predetermined assembled positions within the holder member 90 (see FIG. 19). Accordingly, it is possible to prevent or reduce displacement of each sensor IC 50(1), 50(2). Thus, it is possible to facilitate assembling the sensor ICs 50(1), 50(2) and increase the detection accuracy and the reliability of the rotational angle sensor Se.

Further, a potting material 102 is potted into the holder member 90 so as to cover each sensor IC 50(1), 50(2), and the connection portions between each connection terminal 55, 56, 57 of each sensor IC 50(1), 50(2) and each main terminal 61, 62, 63, 64. Thus, it is possible to prevent the intrusion of moisture to the electrically conductive portions so as to prevent or reduce the occurrence of shunt or short and migration. Additionally, when the potting material 102 has flexibility, it is possible to protect each sensor IC 50(1), 50(2) from thermal stress, vibrations and the like. Additionally, since no excess pressure is applied to each sensor IC 50(1), 50(2) when it is potted, it is possible to avoid characteristic changes of each sensor IC 50(1), 50(2) caused by the pressure. For these reasons, it is possible to increase the reliability of the rotational angle sensor Se. Further, when a printed circuit board is used, covering the printed circuit board requires plenty of potting material 102, but conversely, covering or molding the connection portions between each connection terminal 55, 56, 57 of each sensor IC 50(1), 50(2) and each main terminal 61, 62, 63, 64 with a potting material 102 within a space surrounded by the holder member 90 reduces the potting material 102 used such that it is possible to lower the material cost for the potting material. Further, unlike in the case of integrally resin molding (primary molding) each sensor IC 50(1), 50(2) and each sensor terminal 111, 112, 113, 114, here it is possible to reduce the equipment expenses for a resin molding die so as to lower the cost. Further, it is possible to prevent or reduce defective moldings due to a displacement between each sensor IC 50(1), 50(2) and each main terminal 61, 62, 63, 64 caused by molding pressure in resin molding, a deformation of each connection terminal 55, 56, 57 of each sensor IC 50(1), 50(2) and each main terminal 61, 62, 63, 64 and the like. Further, using an epoxy resin, which is less expensive than a silicon-type UV curable resin, as the potting material 102 can avoid increasing the cost. It should be noted that the silicon-type UV curable resin could be adopted as the potting material 102.

Further, each capacitor 81, 82, 83, 84, provided as a preventive measure for discharge of positive charges; is connected between one and another of the main terminal 61, 62, 63, 64 and covered with the potting material 102 (see FIG. 19). Thus, the potting material 102 having flexibility may protect the capacitors 81, 82, 83, 84 from thermal stress, vibrations and the like. Further, since no excess pressure is applied to the capacitors 81, 82, 83, 84 when they are potted, it is possible to avoid disconnection, destruction and the like of the capacitors 81, 82, 83, 84 caused by the pressure. Accordingly, it is possible to increase the reliability of the rotational angle sensor Se.

Further, the housed portions of the main terminals 61, 62, 63, 64 for connecting the sensor ICs 50(1), 50(2) and the capacitors 81, 82, 83, 84 are formed in stepped manner with the exposed portions of the main terminals 61, 62, 63, 64 for the sensor terminals 111, 112, 113, 114, such that the exposed portions are disposed on the opening side of the holder member 90, while the housed portions are housed with the sensor ICs 50(1), 50(2) and the capacitors 81, 82, 83, 84 in the holder member in such a manner that the housed portions are closer to the bottom in the holder member 90 than the exposed portions. Thus, it is possible to easily and securely pot the potting material 102 against portions that need to be water-resistant for electrically conductive portions including the sensor ICs 50(1), 50(2) and the capacitors 81, 82, 83, 84. Accordingly, it is possible to prevent or reduce the occurrence of short caused in electrically conductive portions.

Further, the resin molded cover 30 (see FIGS. 2 and 3) is provided, which is resin molded in such a manner that the sensor assembly 100 is insert molded with the sensor terminals 111, 112, 113, 114, which are connected to the terminal connections 61a, 62a, 63a, 64a of the main terminals 61, 62, 63, 64 of the sensor assembly 100 and connectable with terminal pins of an external connector (not shown). Thus, it is possible to facilitate disposing the sensor assembly 100 and the sensor terminals 111, 112, 113, 114 into the cover 30. Further, since the main terminals 61, 62, 63, 64 and the sensor terminals 111, 112, 113, 114 of the sensor assembly 100 are configured to be connected, it is possible to use the common sensor assembly 100 for the cover 30, even if the cover 30 is different in the connection positions and the connection directions of the external connector (i.e., the molding positions and the molding directions of the connector portion 40), the wire routings of the sensor terminals 111, 112, 113, 114 and the like.

Further, since the sensor terminals 111, 112, 113, 114 and the plate terminals 37, 38 are integrated into the cover 30 by integrally resin molding, it is possible to accurately dispose the sensor terminals 111, 112, 113, 114 and the plate terminals 37, 38 in a predetermined position in the cover 30.

Further, the aforementioned method for manufacturing the rotational angle sensor Se includes the steps of: press molding an electrically conductive sheet stock so as to form the main terminal unit 60 in which the main terminals 61, 62, 63, 64 are connected via the tie bars 65, 66, 67, 68; connecting the connection terminals 55, 56, 57 of the sensor ICs 50(1), 50(2) with the main terminal unit 60 so as to form the main terminal assembly 70; disposing the sensor ICs 50(1), 50(2) of the main terminal assembly 70 and the connection portions of the main terminals 61, 62, 63, 64 on the sensor IC 50(1), 50(2) side to be housed into the holder member 90; and removing the tie bars 65, 66, 67 from the main terminal unit 60. Therefore, according to the method for manufacturing the rotational angle sensor Se, press molding a sheet stock so as to form the main terminal unit 60 enables the main terminals 61, 62, 63, 64 to be accurately molded. Further, connecting the connection terminals 55, 56, 57 of the sensor ICs 50(1), 50(2) with the main terminal unit 60 so as to form the main terminal assembly 70 enables the connection terminals 55, 56, 57 of the sensor ICs 50(1), 50(2) to be accurately connected with the main terminals 61, 62, 63, 64. Further, disposing the sensor ICs 50(1), 50(2) of the main terminal assembly 70 and the connection portions of the main terminals 61, 62, 63, 64 on the sensor IC 50(1), 50(2) side to be housed into the holder member 90 enables the sensor ICs 50(1), 50(2) to be easily disposed in position within the holder member 90 in such a way that the sensor ICs 50(1), 50(2) are supported on the main terminal assembly 70. Further, removing the tie bars 65, 66, 67, 68 from the main terminal unit 60 enables the main terminals 61, 62, 63, 64 to be easily formed separately. Therefore, the rotational angle sensor Se can be reasonably manufactured.

Further, the throttle control device TC (see FIG. 1) is constructed to include the rotational angle sensor Se so as to detect opening degrees of the throttle valve 12. Therefore, it is possible to provide the throttle control device TC including the rotational angle sensor Se that can lower the cost.

Figure 3:
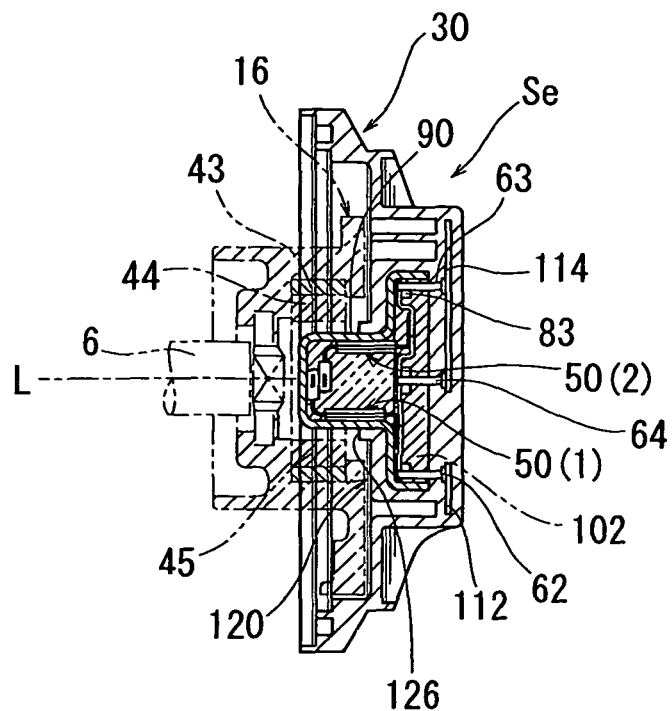
FIG. 3 is a cross-sectional view taken along line A-A in FIG. 2.

Further, the magnetic field direction generated between the pair of magnets 44, 45 disposed in the throttle shaft 6 is detected by the sensor ICs 50(1), 50(2) of the rotational angle sensor Se such that the opening degrees of the throttle valve 12 are detected based on the outputs from the sensor ICs 50(1), 50(2) (see FIGS. 3 and 4). Therefore, the sensor ICs 50(1), 50(2) detecting the magnetic field direction are hardly affected, for example, by displacement of the magnet 44, 45 due to displacement of the throttle shaft 6, magnetic field intensity change due to the temperature characteristics of the magnets 44, 45 and the like. It should be noted that the displacement of the throttle shaft 6 is referred to as a relative displacement against the sensor ICs 50(1), 50(2), which is generated by assembly errors of the throttle shaft 6, thermal expansion errors between the throttle body 1 and the cover 30, rattling due to wearing of the throttle shaft 6 or the bearings 8, 10, thermal expansion of the resin (the throttle gear 16) molded by insert molding both of the magnets 44, 45 and the like. Thus, it is possible to accurately detect the magnetic field direction by the sensor ICs 50(1), 50(2), and accordingly it is possible to increase the detection accuracy of the opening degrees of the throttle valve 12. This is particularly advantageous if the throttle body 1 is made of a resin that is insufficient in manufacturing accuracy. Further, this is advantageous if the throttle body 1 and the cover 30 are made in different materials, for example, in the case that the throttle body 1 is made of metal, while the cover 30 is made of resin.

Further, the pair of magnets 44, 45 disposed in the throttle shaft 6 are disposed in the throttle gear 16 and on the inner surface of the yoke 43 made of a ring-shaped magnetic material generally centered about the rotational axis L, and also parallel magnetized such that the magnetic fields generated between both are formed in a parallel relationship (see FIG. 4). Therefore, since a magnetic circuit including the pair of magnets 44, 45 and the yoke 43 so as to parallel magnetize the pair of magnets 44, 45, the magnetic field generated between the magnets 44, 45 are substantially parallel. Thus, it is possible to further increase the detection accuracy of the magnetic field direction by the sensor ICs 50(1), 50(2).

Second Embodiment

Figure 32:
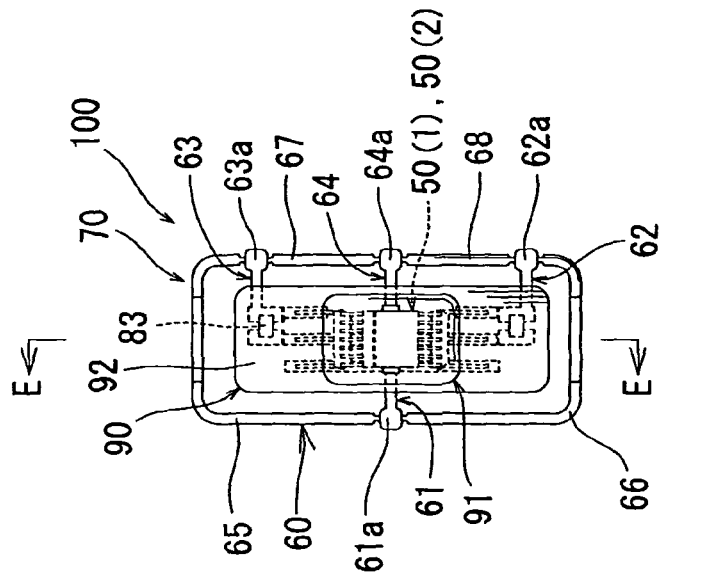
FIG. 32 is a front view showing a sensor assembly according to a second embodiment of the present invention.
Figure 33:
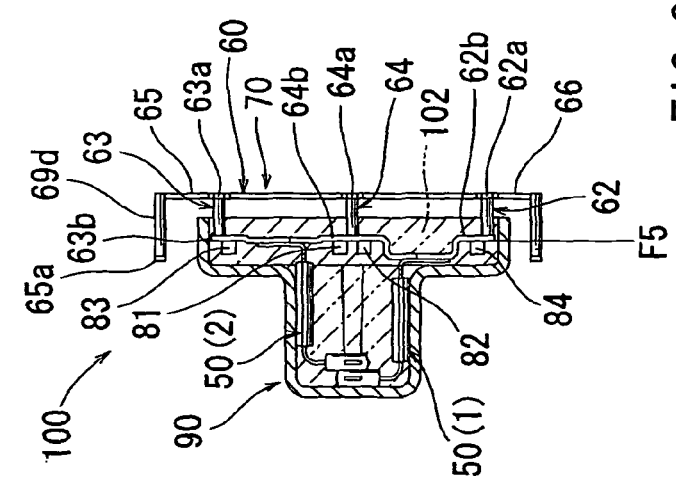
FIG. 33 is a cross-sectional view taken along line E-E in FIG. 32.
Figure 34:
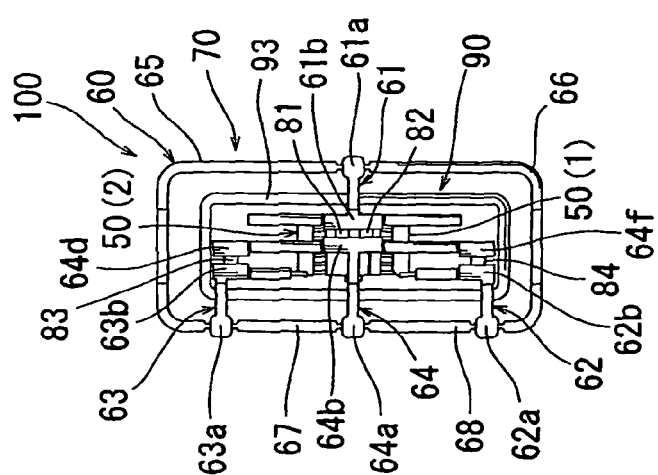
FIG. 34 is a rear view showing the sensor assembly.

A second embodiment of the present invention will be described. Since this embodiment is a modification of the main terminal assembly 70 (see FIGS. 13 and 14) of the first embodiment, the same description will not be duplicated further, but a modified part will be described. It should be noted that FIG. 32 is a front view showing the sensor assembly 100; FIG. 33 is a cross-sectional view taken along line E-E in FIG. 32; and FIG. 34 is a rear view showing the sensor assembly 100. As shown in FIGS. 32 to 34, the main terminal unit 60 of the main terminal assembly 70 of this embodiment is provided with the capacitors 81, 82, 83, 84 to be mounted on the same side as the connection side, i.e., the front side, of the sensor ICs 50(1), 50(2). Thus, the main terminals 61, 62, 63, 64 of the main terminal unit 60 are folded such that the capacitor connections 61b, 62b, 63b, 64b, 64d, 64f are disposed on plane F5 on the reverse side of the capacitors 81, 82, 83, 84 of the first embodiment. Functions and effects similar to those of the first embodiment are obtained by the second embodiment configured as above. Additionally, since the capacitors 81, 82, 83, 84 are disposed on the same side as the connection side of the sensor ICs 50(1), 50(2) in the main terminals 61, 62, 63, 64, the sensor ICs 50(1), 50(2) and the capacitors 81, 82, 83, 84 are easily disposed against the main terminals 61, 62, 63, 64.

Third Embodiment

Figure 35:
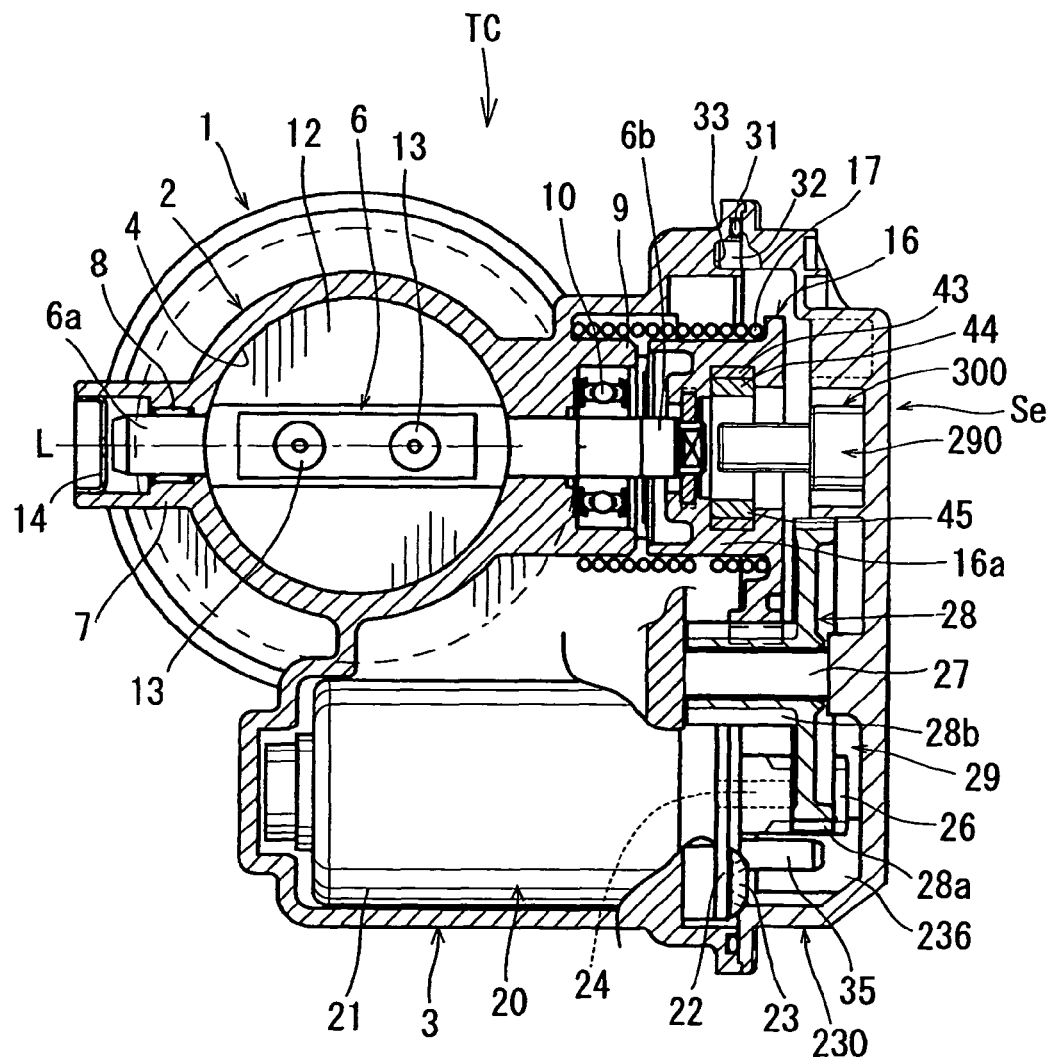
FIG. 35 is a cross-sectional plan view showing a throttle control device according to a third embodiment of the present invention.
Figure 36:
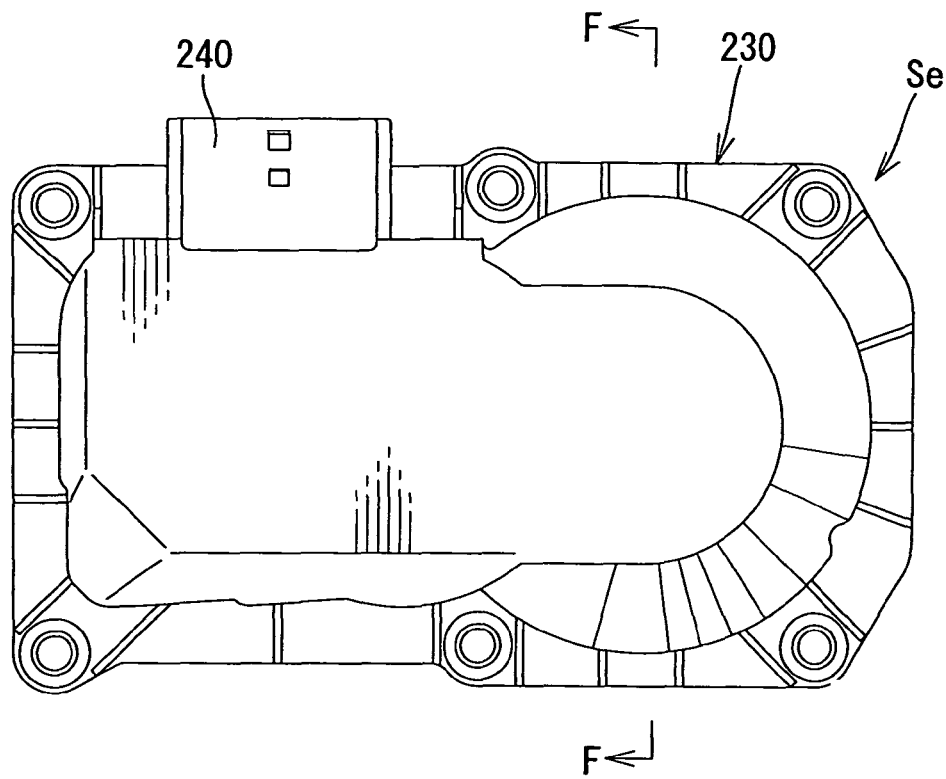
FIG. 36 is a front view showing a cover.

A third embodiment of the present invention will be described. Since this embodiment is a modification of the rotational angle sensor Se of the first embodiment, the same description will not be duplicated further, but a modified part will be described. As shown in FIG. 35, the rotational angle sensor Se includes a cover (designated as 230), which is intended to be connected on the lateral surface of the throttle body 1 of the throttle control device TC in a way similar to the first embodiment. It should be noted that the cover 230 is equivalent to the "resin molded body" herein.

Figure 38:
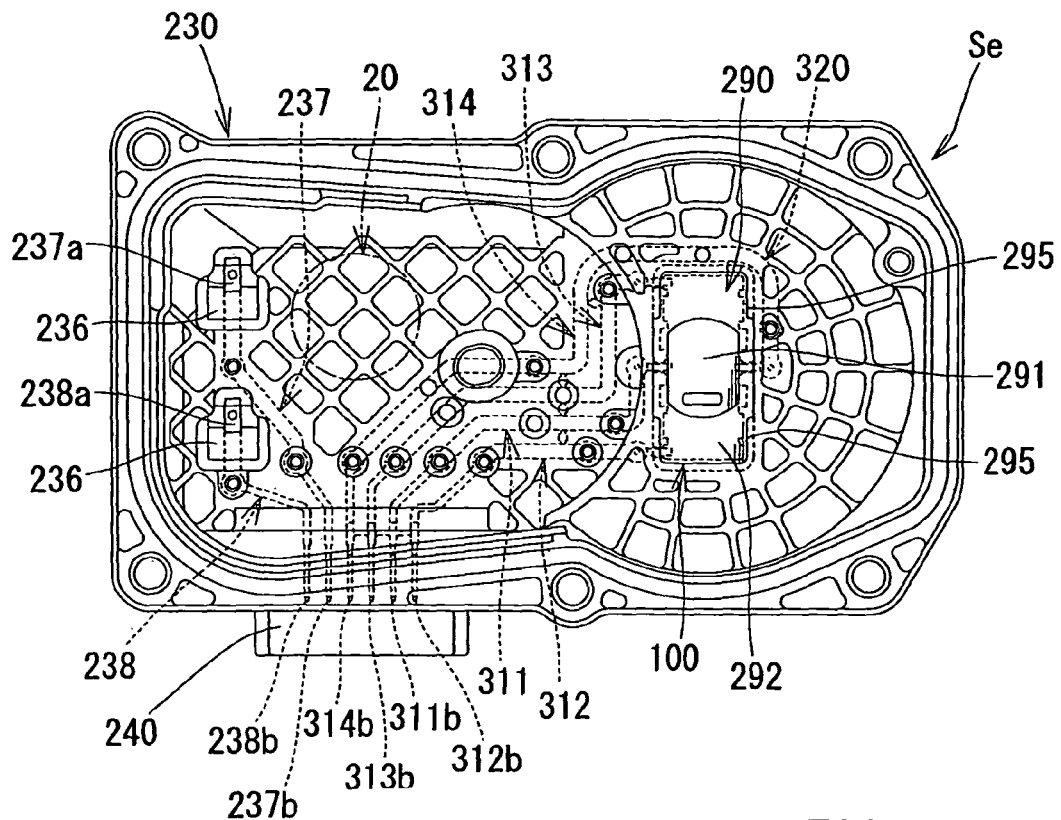
FIG. 38 is a rear view showing the cover.
Figure 79:
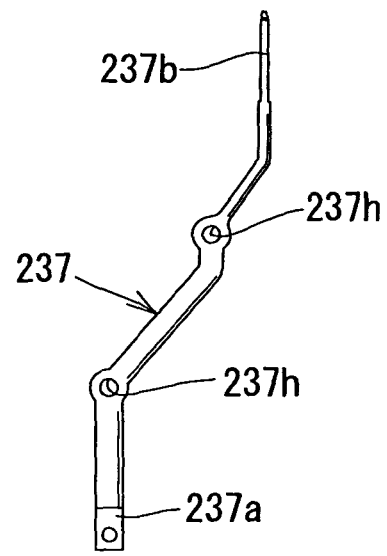
FIG. 79 is a front view showing a first plate terminal.
Figure 80:
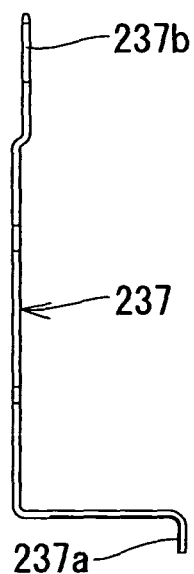
FIG. 80 is a right side view showing the first plate terminal.
Figure 81:
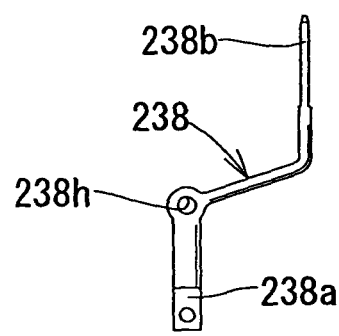
FIG. 81 is a front view showing a second plate terminal.
Figure 82:
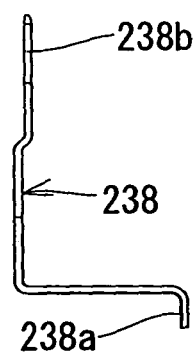
FIG. 82 is a right side view showing the second plate terminal.

The motor 20 incorporated into the throttle body 1 includes two motor terminals 35 (only one of which is shown in FIG. 35), which are respectively connected with relay connectors 236 provided in the cover 30 (see FIG. 38). One (the upper side as viewed in FIG. 38) of the relay connectors 236 is connected with a connector connection end 237a of a first plate terminal 237 (see FIGS. 79 and 80), which is insert molded or inserted to be resin molded into the cover 230. Further, the other (the lower side as viewed in FIG. 38) of the relay connectors 236 is connected with a connector connection end 238a of a second plate terminal 238 (see FIGS. 81 and 82), which is insert molded or inserted to be resin molded into the cover 230. It should be noted that FIG. 79 is a front view showing the first plate terminal 237, while FIG. 80 is a right side view showing the same. Further, FIG. 81 is a front view showing the second plate terminal 238, while FIG. 82 is a right side view showing the same. Further, the outer surface of each plate terminal 237, 238 is plated with Ni (not shown).

Figure 37:
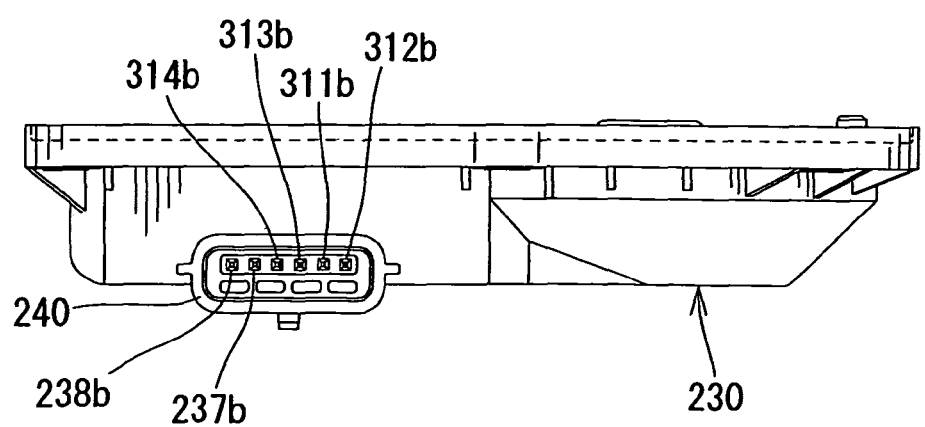
FIG. 37 is a top view showing the cover.

Further, as shown in FIG. 38, an external connection end 237b, 238b of each plate terminal 237, 238 projects into a substantially horizontally-rectangular cylinder shaped connector portion 240, which is formed in a predetermined portion (the lower portion as viewed in FIG. 38) of the cover 230 (see FIG. 37). Further, the connector portion 240 of the cover 230 is connectable with an unshown external connector. Further, the external connection end 237b, 238b of the plate terminals 237, 238, and external connection ends 111b, 112b, 113b, 114b of the sensor terminals 111, 112, 113, 114 that will be later described, are connectable both with the external connector (not shown) for the connector portion 240 and with each terminal pin (not shown) within the external connector.

Figure 69:
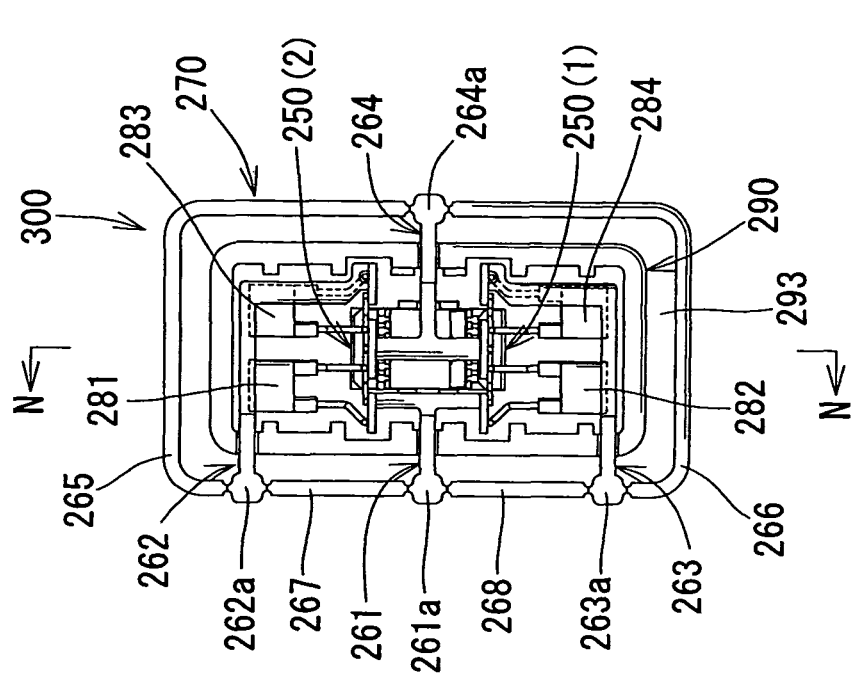
FIG. 69 is a front view showing the sensor assembly.
Figure 70:
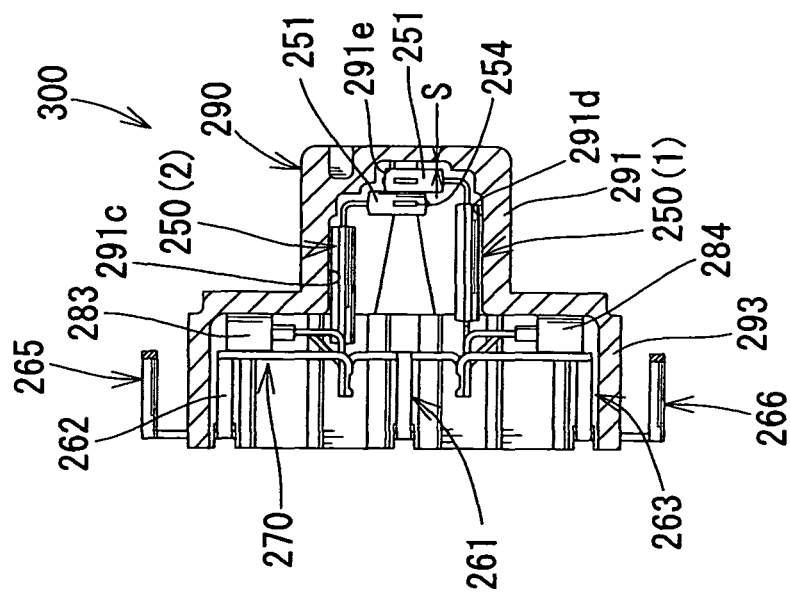
FIG. 70 is a cross-sectional view taken along line N-N in FIG. 69.
Figure 77:
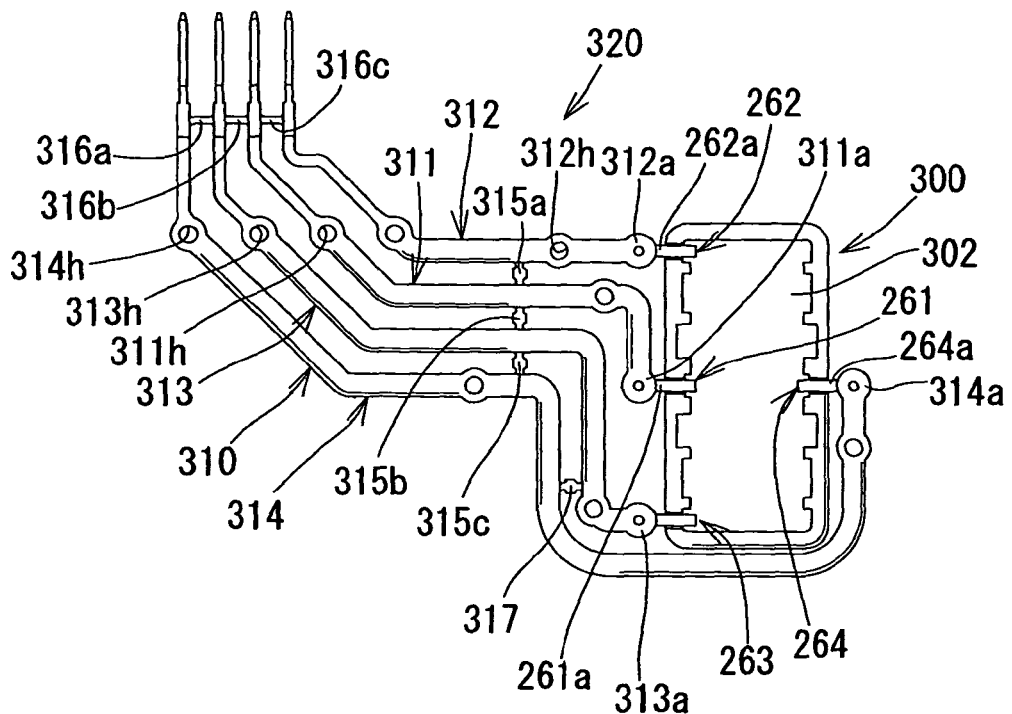
FIG. 77 is a front view showing a sensor terminal assembly.

As shown in FIG. 38, the relay connectors 236 and the plate terminals 237, 238, as well as a sensor terminal assembly 320 (later described, see FIG. 78), are insert molded or inserted to be resin molded into the cover 230. Further, as shown in FIG. 77, the sensor terminal assembly 320 consists of the sensor assembly 300 and the sensor terminal unit 310. The sensor terminal assembly 320 is formed when each tie bar 115a, 115b, 115c, 116a, 116b, 116c (later described) is removed from the sensor terminal unit 310 (see FIG. 78). Further, as shown in FIGS. 69 and 70, the sensor assembly 300 consists of the main terminal assembly 270 and the holder member 290. The sensor assembly 300 is formed when each tie bar 265, 266, 267, 268 (later described) is removed from the main terminal assembly 270 (see FIGS. 73 and 74).

Figure 68:
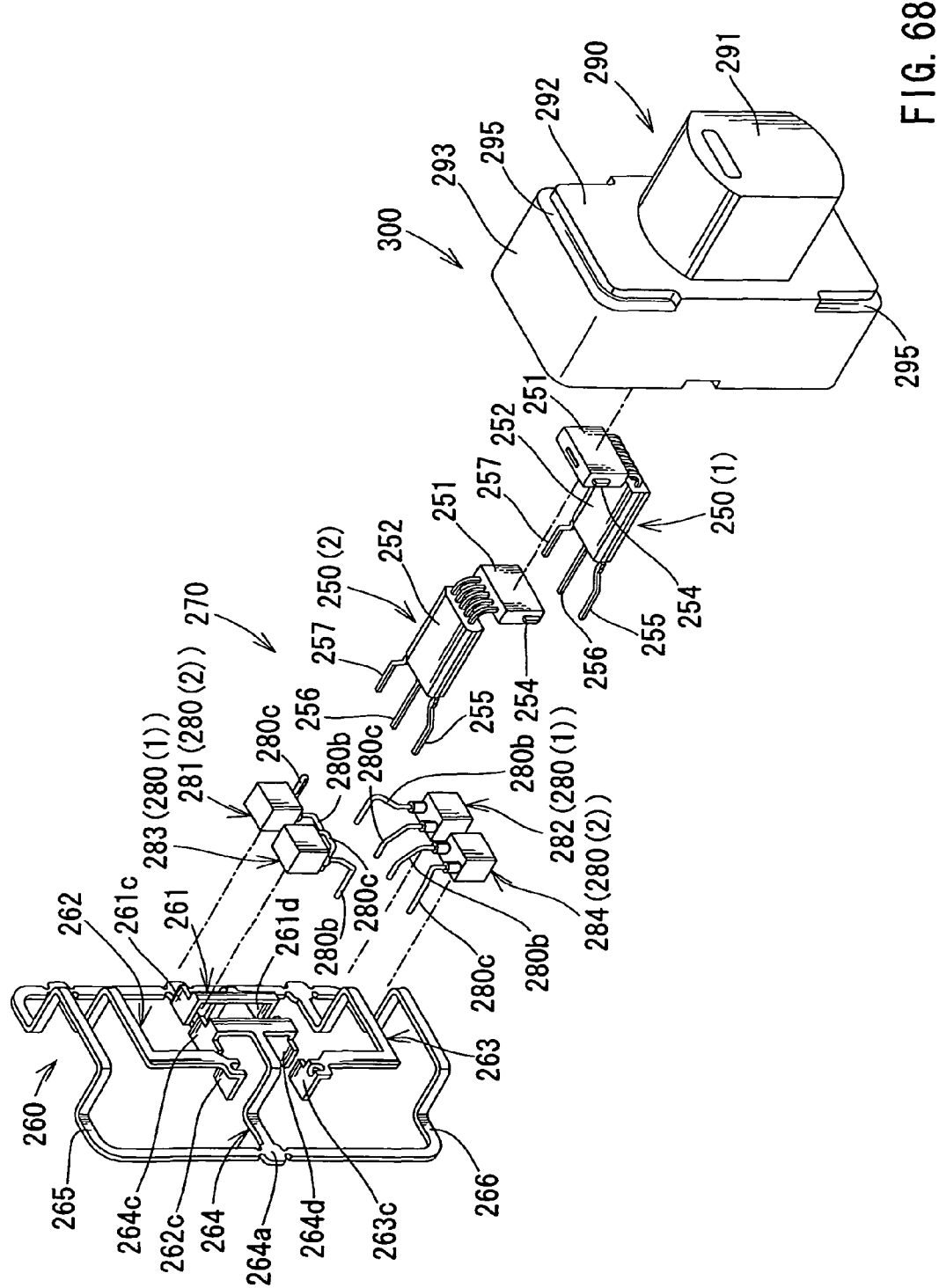
FIG. 68 is an exploded perspective view showing components of the sensor assembly.

For convenience of description, the main terminal assembly 270, the holder member 290, the sensor assembly 300, the sensor terminal unit 310, the sensor terminal assembly 320 and the cover 230 will be described below in this order. It should be noted that the components of the sensor assembly 300 are shown in FIG. 68 in an exploded perspective view. Further, in this embodiment, the main terminal assembly 270, the holder member 290, the sensor assembly 300, the sensor terminal unit 310 and the sensor terminal assembly 320 are described in such a way that the front side (the right side as viewed in FIG. 35) of the cover 230 is regarded as the forward side (the front side), while the reverse side (the left side as viewed in FIG. 35) of the cover 230 is regarded as the back side (rear side).

Figure 40:
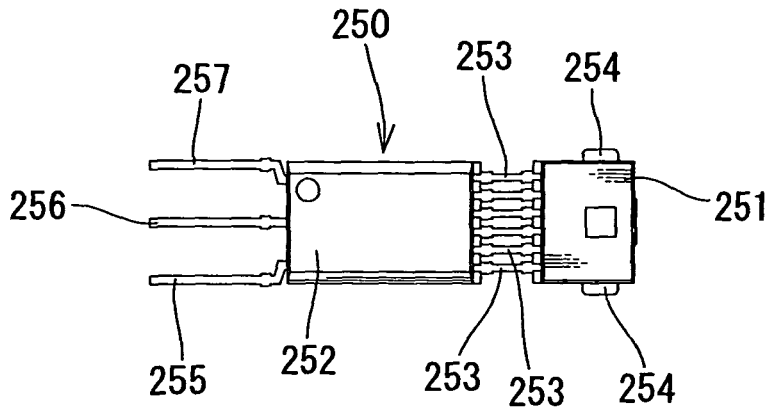
FIG. 40 is a front view showing a sensor IC.
Figure 41:
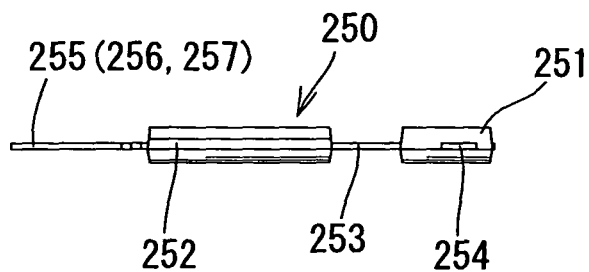
FIG. 41 is a side view showing the sensor IC.
Figure 42:
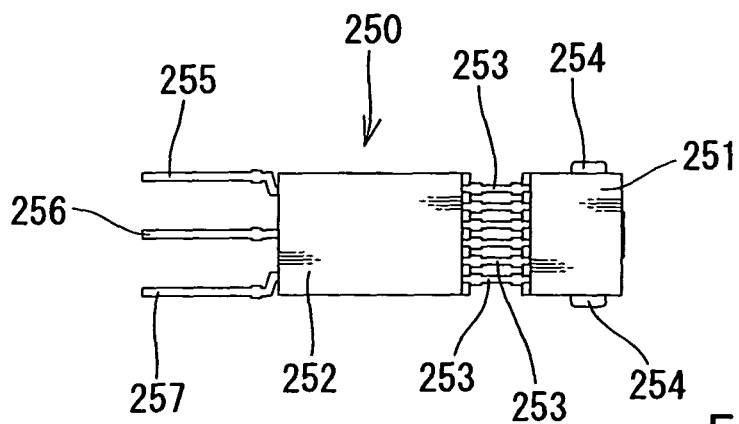
FIG. 42 is a rear view showing the sensor IC.
Figure 57:
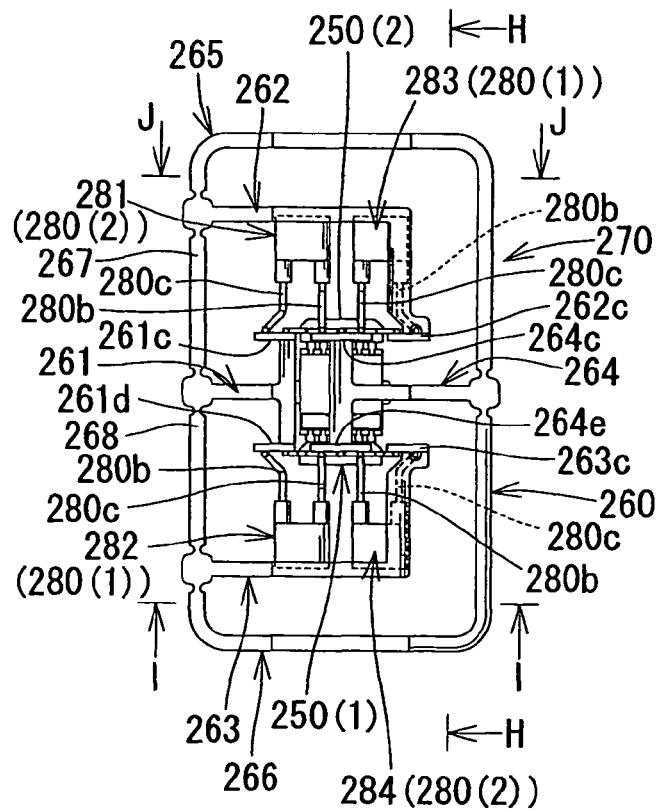
FIG. 57 is a front view showing a main terminal assembly.
Figure 58:
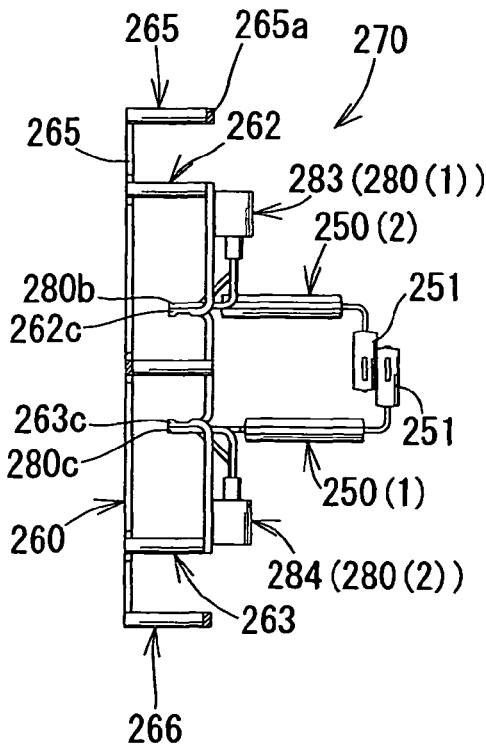
FIG. 58 is a cross-sectional view taken along line H-H in FIG. 57.
Figure 59:
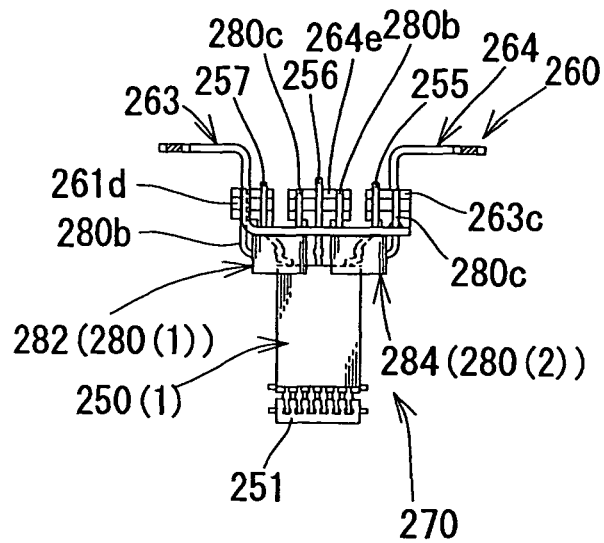
FIG. 59 is a cross-sectional view taken along line I-I in FIG. 57.
Figure 60:
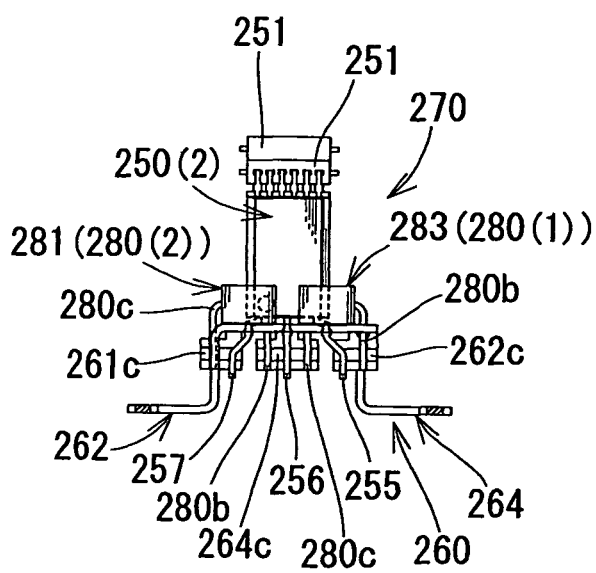
FIG. 60 is a cross-sectional view taken along line J-J in FIG. 57.

Firstly, the main terminal assembly 270 will be described. It should be noted that FIG. 57 is a front view showing the main terminal assembly 270; FIG. 58 is a cross-sectional view taken along line H-H in FIG. 57; FIG. 59 is a cross-sectional view taken along line I-I in FIG. 57; and FIG. 60 is a cross-sectional view taken along line J-J in FIG. 57. As shown in FIGS. 57 to 60, the main terminal assembly 270 consists of two sensor ICs 250(1), 250(2), one main terminal unit 260 and four capacitors 81, 82, 83, 84 (see FIG. 68). Two of the same sensor ICs 250 are used as the two sensor ICs 250(1), 250(2). As shown in FIGS. 40 to 42, the sensor IC 250, which is the same as in the first embodiment (see FIGS. 6 and 7), includes a magnetic sensing portion 251 and a computing portion 252, which is arranged in the front (the left side as viewed in FIGS. 40 to 42) of the magnetic sensing portion 251 via six connecting terminals 253. The magnetic sensing portion 251 of this embodiment includes magnetoresistive elements embedded in a resin shell such that both the left and the right sides of the shell are provided with metal positioning pieces 254, which project symmetrically from both the left and right sides (symmetrically about the left-right axis as viewed in FIG. 40). Further, the computing portion 252 includes an input connection terminal 255, a ground connection terminal 256 and an output connection terminal 257 projecting parallel to each other and forward (leftward as viewed in FIGS. 40 to 42). It should be noted that the sensor IC 250 is equivalent to the "magnetic detector" herein.

Figure 43:
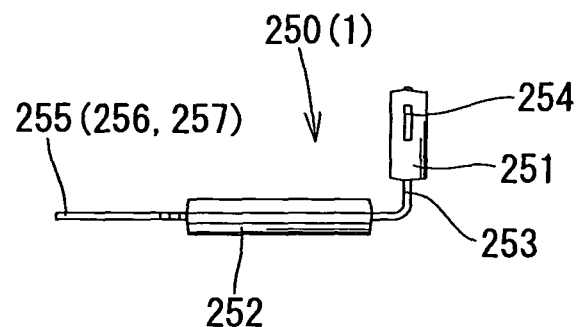
FIG. 43 is a side view showing a first sensor IC.
Figure 44:
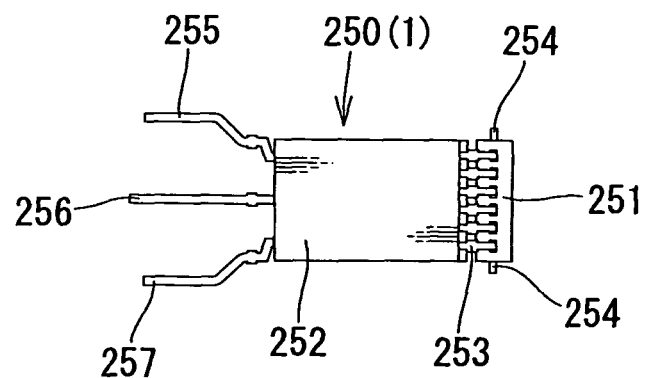
FIG. 44 is a rear view showing the first sensor IC.
Figure 45:
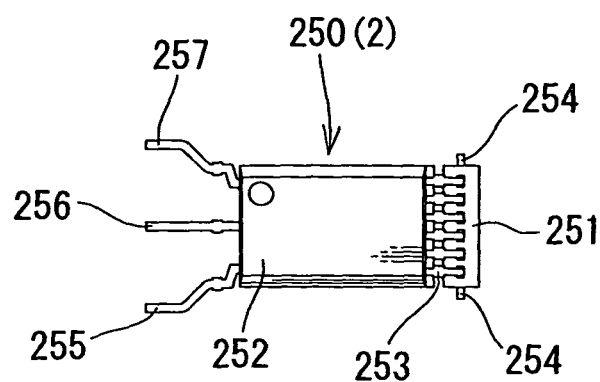
FIG. 45 is a front view showing a second sensor IC.
Figure 46:
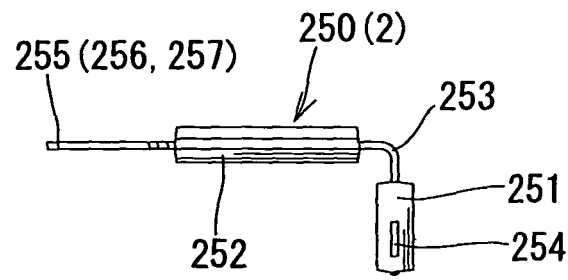
FIG. 46 is a side view showing the second sensor IC.

As shown in FIGS. 43 and 44, one sensor IC 250 of the two sensor ICs 250 is formed as a first sensor IC 50(1), the connecting terminals 253 of which are folded such that the magnetic sensing portion 251 is inclined toward the front side (upward as viewed in FIG. 43) at an angle of approximately 90 degrees. The tips of the connection terminals 255, 257 disposed on both sides of the first sensor IC 250(1) are spread in a parallel relationship with each other such that the spacings therefrom to the middle-positioned connection terminal 256 are widened (see FIG. 44). Further, as shown in FIGS. 45 and 46, the other sensor IC 250 is formed as a second sensor IC 250(2), the connecting terminals 253 of which are folded such that the magnetic sensing portion 251 is inclined toward the reverse side (downward as viewed in FIG. 46) at an angle of approximately 90 degrees. The tips of the connection terminals 255, 257 disposed on both sides of the second sensor IC 250(2) are spread in a parallel relationship with each other similar to the first sensor IC 250(1), such that the spacings therefrom to the middle-positioned connection terminal 256 are widened (see FIG. 45).

Figure 52:
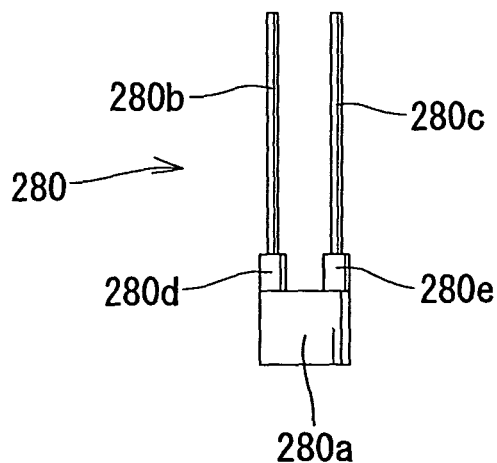
FIG. 52 is a front view showing a capacitor.

Then, the capacitors 281, 282, 283, 284 will be described. The same capacitor 280 is used for each capacitor 281, 282, 283, 284 (see FIG. 68). As shown in FIG. 52, the capacitor 280 includes a capacitor body 280a, two leads 280b, 280c bilaterally extending upward from the capacitor body 280a. The proximal end of each lead 280b, 280c is supported by supporting portions 280d, 280e, which are integrally formed on the top surface of the shell of the capacitor body 280a. It should be noted that each capacitor 281, 282, 283, 284 serves as a preventive measure for discharge of positive charges, similar to each capacitor 81, 82, 83, 84 of the first embodiment, such that high voltages due to static electricity may not be applied to the respective sensor ICs 250(1), 250(2).

Figure 53:
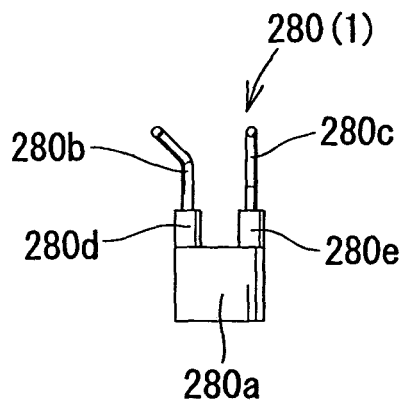
FIG. 53 is a front view showing a first capacitor.
Figure 54:
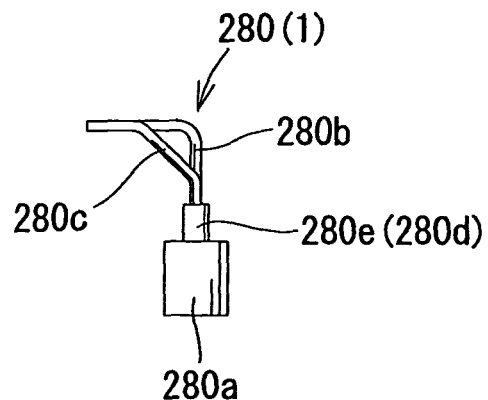
FIG. 54 is a right side view showing the first capacitor.
Figure 55:
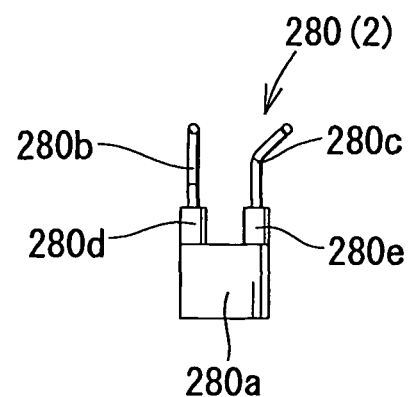
FIG. 55 is a front view showing a second capacitor.
Figure 56:
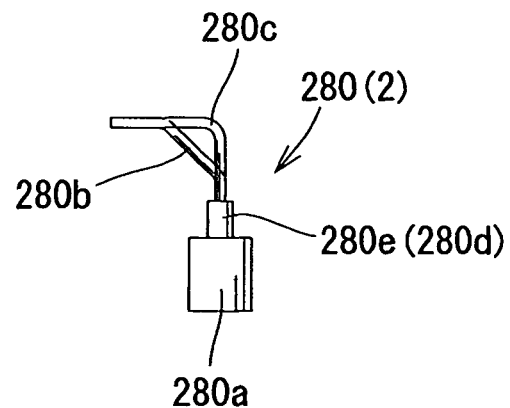
FIG. 56 is a right side view showing the second capacitor.

The same capacitor 280(1) is used for two capacitors 283, 283 of the four capacitors 281, 282, 283, 284, while the same capacitor 280(2) is used for the remaining two capacitors 281, 284 (see FIGS. 55 and 56). As shown in FIGS. 53 and 54, one capacitor 280(1) is configured to have the left-side lead 280b inclined in the left oblique direction and also both tips of the leads 280b, 280c parallel folded in the forward direction (leftward in FIG. 54). Further, as shown in FIGS. 55 and 56, the other capacitor 280(2) is configured to have the right-side lead 280c inclined in the right oblique direction and also both tips of the leads 280b, 280c parallel folded in the forward direction (leftward in FIG. 54).

Figure 47:
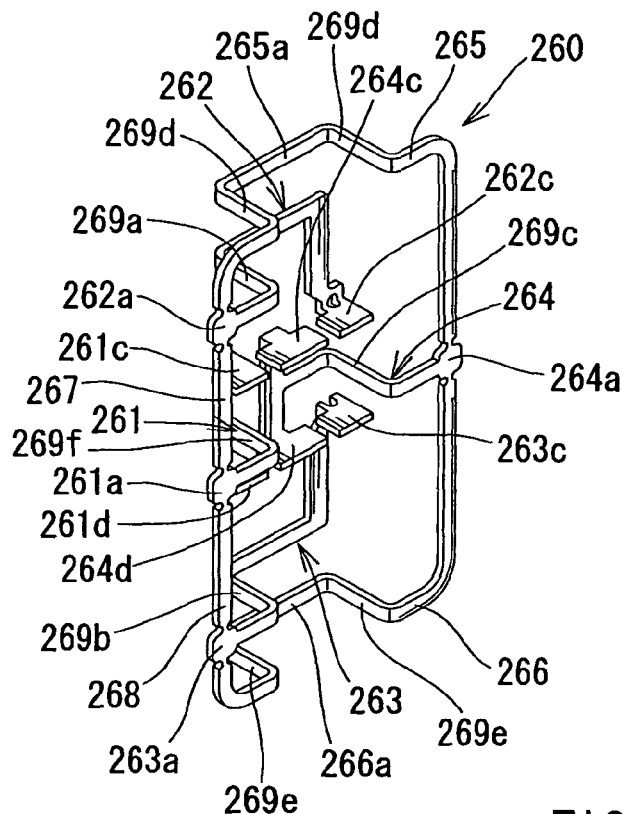
FIG. 47 is a perspective view showing a main terminal unit.
Figure 48:
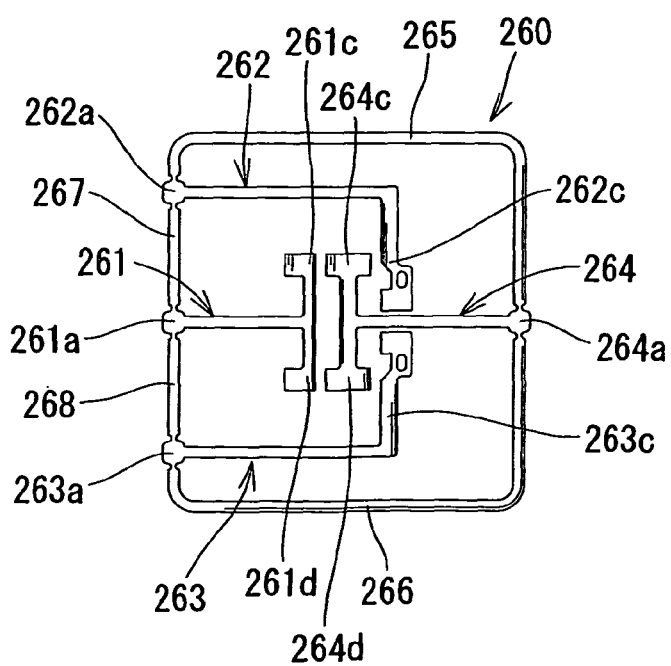
FIG. 48 is a development view showing the main terminal unit.
Figure 49:
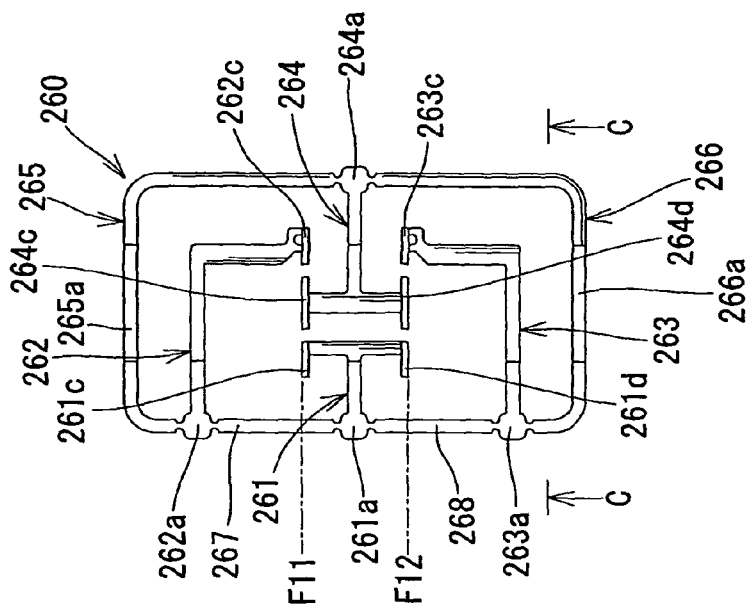
FIG. 49 is a front view showing the main terminal unit.
Figure 50:
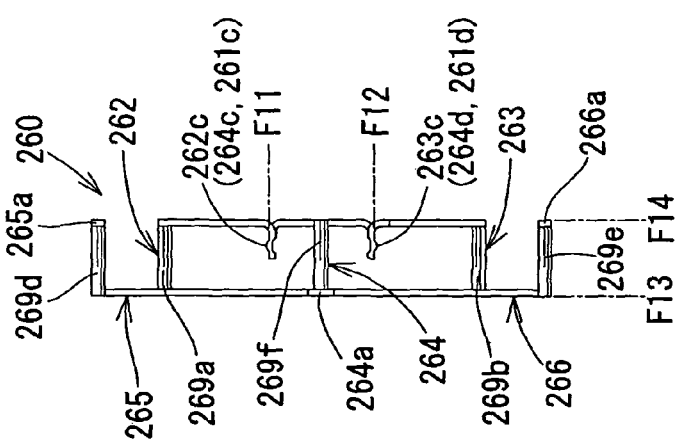
FIG. 50 is a right side view showing the main terminal unit.
Figure 51:
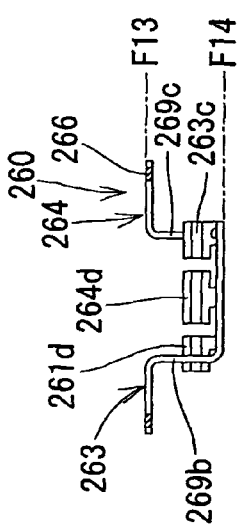
FIG. 51 is a cross-sectional view taken along line G-G in FIG. 49.

Next, the main terminal unit 260 will be described. It should be noted that FIG. 47 is a perspective view showing the main terminal unit 260; and FIG. 48 is a development view showing the same. Further, FIG. 49 is a front view showing the main terminal unit; FIG. 50 is a right side view showing the same; and FIG. 51 is a cross-sectional view taken along line G-G in FIG. 49. The main terminal unit 260 is formed by press molding an electrically conductive sheet stock such as a copper alloy plate. As shown in FIG. 48, the main terminal unit 260 includes a signal input (referred to as Vc hereafter) main terminal 261, a signal output (referred to as V1 hereafter) main terminal 262, a signal output (referred to as V2 hereafter) main terminal 263, and a ground (referred to as GND hereafter) main terminal 264. Terminal connections 261a, 262a, 263a, 264a (later described) of the main terminals 261, 262, 263, 264 are connected with each other by tie bars 265, 266, 267, 268, which form a substantially square frame-like shape.

More specifically, referring to FIG. 48, the Vc main terminal 261 includes the terminal connection 261a disposed in the middle portion on the left side of the main terminal unit 260. Further, the V1 main terminal 262 includes the terminal connection 262a disposed in the upper portion on the left side. Further, the V2 main terminal 263 includes the terminal connection 263a disposed in the lower portion on the left side. Further, the GND main terminal 264 includes the terminal connection 264a disposed in the middle portion on the right side. Then, the upper tie bar 265 is configured in a substantially inverted-U-shape so as to connect the terminal connection 262a disposed in the upper portion on the left side with the terminal connection 264a disposed in the middle portion on the right side. Further, the lower tie bar 65 is configured in a substantially U-shape so as to connect the terminal connection 61a disposed in the middle portion on the right side with the terminal connection 62a disposed in the lower portion on the left side. Further, the upper left tie bar 267 is configured in a straight line so as to connect the terminal connection 262a disposed in the upper portion on the left side with the terminal connection 261a disposed in the middle portion on the left side. Further, the lower left tie bar 268 is configured in a straight line extending downwardly and serially from the upper left tie bar 267, so as to connect the terminal connection 261a disposed in the middle portion on the left side with the terminal connection 263a disposed in the lower portion on the left side.

Referring to FIG. 48, the Vc main terminal 261 includes the terminal connection 261a, as well as an upper IC terminal connection 261c and a lower IC terminal connection 261d. The upper IC terminal connection 261c extends upward from the right end of the terminal connection 261a. Further, the lower IC terminal connection 261d, which extends downward from the right end of the terminal connection 261a, is formed symmetrically about the upper IC terminal connection 261c as the left-right axis.

Further, the V1 main terminal 262 includes the terminal connection 262a, as well as an IC terminal connection 262c. The IC terminal connection 262c extends downward from the right end of the terminal connection 262a.

Further, the V2 main terminal 263, which includes the terminal connection 263a, as well as an IC terminal connection 263c, is formed symmetrically about the V1 main terminal 262 as the left-right axis. Thus, the IC terminal connection 263c extends downward from the right end of the terminal connection 263a.

Further, the GND main terminal 264 includes the terminal connection 264a, as well as an upper IC terminal connection 264c and a lower IC terminal connection 264e. The upper IC terminal connection 264c, which extends upward from the left end of the terminal connection 264a, is formed in a predetermined spaced relationship between the upper IC terminal connection 261c and the IC terminal connection 262c. Further, the lower IC terminal connection 264e is formed symmetrically about the upper IC terminal connection 264e as the left-right axis. Thus, the lower IC terminal connection 264e, which extends downward from the left end of the terminal connection 264a, is formed in a predetermined spaced relationship between the lower IC terminal connection 261d and the IC terminal connection 263c.

Thus, the tips of the IC terminal connections 261c, 261d, 262c, 263c, 264c, 264e of the main terminals 261, 262, 263, 264 are enlarged in a substantially square shape. Then, both of the tips of the IC terminal connections 261c, 261d of the Vc main terminal 261 are folded forward and parallel to each other (see FIGS. 47 and 49). Further, the tip of the IC terminal connection 262c of the V1 main terminal 262 and the tip of the IC terminal connection 263c of the V2 main terminal 263 are folded forward (leftward in FIG. 50) and parallel to each other. Further, both of the tips of the IC terminal connections 262c, 264e of the GND main terminal 264 are folded forward (leftward in FIG. 50) and parallel to each other. Additionally, the tips of the IC terminal connections 261c, 262c, 264c on the upper side are provided on the same plane F11 (see FIGS. 49 and 50). Further, the tips of the IC terminal connections 261d, 263c, 264e on the lower side are provided on the same plane F12 (see FIGS. 49 and 50). It should be noted that each IC terminal connection 261c, 261d, 262c, 263c, 264c, 264e doubles as the "capacitor connection" in this embodiment.

Further, the external ends of the terminal connections 261a, 262a, 263a, 264a (see FIGS. 50 and 47) and the tie bars 265, 266, 267, 268 are provided on the same plane F13 (see FIGS. 50 and 53), which is displaced forward (leftward in FIG. 50) from the IC terminal connections 261c, 261d, 262c, 263c, 264c, 264e. Further, the intermediate portions between the external ends of the terminal connections 261a, 262a, 263a, 264a and the tips of the IC terminal connections 261c, 261d, 262c, 263c, 264c, 264e are provided on the same plane F14 (see FIGS. 50 and 53), which is displaced rearward (rightward in FIG. 50) from the tips of the IC terminal connections 261c, 261d, 262c, 263c, 264c, 264e.

Further, as shown in FIG. 50, the middle portion of the top of the upper tie bar 265 is provided with a stepped portion 265a, which is disposed on plane F14 displaced reward (rightward in FIG. 50) (see FIG. 47). Further, the middle portion of the top of the lower tie bar 266 is provided with a stepped portion 266a, which is disposed on plane F14 displaced rearward (rightward in FIG. 50) (see FIG. 47).

As described above, since each portion is provided on predetermined planes F14, F15, the interconnection between these portions is provided with a folded portion, which extends from the front to the reverse. Thus, referring to FIG. 47, the terminal connection 262a and the IC terminal connection 262b of the V1 main terminal 262 are formed in a stepped shape via a folded portion 269a. Further, the terminal connection 263a and the IC terminal connection 263c of the V2 main terminal 263 are formed in a stepped shape via a folded portion 269b. Further, the terminal connections 264a and both of the IC terminal connections 264c, 264e of the GND main terminal 264 are formed in a stepped shape via a folded portion 269c. Further, the terminal connection 261a and both of the IC terminal connections 261c, 261d of the Vc main terminal 261 are formed in a stepped shape via a folded portion 269f. Further, the upper tie bar 265 is provided with a stepped portion 265a via both folded portions 269d on the left and the right sides. Further, the lower tie bar 266 is provided with a stepped portion 66a via both folded portions 269e on the left and the right sides. It should be noted that the outer surface of the main terminal unit 260 is plated with Ni (not shown).

It should be noted that each IC terminal connection 61c, 61d, 62c, 63c, 64c, 64e of the main terminals 61, 62, 63, 64 is equivalent to the "magnetic-detector-side connection portion" and the "housed portion" herein. Further, the external end of each terminal connection 261a, 262a, 263a, 264a is equivalent to the "exposed portion" herein. Then, the housed portion and the exposed portion are formed in a stepped shape via each folded portion 269a, 269b, 269c, 269f.

The main terminal assembly 270 will now be described. As shown in FIGS. 57 to 60, the main terminal assembly 270 is configured such that the main terminal unit 260 is implemented with the sensor ICs 250(1), 250(2) and the capacitors 281, 282, 283, 284. Thus, the first sensor IC 250(1) and the second sensor IC 250(2) are oppositely disposed on the reverse (rear) of the main terminal unit 260, such that the magnetic sensing portion 251 of the second sensor IC 250(2) is overlapped against the rear side (the right side as viewed in FIG. 58) of the magnetic sensing portion 251 of the second sensor IC 250(2). Accordingly, on the reverse side (the rear side) of the main terminal unit 260, the capacitor 282(2) as a first capacitor 281 is disposed such that the leads 280b, 280c are directed downward, while the capacitor 280 (1) as a second capacitor 282 is disposed such that the leads 280b, 280c are directed upward. Additionally, on the reverse side (the rear side) of the main terminal unit 260, the capacitor 280(1) as a third capacitor 283 is disposed such that the leads 280b, 280c are directed downward, while the capacitor 280 (2) as a fourth capacitor 284 is disposed such that the leads 280b, 280c are directed upward.

Under these conditions, the output connection terminal 257 of the first sensor IC 250(1) and the lead 280b of the second capacitor 282 (equivalent to the capacitor 280(1)) are electrically connected with the bottom surface of the tip of the lower IC terminal connection 261d in the Vc main terminal 261 of the main terminal unit 260 by welding (not designated). It should be noted that the lead 280b of the second capacitor 282 is arranged on the left side of the output connection terminal 257 (see FIG. 59). Further, the ground connection terminal 256 of the first sensor IC 250(1) and the lead 280c of the second capacitor 282 (equivalent to the capacitor 280(2)) are electrically connected with the bottom surface of the tip of the lower IC terminal connection 264e in the GND main terminal 264 of the main terminal unit 260 by welding (not designated). It should be noted that the lead 280c of the second capacitor 282 is arranged on the left side of the ground connection terminal 256, while the lead 280b of the fourth capacitor 284 is arranged on the right side of the ground connection terminal 256 (see FIG. 59). Further, the input connection terminal 255 of the first sensor IC 250(1) and the lead 280c of the fourth capacitor 284 are electrically connected with the bottom surface of the tip of the IC terminal connection 263c in the V2 main terminal 263 of the main terminal unit 260 by welding (not designated). It should be noted that the lead 280c of the fourth capacitor 284 is arranged on the right side of the output connection terminal 257 (see FIG. 59).

Further, the output connection terminal 257 of the second sensor IC 250(2) and the lead 280c of the first capacitor 281 (equivalent to the capacitor 280(2)) are electrically connected with the top surface of the tip of the upper IC terminal connection 261c in the Vc main terminal 261 of the main terminal unit 260 by welding (not designated). It should be noted that the lead 280c of the first capacitor 281 is arranged on the left side of the output connection terminal 257 (see FIG. 59). Further, the ground connection terminal 256 of the second sensor IC 250(2) and the lead 280b of the third capacitor 283 (equivalent to the capacitor 280(1)) are electrically connected with the top surface of the tip of the upper IC terminal connection 264c in the GND main terminal 264 of the main terminal unit 260 by welding (not designated). It should be noted that the lead 280b of the first capacitor 281 is arranged on the left side of the ground connection terminal 256, while the lead 280c of the third capacitor 283 is arranged on the right side of the ground connection terminal 256 (see FIG. 60). Further, the input connection terminal 255 of the second sensor IC 250(2) and the lead 280b of the third capacitor 283 are electrically connected with the top surface of the tip of the IC terminal connection 262c in the V1 main terminal 262 of the main terminal unit 260 by welding (not designated). It should be noted that the lead 280b of the third capacitor 283 is arranged on the right side of the output connection terminal 257 (see FIG. 60). As described above, the IC terminal connections 261c, 261d, 262c, 263c, 264c, 264e of the main terminal unit 260, the connection terminals 255, 256, 257 of the sensor ICs 250(1), 250(2), and the connections of the leads 280b, 280c of the capacitors 281,282,283,284 are arranged in upper-and-lower two rows.

Meanwhile, the welding includes spot welding or resistance welding, for example. When welding, a jig 286 (see FIGS. 61 and 62) is used for positioning the main terminal unit 260, the sensor ICs 250(1), 250(2) and the capacitors 281, 282, 283, 284 in position. Thus, this jig 286 is configured to allow the capacitors 281, 282, 283, 284 to be positioned as described below. It should be noted that, since the capacitors 281, 283 arranged in an upper row and the capacitors 282, 284 arranged in the lower row are retained symmetrically about the left-right axis, the retaining structure for the lower left capacitor 282 (280(1)) will be described, while the retaining structures for the other capacitors 281, 283, 284 will be omitted.

Figure 64:
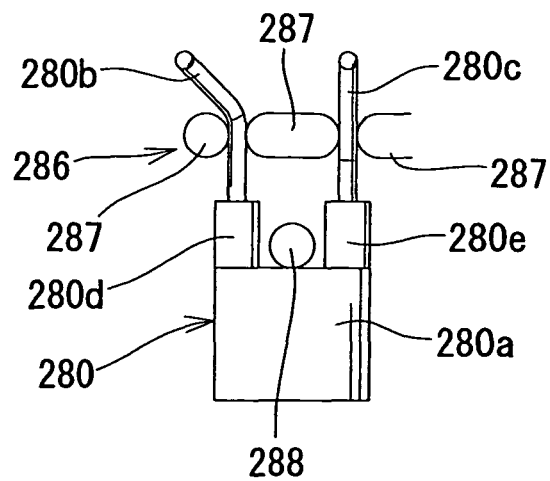
FIG. 64 is a plan view showing the jig.

As shown in FIG. 64, the jig 286 is provided with a predetermined number (e.g., three) of first positioning pins 287, which are arranged across the leads 280b, 280c of the capacitor 280. The spacing between the adjacent ones of the first positioning pins 287 is formed as a spacing that can be positioned by fitting each lead 280b, 280c of the capacitor 280 therebetween. Accordingly, the jig 286 is provided with a positioning pin 288 that can perform the positioning by relatively inserting it between the supporting portions 280d, 280e of the capacitor body 280a of the capacitor 280. It should be noted that the axes of both of the positioning pins 287, 288 extend orthogonal to the plane of the drawing as viewed in FIG. 64. Therefore, it is possible to position the capacitor 280 in position by relatively inserting the positioning pin 288 of the jig 286 between the supporting portions 280d, 280e of the capacitor body 280a, and also by inserting the leads 280b, 280c between the adjacent ones of the first positioning pins 287.

Figure 61:
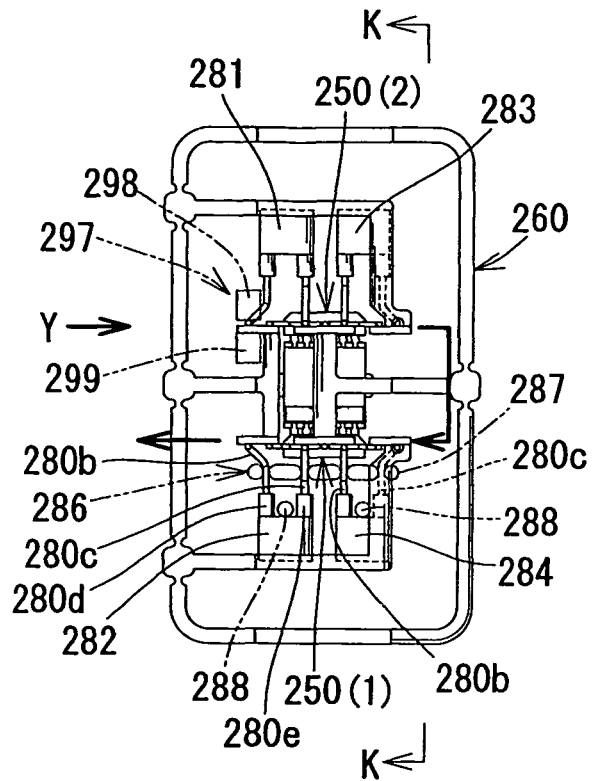
FIG. 61 is a front view showing a relationship between a welding head and a jig against the main terminal assembly.
Figure 62:
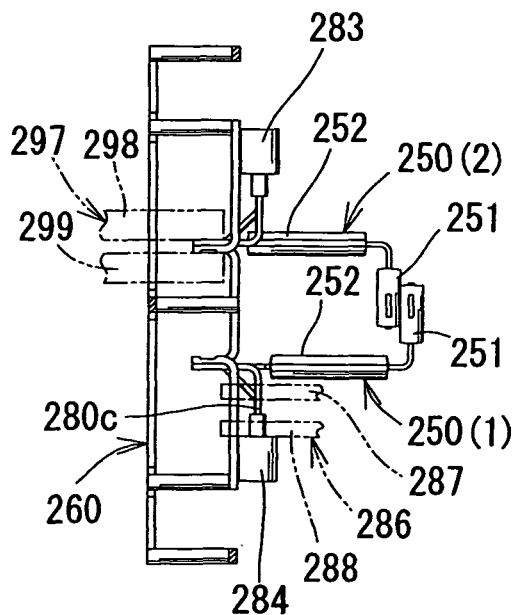
FIG. 62 is a cross-sectional view taken along line K-K in FIG. 61.
Figure 63:
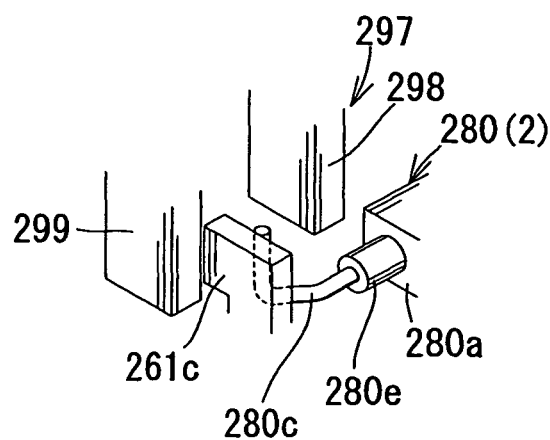
FIG. 63 is a perspective view showing the welding head.

When spot welding or resistance welding is used, a welding head 297 (see FIG. 63), which includes a pair of welding electrodes 298, 299 that can be opened and closed, moved from the left to the right along the upper row directions, for example, shown by arrow Y in FIG. 61, while the upper row is welded in step-by-step manner. Subsequently, the welding head 297 is moved to the lower, and then is moved from the right to the left along the lower row directions, while the lower row is welded in step-by-step manner.

Next, the holder member 290 will be described. It should be noted that FIG. 65 is a front view showing the holder member 90; FIG. 66 is a cross-sectional view taken along line M-M; and FIG. 67 is a rear view showing the holder member 290. The holder member 290, which is, for example, made of resin, is configured to mainly have a closed-end elliptical cylinder shaped hollow tube portion 291 that closes the front side and opens the rear side (see FIG. 66). The front side (the left side in FIG. 66) of the hollow tube portion 291 is provided continuously with an enlarged tube portion 293 such that the opening is enlarged via an intermediate end plate portion 292 in a longitudinally rectangular plate shape. The intermediate end plate portion 292 extends from the outer surface of the hollow tube portion 291 upward, downward, leftward and rightward. Further, the intermediate end plate portion 292 is provided with upper-end and lower-end corner portions, in which retaining recesses 295 that are substantially U-shaped surrounding grooves are formed symmetrically about the left-right axis (see FIG. 68).

Guiding grooves 294 are provided in the middle portion of the opposed wall surfaces of both the left and the right sidewalls 291a, 291b (see FIG. 67) of the hollow tube portion 291 in such a manner that the grooves 294 extend in the front-rear direction (the left-right direction in FIG. 66). It should be noted that the guiding grooves 294 are equivalent to the "guiding portions" herein. More specifically, referring to FIG. 66, the bottom ends of the guiding grooves 294 (the ends on the bottom end surface 291e side of the hollow tube portion 291) are, similar to the first embodiment, formed as positioning grooves 294a, the widths (the widths extending in the up-down direction in FIG. 65) of which are configured to receive both the positioning pieces 254 (see FIGS. 40 to 42) on the left and the right sides of the magnetic sensing portions 51 (see FIG. 58) of the sensor ICs 50(1), 50(2). Further, the portions extending from the positioning grooves 294a of the guiding grooves 294 to the opening end surface (leftward in FIG. 66) of the hollow tube portion 291 are formed as tapered grooves 294b, the widths (the widths extending in the up-down direction in FIG. 66) of which are configured in a tapered shape so as to be gradually enlarged from the positioning grooves 294a to the opening end surface of the hollow tube portion 291. Further, the spacing defined between both the left and the right sidewalls 291a, 291b of the hollow tube portion 91 (see FIG. 67) is configured to receive the respective sensor ICs 250(1); 250(2), or to be slightly wider than the width (the width extending in the up-down direction in FIGS. 40 and 42) of the magnetic sensing portion 251 and the computing portion 252 of the respective sensor ICs 50(1), 50(2).

The bottom end surface 291e of the hollow tube portion 291 is formed with a predetermined spacing S along the contour shape of the respective sensor ICs 50(1), 50(2) facing to the bottom end surface 291e. It should be noted that the bottom end surface 291e of the holder member 290 is equivalent to the "bottom surface" herein. Further, the contour shape of the respective sensor ICs 50(1), 50(2) facing the bottom end surface 291e is equivalent to the periphery of the magnetic sensing portion 251 of the first sensor IC 250(1) and the periphery of the magnetic sensing portion 251 of the second sensor ICs 250(2) that is exposed toward the rear side from the magnetic sensing portion 251 of the first sensor IC 250(1).

Further, as shown in FIG. 65, the opposed wall surfaces of both the left and the right sidewalls 293a, 293b of the enlarged tube portion 293 are provided with an appropriate number of linear reinforcing ribs 296 (six ribs respectively on the left and the right sides shown in FIGS. 65 and 66), which extend in the front-rear direction (the left-right direction) and in a predetermined spaced relationship in the up-down direction, while projecting symmetrically from the left and right sides. Additionally, the front-end surface of the left sidewall 293a of the enlarged tube portion 293 is provided with three engaging grooves 293c, 293d, 293e disposed respectively in upper, middle and lower portions. The upper engaging groove 293c is engageable with the middle portion of the terminal connection 262a (see FIG. 47) of the V1 main terminal 262 disposed on plane F13 (see FIGS. 50 and 51) in the main terminal unit 260. Further, the middle engaging groove 293d is engageable with the middle portion of the terminal connection 261a (see FIG. 47) of the Vc main terminal 261 disposed on plane F13 (see FIGS. 50 and 51) in the main terminal unit 260. Further, the lower engaging groove 293e is engageable with the middle portion of the terminal connection 263a (see FIG. 47) of the V2 main terminal 263 disposed on plane F13 (see FIGS. 50 and 51) in the main terminal unit 260. Further, the front-end surface of the right sidewall 293b of the enlarged tube portion 293 is provided with one engaging groove 293f. The engaging groove 293f is engageable with the middle portion of the terminal connection 264a (see FIG. 47) of the GND main terminal 264 disposed on plane F13 (see FIGS. 50 and 51) in the main terminal unit 260.

The sensor assembly 300 will now be described. It should be noted that FIG. 69 is a front view showing the sensor assembly 300; and FIG. 70 is a cross-sectional view taken along line N-N in FIG. 69. The sensor assembly 300 includes the main terminal assembly 270 (see FIGS. 57 to 60) and the holder member 290 (see FIGS. 65 and 66). As shown in FIG. 70, each sensor IC 250(1), 250(2) of the main terminal assembly 270 is inserted into and housed in the hollow tube portion 291 of the holder member 290. At this point, each positioning piece 254 (see FIGS. 43 and 44) of the magnetic sensing portion 251 of the first sensor IC 250(1) is fitted into the tapered groove 294b of each guiding groove 294 on the left or the right of the holder member 290, guided toward a predetermined assembled position, and finally engaged into the positioning groove 294a (see FIG. 66) so as to be positioned in the predetermined assembled position. Accordingly, the computing portion 252 of the first sensor IC 250(1) abuts on the lower wall surface 291e of the hollow tube portion 291 of the holder member 290 in surface-to-surface contacting manner (see FIG. 70).

Subsequently, each positioning piece 254 (see FIGS. 45 and 46) of the magnetic sensing portion 251 of the second sensor IC 250(2) is fitted into the tapered groove 294b of each guiding groove 294 on the left or the right of the holder member 290, guided toward a predetermined assembled position, and finally engaged into the positioning groove 294a (see FIG. 66) so as to be positioned in the predetermined assembled position. Accordingly, the computing portion 252 of the second sensor IC 250(2) abuts on the upper wall surface 291c of the hollow tube portion 291 of the holder member 290 in surface-to-surface contacting manner.

Further, as shown in FIGS. 69 and 70, the upper engaging groove 293c (see FIGS. 65 and 66) on the left sidewall 293a of the enlarged tube portion 293 of the holder member 290 is engaged with the middle portion of the terminal connection 262a of the V1 main terminal 262, the middle engaging groove 293d (see FIGS. 65 and 66) is engaged with the middle portion of the terminal connection 261a of the Vc main terminal 261, and the lower engaging groove 293e (see FIGS. 65 and 66) is engaged with the middle portion of the terminal connection 263a of the V2 main terminal 263. Accordingly, the engaging groove 293f (see FIG. 65) of the right sidewall 293b of the enlarged tube portion 293 is engaged with the middle portion of the terminal connection 264a of the GND main terminal 264. Accordingly, the sensor assembly 300 is incorporated into the holder member 90 in predetermined positioned manner (see FIGS. 69 and 70).

Further, when each sensor IC 50(1), 50(2) is positioned by engaging each engaging groove 293c, 293d, 293e, 293f of the enlarged tube portion 293 of the holder member 290 with the middle portion of the terminal connection 262a, 261a, 263a, 264a of each main terminal 262, 261, 263, 264, the contour shape of the rear side of each sensor IC 50(1), 50(2) represents a form configured with a predetermined spacing S along the bottom end surface 291e of the hollow tube portion 291 of the holder member 290 (see FIG. 70). As described above, the center of the magnetic sensing portion 251 of each sensor IC 250(1), 250(2) is aligned with an axis of the hollow tube portion 291 of the holder member 290 (see FIGS. 69 and 70).

When each sensor IC 250(1), 250(2) is housed into the hollow tube portion 291 of the holder member 290 as described above, the connection portion between each connection terminal 255, 256, 257 of each sensor IC 250(1), 250(2) with each main terminal 261, 262, 263, 264, and each capacitor 281, 282, 283, 284 (see FIGS. 57 to 60) etc. are housed into the enlarged tube portion 293 of the holder member 290. Further, the external end of each terminal connection 261a, 262a, 263a, 264a and each tie bar 265, 266, 267, 268 remain exposed from the enlarged tube portion 293 of the holder member 290. Thus, when the external end of each terminal connection 261a, 262a, 263a, 264a (see FIGS. 57 to 60), i.e., the exposed portion of each main terminal 261, 262, 263, 264, is disposed outside of the opening of the holder member 290, each IC terminal connection 261c, 261d, 262c, 263c, 264c, 264e (see FIGS. 57 to 60), i.e., the housed portions, are housed into the holder member 290 with each sensor IC 250(1), 250(2) and each capacitor 281, 282, 283, 284, so as to be closer to the bottom than the exposed portion within the holder member 290 (see FIGS. 69 and 70).

Figure 71:
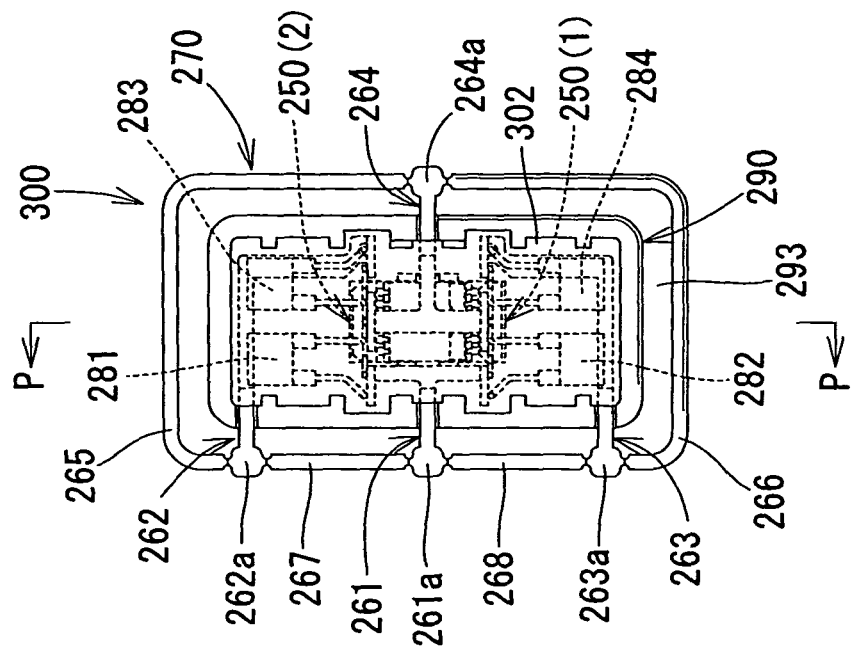
FIG. 71 is a front view showing the sensor assembly in which a potting material has been potted into the holder member.
Figure 72:
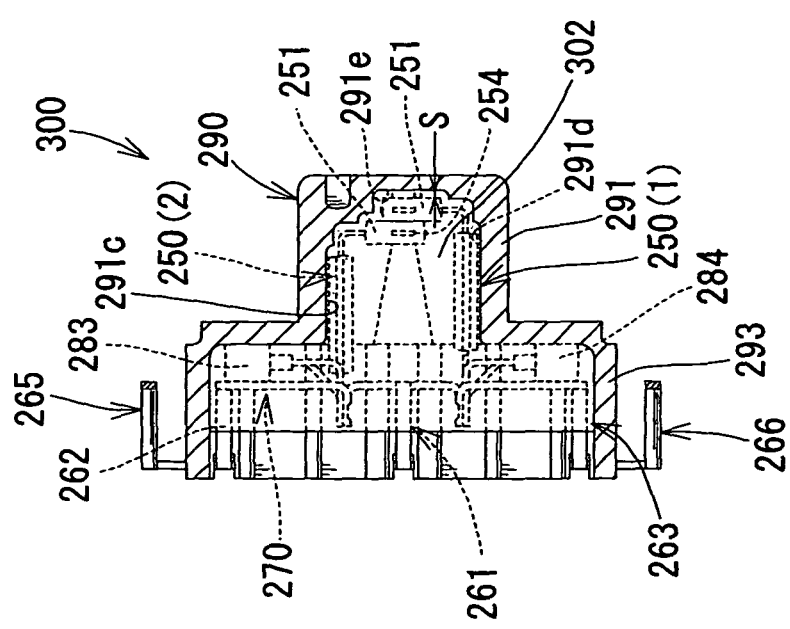
FIG. 72 is cross-sectional view taken along line P-P in FIG. 71.

Under these conditions, as shown in FIGS. 71 and 72, a potting material 302 is substantially entirely within the holder member 290, for example, by a dispenser (not shown). More specifically, the potting material 302 is potted into the holder member 290 so as to reach closer to each engaging groove 293c, 293d, 293e, 293f of the holder member 290. Accordingly, each sensor IC 250(1), 250(2), each connection terminal 255, 256, 257 thereof, each capacitor 281, 282, 283, 284, and the housed portion of each main terminal 261, 262, 263, 264 housed within the holder member 290 are buried with the potting material 302 (see FIGS. 71 and 71).

Further, similar to the potting material 102 of the first embodiment, a resin such as an epoxy resin, which is permanently soft but insufficient to inadvertently drip, is adopted as the potting material 302 such that each sensor IC 250(1), 250(2) and each capacitor 281, 282, 283, 284 are protected from thermal stress, vibration and the like. Further, potting the potting material 302 into the hollow tube portion 291 of the holder member 290 avoids the occurrence of distortions of the magnetic sensing portion 251 of each sensor IC 250(1), 250(2) such that declining of the detection accuracy due to the occurrence of distortions can be prevented. Insert molding, for example, may lead to a problem of declining of the detection accuracy because the magnetic sensing portion 251 of each sensor IC 250(1), 250(2) is distorted by the inserting pressure of the resin, but it is possible to eliminate such a problem by potting the potting material 302.

Figure 73:
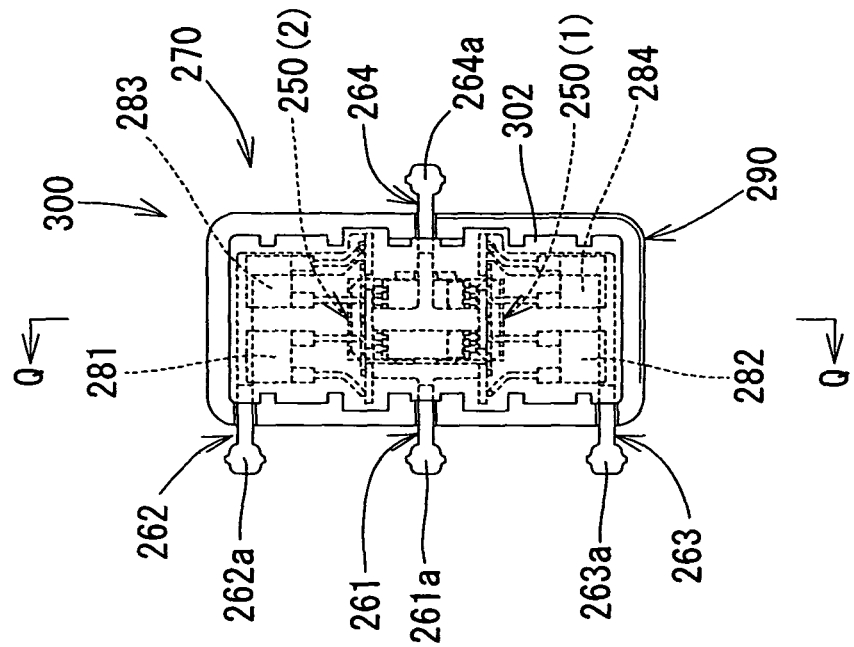
FIG. 73 is a front view showing the sensor assembly in which tie bars have been cut.
Figure 74:
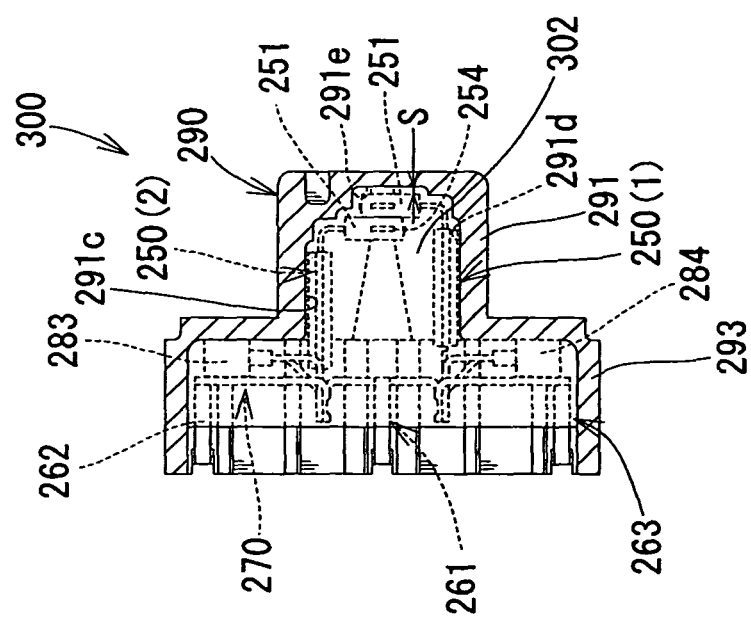
FIG. 74 is a cross-sectional view taken along line Q-Q in FIG. 73.

After potting the potting material 302, each tie bar 265, 266, 267, 268 of the main terminal unit 260 is removed by cutting. Accordingly, as shown FIGS. 73 and 74, each separated main terminal 261, 262, 263, 264 is formed from the main terminal unit 260. The sensor assembly 300 configured as above serves as a basis of a rotational angle sensor (designated as Se). It should be noted that FIGS. 73 and 74 show the sensor assembly 300 in which the tie bars of the main terminal unit have been cut; (a) is a front view, while (b) is a cross-sectional view taken along line B-B in (a).

Figure 75:
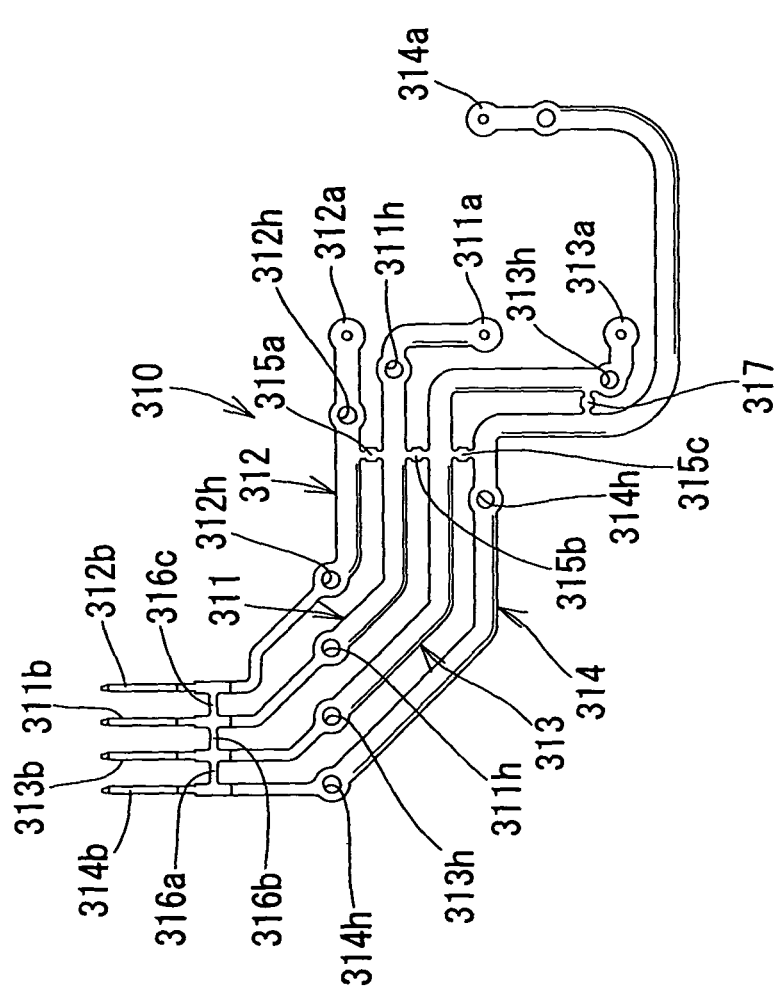
FIG. 75 is a front view showing a sensor terminal.
Figure 76:
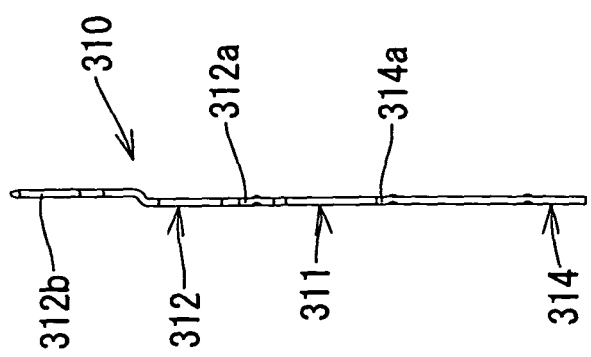
FIG. 76 is a right side view showing the sensor terminal.

Next, the sensor terminal unit 310 will be described. FIG. 75 is a front view showing the sensor terminal unit 310; and FIG. 76 is a right side view showing the same. The sensor terminal unit 310 is formed by press molding an electrically conductive sheet stock such as a copper alloy plate. As shown in FIG. 75, the sensor terminal unit 310 includes the Vc sensor terminal 311, the V1 sensor terminal 312, the V2 sensor terminal 313, and the GND sensor terminal 314. Then, the adjacent sensor terminals 311, 312, 313, 314 are connected with each other by each tie bar 315a, 315b, 315c, 316a, 316b, 316c. More specifically, referring FIG. 75 in the order from the bottom to the top, the V1 sensor terminal 312, the Vc sensor terminal 311, the V2 sensor terminal 313, and the GND sensor terminal 314 are arranged parallel. The tie bars 315a, 315b, 315c, which are disposed on the right side or the terminal connection side of the sensor terminal unit 310, are arranged serially in a straight line extending in the up-down direction. The upper tie bar 315a connects the V1 sensor terminal 312 with the Vc sensor terminal 311. Further, the middle tie bar 315b connects the Vc sensor terminal 311 with the V2 sensor terminal 313. Further, the lower tie bar 315c connects the V2 sensor terminal 313 with the GND sensor terminal 314.

Further, in the upper portion of the left side or the external connection, side of the Sensor terminal unit 310, the GNP sensor terminal 314, the V2 sensor terminal 313, the Vc sensor terminal 311, and the V1 sensor terminal 312 are arranged parallel in the left-right direction. Then, the tie bars 316a, 316b, 316c in the upper portion of the left side or the external connection side of the sensor terminal unit 310 are arranged serially in a straight line extending in the left-right direction. The left-side tie bar 316a connects the GND sensor terminal 314 with the V2 sensor terminal 313. Further, the middle tie bar 316b connects the V2 sensor terminal 313 with the Vc sensor terminal 311. Further, the right-side tie bar 316c connects the Vc sensor terminal 311 with the V1 sensor terminal 312. Further, the adjacent portions of the GND sensor terminal 314 and the V2 sensor terminal 313 in the lower of the sensor terminal unit 310 are connected by the tie bar 317.

Referring to FIG. 75, the Vc sensor terminal 311 includes the terminal connection end 311a provided at one end thereof or the right end of the terminal connection side, and the external connection end 311b provided at the other end thereof or the left end of the external connection side. The terminal connection end 311a is formed to be connectable with the terminal connection 261a (see FIG. 73) of the Vc main terminal 261 of the sensor assembly 300. Further, the external connection end 311b is formed to be connectable with the corresponding terminal pin (not shown) of the unshown external connector. Further, the V1 sensor terminal 312 includes the terminal connection end 312a provided at one end thereof or the right end of the terminal connection side, and the external connection end 312b provided at the other end thereof or the left end of the external connection side. The terminal connection end 312a is formed to be connectable with the terminal connection 261a (see FIG. 73) of the V1 main terminal 262 of the sensor assembly 300. Further, the external connection end 312b is formed to be connectable with the corresponding terminal pin (not shown) of the unshown external connector. Further, the V2 sensor terminal 313 includes the terminal connection end 313a provided at one end thereof or the right end of the terminal connection side, and the external connection end 313b provided at the other end thereof or the left end of the external connection side. The terminal connection end 313a is formed to be connectable with the terminal connection 263a (see FIG. 73) of the V2 main terminal 263 of the sensor assembly 300. Further, the external connection end 313b is formed to be connectable with the corresponding terminal pin (not shown) of an unshown external connector. Further, the GND sensor terminal 314 includes the terminal connection end 314a provided at one end thereof or the right end of the terminal connection side, and the external connection end 314b provided at the other end thereof or the left end of the external connection side. The terminal connection end 314a extends in surrounding manner to the lower portion of the holder member 90 in the sensor assembly 100 so as to be connectable with the terminal connection 264a (see. FIG. 73) of the GND main terminal 264 in the sensor assembly 300. Further, the external connection end 314b is formed to be connectable with the corresponding terminal pin (not shown) of an unshown external connector.

Further, the external connection ends 311b, 312b, 313b, 314b of the sensor terminals 311, 312, 313, 314 extend upward in such a manner that the external connection end 312b, the external connection end 311b, the external connection end 313b, the external connection end 314b are arranged parallel in this order from the right to the left. It should be noted that the outer surface of the sensor terminal unit 310 is plated with Ni (not shown), while each terminal connection end 311a, 312a, 313a, 314a is plated with Au. Further, each sensor terminal 311, 312, 313, 314 is provided with an appropriate number of through holes 311h, 312h, 313h, 314h respectively (see FIGS. 75 and 76). When the cover 230 (later described) is resin molded, each through hole 311h, 312h, 313h, 314h is fitted with a positioning pin (not shown) of a molding die such that each sensor terminal 311, 312, 313, 314 is positioned in the die. Similarly, each plate terminal 237, 238 is provided with an appropriate number of through holes 237h, 238h (see FIGS. 78 and 81).

The sensor terminal assembly 320 will now be described. FIG. 77 is a front view of the sensor terminal assembly. The sensor terminal assembly 320 is configured such that the sensor terminal unit 300 (see FIG. 76) is implemented with the sensor assembly 300 (see FIGS. 73 and 74). Thus, as shown in FIG. 77, the terminal connection end 311a of the Vc sensor terminal 311 of the sensor terminal unit 310 is electrically connected on the terminal connection 261a of the Vc main terminal 261 of the sensor assembly 300 by welding (not designated). Further, the terminal connection end 312a of the V1 sensor terminal 312 of the sensor terminal unit 310 is electrically connected on the terminal connection 261a of the Vc main terminal 261 of the sensor assembly 300 by welding (not designated). Further, the terminal connection end 313a of the V2 sensor terminal 313 of the sensor terminal unit 310 is electrically connected on the terminal connection 263a of the V2 main terminal 263 of the sensor assembly 300 by welding (the welded portion is designated as 323). Further, the terminal connection end 314a of the GND sensor terminal 314 of the sensor terminal unit 310 is electrically connected on the terminal connection 264a of the GND main terminal 264 of the sensor assembly 300 by welding (not designated). It should be noted that welding the main terminal with the sensor terminal might be performed, for example, by projection welding.

Figure 78:
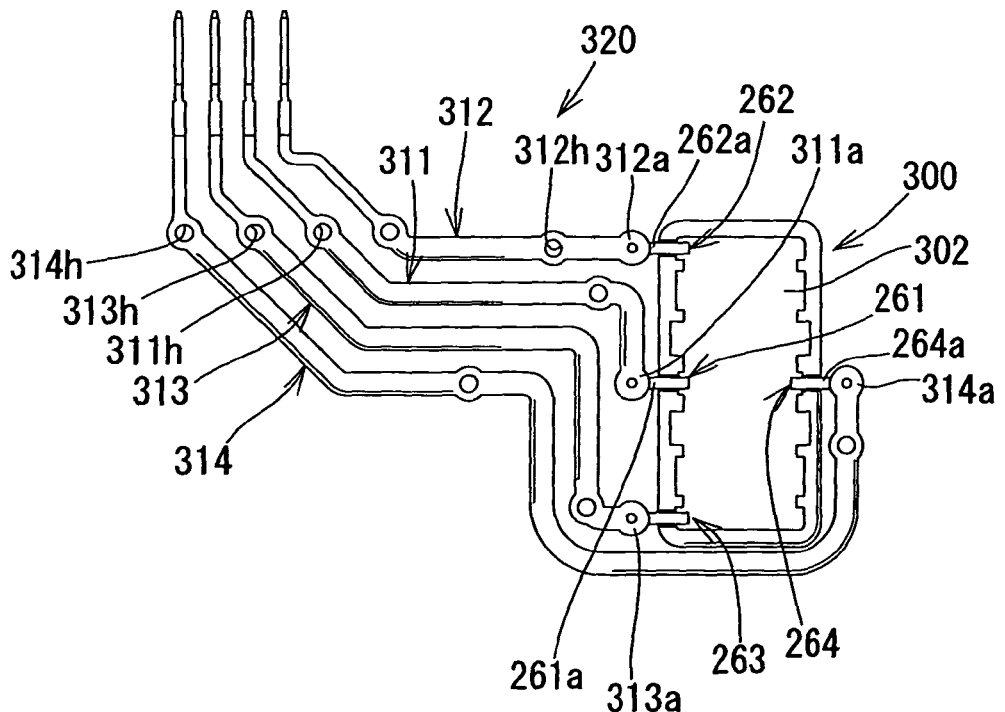
FIG. 78 is a front view showing the sensor terminal assembly in which tie bars have been cut.

After the welding, each tie bar 315a, 315b, 315c, 316a, 316b, 316c, 317 of the sensor terminal unit 310 is removed by cutting. Accordingly, as shown in FIG. 78, separated sensor terminals 311, 312, 313, 314 are formed. The sensor terminals 311, 312, 313, 314 formed as above are equivalent to the "subterminals" and the "external terminals" herein. It should be noted that FIG. 78 shows a front view of the sensor terminal assembly 320 in which the tie bars have been cut.

Figure 39:
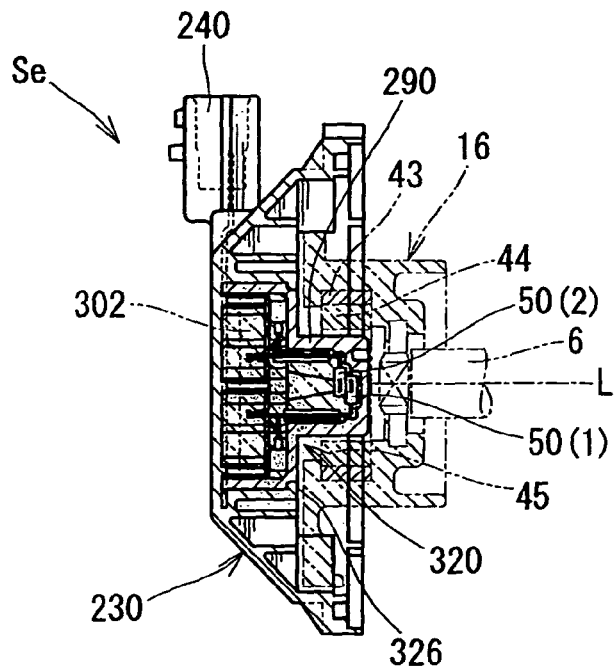
FIG. 39 is a cross-sectional view taken along line F-F in FIG. 36.
Figure 83:
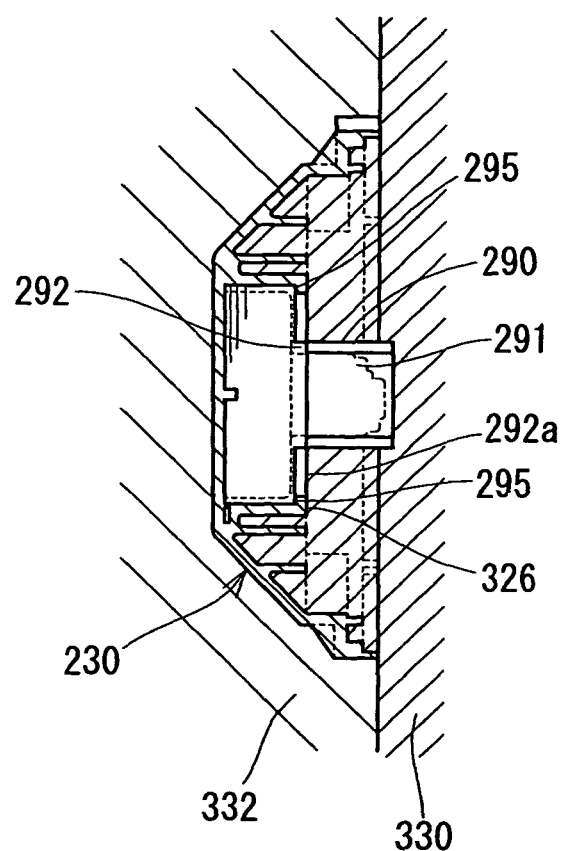
FIG. 83 is a cross-sectional side view showing a molding die for a cover.

Then, the cover 230 will be described. As shown in FIG. 38, the cover 230 is formed in such a way that the sensor terminal assembly 320 (see FIG. 78), the plate terminals 237, 238 (see FIGS. 79 to 82), and the relay connectors 236 are insert molded or inserted to be resin molded. It should be noted that the sensor terminal assembly 320 in FIG. 38 is a reversed image of the same in FIG. 78. Further, when the cover 230 is resin molded, the resin portion of the cover 230 surrounding the holder member 290 of the sensor terminal assembly 320 is prevented from burring on a burring prevention surface 326 (see FIG. 39), which forms the same plane as the end surface 292a (see FIG. 66) of the intermediate end plate portion 292 of the holder member 90. It should be noted that, as previously described, "burring prevention" is also referred to as "burring cut." This term refers to blocking a resin flow toward the exposed portion by the die 330 (see FIG. 83) fitting with the exposed portion such that a portion not buried by the resin portion (equivalent to the hollow tube portion 291 of the holder member 290 and the end surface 292a of the intermediate end plate portion 292 in this embodiment) when the resin molding is performed. Then, the end surface of the resin portion, which is molded by the die 330 fitting to the exposed portion and surrounds the exposed portion, is referred to as a "burring prevention surface" (designated as 326). Further, referring to FIG. 83, the cavity for molding the cover 30 is defined by the die 330 and the other die 332 to be matched to the die 330. Further, the end surface 292a of the intermediate end plate portion 292 of the holder member 90 is equivalent to the "stepped surface," which intersects an axis of the holder member 290 and is provided on the outer surface of the holder 290. Further, since the resin portion of the cover 230 flows into the retaining recesses 295 provided on the end surface 292a of the intermediate end plate portion 292 of the holder member 90, it is possible to retain the holder member 290 on the cover 230.

Further, as shown in FIG. 38, the external connection ends 311b, 312b, 313b, 314b of the sensor terminals 311, 312, 313, 314; as well as the external connection ends 237b, 238b of the plate terminals 237, 238 project into the connector portion 240 of the cover 230 (see FIG. 37). Further, the external connection ends 237b, 238b, 311b, 312b, 313b, 314b are arranged in a row in the left-right direction in FIG. 4. It should be noted that the external connection ends 238b, 237b, 314b, 313b, 311b, 312b are arranged in this order from the left to the right in FIG. 37 in this embodiment. Further, as previously described, each external connection end 237b, 238b, 311b, 312b, 313b, 314b is connectable with each terminal pin (not shown) within the external connector (not shown) connected with the connector portion 240. As described above, the sensor assembly 300 is provided with the sensor terminals 311, 312, 313, 314, the cover 230, the relay connectors 236, and the plate terminals 237, 238 such that the rotational angle sensor Se is configured (see FIGS. 38 and 39).

As shown in FIG. 35, the cover 230 configured as above is connected with the lateral surface (the right-side surface as viewed in FIG. 35) of the throttle body 1 so as to complete the throttle control device TC. Accordingly, similar to the first embodiment, the hollow tube portion 291 of the holder member 290 of the rotational angle sensor Se is disposed substantially concentric with the axis of the yoke 43 or the rotational axis L of the throttle shaft 6 so as to be between the magnets 44, 45 and in a predetermined spaced relationship with each magnet (see FIGS. 35 and 39).

Functions and effects similar to those of the first embodiment are also obtained by the rotational angle sensor Se (see FIGS. 38 and 39) provided in the aforementioned throttle control device TC and the method for manufacturing the same, and the throttle control device TC (see FIG. 35) with the rotational angle sensor Se. Additionally, since the capacitors 281, 282, 283, 284 are disposed on the same side (the right side in FIG. 58) as the connection side of the sensor ICs 250(1), 250(2) in the main terminals 261, 262, 263, 264, the sensor ICs 250(1), 250(2) and the capacitors 281, 282, 283, 284 are easily disposed against the main terminals 261, 262, 263, 264.

Additionally, the aforementioned rotational angle sensor Se is configured such that the capacitors 281, 282, 283, 284 are lead-type capacitors 280 having leads 280b, 280c. Thus, the leads 280b, 280c of the capacitors 281, 282, 283, 284 can be retained by a jig 286 (see FIGS. 61, 62, and 64) or by a jig 286 for retaining the main terminals 261, 262, 263, 264, the sensor ICs 250(1), 250(2) and the like. Thus, since the capacitors 281, 282, 283, 284 are positioned, it is possible to prevent or reduce connection failures caused by displacement of the capacitors 281, 282, 283, 284, or connection failures of the leads 280b, 280c against the main terminals 261, 262, 263, 264.

Further, the leads 280b, 280c of each capacitor 281, 282, 283, 284 are connected with the IC terminal connections (the IC terminal connections combined with the capacitor connections) 261c, 261d, 262c, 263c, 264c, 264e of the main terminals 261, 262, 263, 264 by welding. Thus, since the strength of the connection between the leads 280b, 280c of each capacitor 281, 282, 283, 284 and the IC terminal connections 261c, 261d, 262c, 263c, 264c, 264e of the main terminals 261, 262, 263, 264 is enhanced, it is possible to increase the reliability of the rotational angle sensor Se. Further, compared with soldering in a reflow furnace, welding enables simple welding facilities to be used without having to use an expensive reflow furnace, so as to lower the cost. Further, soldering might cause connection failures due to uneven amount of solder, while welding can securely connect the leads 280b, 280c of each capacitor 281, 282, 283, 284 with the IC terminal connections 261c, 261d, 262c, 263c, 264c, 264e of the main terminals 261, 262, 263, 264.

Further, the bottom end surface 291e or the bottom surface within the holder member 290 is formed with a predetermined spacing S along the contour shape of each sensor IC 250(1), 250(2) facing to the bottom end surface 291e (see FIG. 70). Thus, a potting material 302 can easily flow into a gap between the bottom end surface 291e within the holder member 290 and the sensor ICs 250(1), 250(2), i.e., a region prone to voids when the potting material 302 is potted, such that it is possible to inhibit void generation so as to prevent or reduce defective moldings (see FIG. 72).

Further, the reinforcing ribs 296 provided on both of the sidewalls 293a, 293b included in the holder member 290 can inhibit deformation of both of the sidewalls 293a, 293b caused by molding pressure when the cover 230 is resin molded. Thus, it is possible to prevent or reduce defective moldings caused by deformation of both of the sidewalls 293a, 293b of the holder member 290 when molding pressure is applied during the resin molding of the cover 230. It should be noted that the reinforcing ribs 296 may project from the outer surface of both of the sidewalls 293a, 293b.

Further, the resin portion of the over 230 surrounding the holder member 290 is prevented from burring on the same plane as the stepped surface provided in the holder member 290, or the stepped surface 292a of the intermediate end plate portion 292. Thus, it is possible to inhibit burr generation, while high dimensional accuracy is not required between the holder member 290 and the resin molding die 330 (see FIG. 83) for the cover 230. Therefore, it is possible to lower the cost for ensuring the dimensional accuracy of the holder member 290. More specific in this respect, when the resin portion of the cover 230 is to be prevented from burring, for example, on the outer surface of the hollow tube portion 291 of the holder member 290, unless a gap between the hollow tube portion 291 and the die fitting to the hollow tube portion 291 is accurately configured, some burring may occur due to resin leaking from the gap. At the same time, if the resin portion of the cover 230 is prevented from burring on the same plane as the end surface 292a of the intermediate end plate portion 292 of the holder member 290, it will be possible to avoid the resin leaking from the gap between the hollow tube portion 291 and the die 330 (see FIG. 83) fitting to the hollow tube portion 291. Thus, it is possible to inhibit burr generation, while high dimensional accuracy is not required between the holder member 290 and the resin molding die 330 (see FIG. 83) for the cover 230. Therefore, it is possible to lower the cost for ensuring the dimensional accuracy of the holder member 290.

Further, the end surface 292a of the intermediate end plate portion 292 of the holder member 290 is provided with the retaining recesses 295 into which the resin portion of the cover 230 flows. Thus, since the resin portion of the cover 230 flows into the retaining recesses 295 of the holder member 290, it is possible to retain the holder member 290 on the cover 230.

Further, according to the aforementioned method for manufacturing the rotational angle sensor Se, the connections between the main terminal unit 260 and the connection terminals 255, 256, 257 of the sensor ICs 250(1), 250(2) are disposed in a row, while the welding head 297 (see FIG. 63) can be sequentially moved in the row direction as each connection terminal 255, 256, 257 of each sensor IC 250(1), 250(2) is welded with each main terminal 261, 262, 263, 264. In this embodiment, as shown by arrow Y in FIG. 61, the welding is performed in reciprocating manner in upper-and-lower two rows. Therefore, since the movement of the welding head 297 of the welding facility can be simplified, it is possible to use a simple welding facility so as to lower the cost.

The present invention may not be limited to the aforementioned embodiments, but may be modified without departing from the scope of the present invention. For example, in the magnetic detector, as long as the strength or direction of the magnetic field between a pair of magnets 44, 45 can be detected, it is possible to use a magnetic detection element such as a magnetoresistive element, a hall element and the like, a magnetic detector in which the magnetic sensing portion having a magnetic detection element is connected with the computing portion, and the like, instead of using each sensor IC. Further, the type of the magnets 44, 45 may not be limited to ferrite magnets. Further, the rotational angle sensor Se may not be limited to be used in the throttle control device TC, but may be diverted into a rotational angle sensor for another rotor. Further, in the aforementioned embodiments, the holder member is to house the magnetic detector and the magnetic-detector-side connection portions of the main terminals. However, the holder member may not be a holder member housing them as long as to be able to retain them. For example, in the case that the magnetic detector is integrated into the holder member by resin injection molding, the holder member molded in a column shape can retain the magnetic detector. Further, each connection terminal of the magnetic detector can be connected with the main terminals not only by welding but, for example, also by soldering. Further, a resin mold may be used instead of the potting material. Further, the leads of the capacitor can be connected with the capacitor connections of the main terminals not only by welding but, for example, also by soldering. Further, the retaining recesses of the holder member can be provided in a portion different from the stepped portion.

The invention claimed is:

1. A rotational angle sensor comprising:
    a first sensor integrated circuit including a first magnetic sensing portion, a first computing portion and first connecting terminals, wherein the first magnetic sensing portion and the first computing portion are connected to each other by the first connecting terminals; and
    a second sensor integrated circuit including a second magnetic sensing portion, a second computing portion and second connecting terminals, wherein the second magnetic sensing portion and the second computing portion are connected to each other by the second connecting terminals,
    wherein the first magnetic sensing portion is inclined at an angle of approximately 90 degrees with respect to the first computing portion toward a rear side of the first computing portion,
    wherein the second magnetic sensing portion is inclined at an angle of approximately 90 degrees with respect to the second computing portion toward a front side of the second computing portion, and
    wherein the first sensor integrated circuit and the second sensor integrated circuit are disposed such that the rear side of the first computing portion is opposite the front side of the second computing portion, and such that the first magnetic sensing portion and the second magnetic sensing portion overlap with each other.

2. The rotational angle sensor according to claim 1 further comprising a casing member, wherein the first sensor integrated circuit and the second sensor integrated circuit are housed in the casing member.

3. The rotational angle sensor according to claim 2, wherein the first sensor integrated circuit and the second sensor integrated circuit are buried with a resin in the casing member.

4. The rotational angle sensor according to claim 3, wherein the resin is a potting material.

5. The rotational angle sensor according to claim 2, wherein the casing member is a holder member for holding the first magnetic sensing portion and the second magnetic sensing portion.

6. The rotational angle sensor according to claim 1, further comprising:
    a holder member for holding the first magnetic sensing portion and the second magnetic sensing portion,
    wherein the first magnetic sensing portion is provided with two first positioning pieces projecting from both sides of the first magnetic sensing portion, and
    wherein the second magnetic sensing portion is provided with two second positioning pieces projecting from both sides of the second magnetic sensing portion, and
    wherein the holder member is provided with two positioning grooves, and the positioning grooves are configured to receive the two first positioning pieces and the two second positioning pieces so as to position the first magnetic sensing portion and the second magnetic sensing portion to a predetermined position.

7. The rotational angle sensor according to claim 6, wherein the holder member is configured to house the first sensor integrated circuit and the second sensor integrated circuit.

8. The rotational angle sensor according to claim 1, wherein the first and second computing portions are opposed to each other with respect to a rotational axis of a sensing target.

9. The rotational angle sensor according to claim 1, wherein the first and second magnetic sensing portions overlap with each other in a direction of a rotational axis of a sensing target.

10. The rotational angle sensor according to claim 1, wherein sides of the first magnetic portion and second magnetic portion contact each other.

* * * * *